(12) United States Patent
Washisu

(10) Patent No.: US 6,263,161 B1
(45) Date of Patent: Jul. 17, 2001

(54) IMAGE BLUR PREVENTION APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,046

(22) Filed: Aug. 30, 1999

(30) Foreign Application Priority Data

Aug. 31, 1998 (JP) .................................. 10-259163
Dec. 24, 1998 (JP) .................................. 10-366286

(51) Int. Cl.$^7$ .................................................. G03B 17/00
(52) U.S. Cl. .................................. 396/50; 396/52
(58) Field of Search .................... 396/52–55, 50

(56) References Cited

U.S. PATENT DOCUMENTS

| | | | |
|---|---|---|---|
| 4,869,108 | 9/1989 | Washisu | 73/517 |
| 4,965,619 | 10/1990 | Shikaumi et al. | 354/410 |
| 5,020,369 | 6/1991 | Washisu et al. | 73/517 |
| 5,608,703 | 3/1997 | Washisu | 369/55 |
| 5,617,176 * | 4/1997 | Matsuzawa et al. | 396/55 |
| 5,774,266 | 6/1998 | Otani et al. | 359/554 |
| 5,835,799 | 11/1998 | Washisu | 396/55 |
| 5,940,630 | 8/1999 | Washisu | 396/55 |
| 5,974,269 | 10/1999 | Sato et al. | 396/55 |

* cited by examiner

Primary Examiner—W. B. Perkey
(74) Attorney, Agent, or Firm—Fitzpatrick, Cella, Harper & Scinto

(57) ABSTRACT

There is disclosed an image blur prevention apparatus which is reduced in size and weight, which is mounted onto an apparatus without deteriorating operations of the apparatuses, and which appropriately and quickly removes the offset signal superimposed onto a blur signal, so that a highly precise blur signal can be output. The apparatus comprises blur detection means for detecting blur, offset signal removing means for removing the offset signal superimposed on the blur signal from the blur detection means, and re-operation instructing means for allowing the offset signal removing means to remove the offset signal again even after offset signal removing is once completed and the blur signal is used to start a digital calculation.

39 Claims, 38 Drawing Sheets

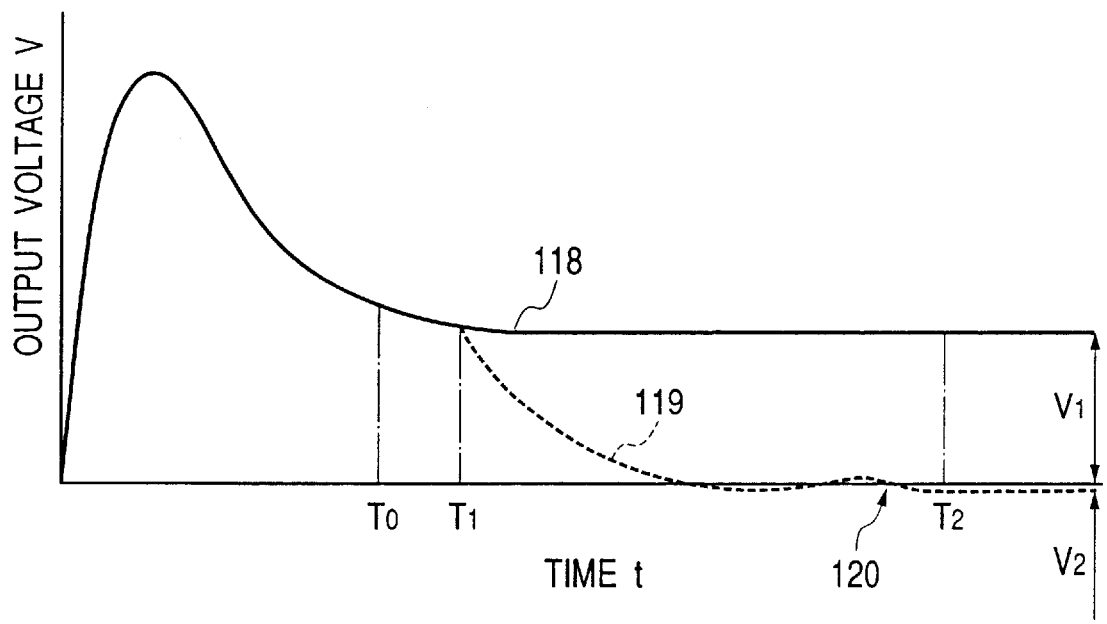
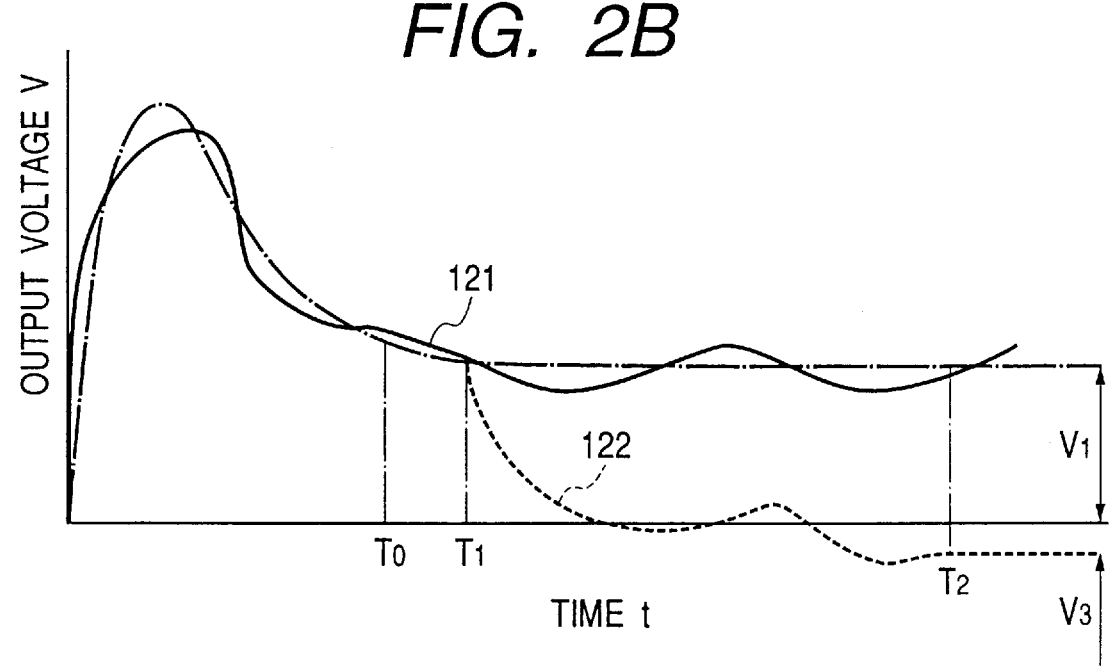

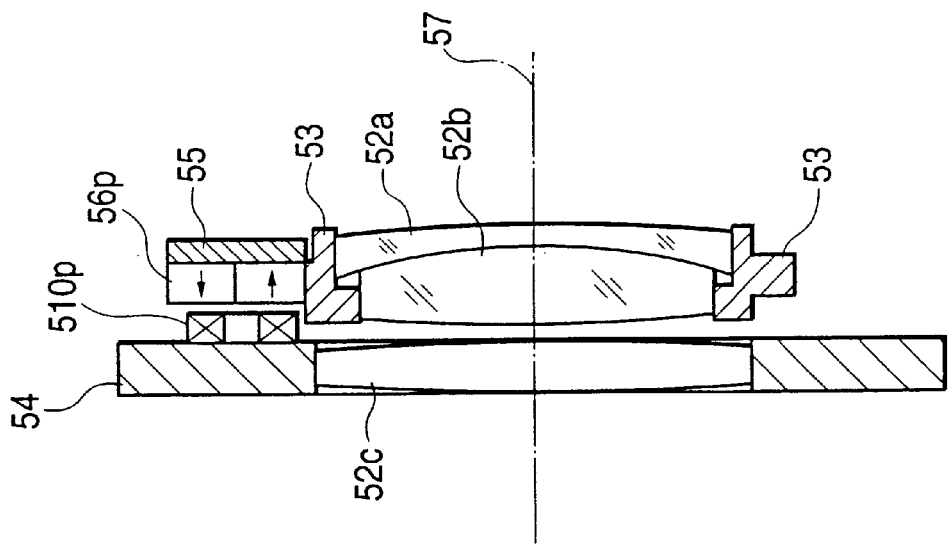
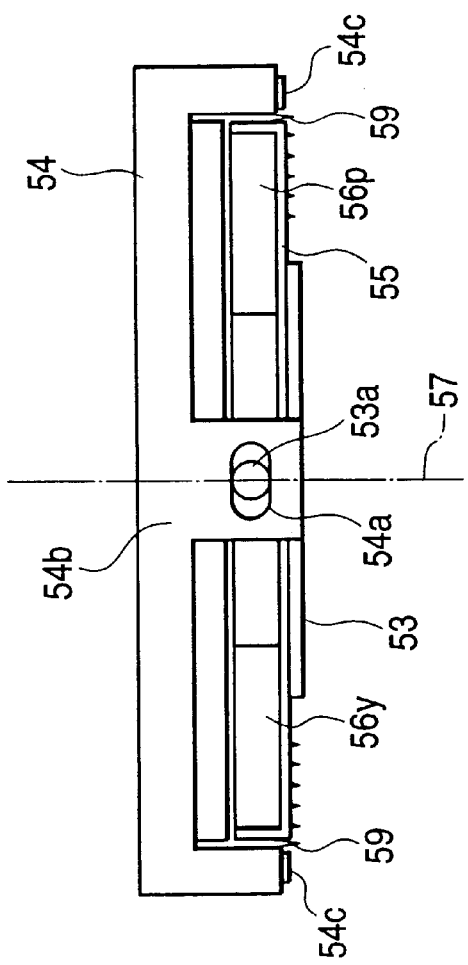
FIG. 35B
FIG. 35A

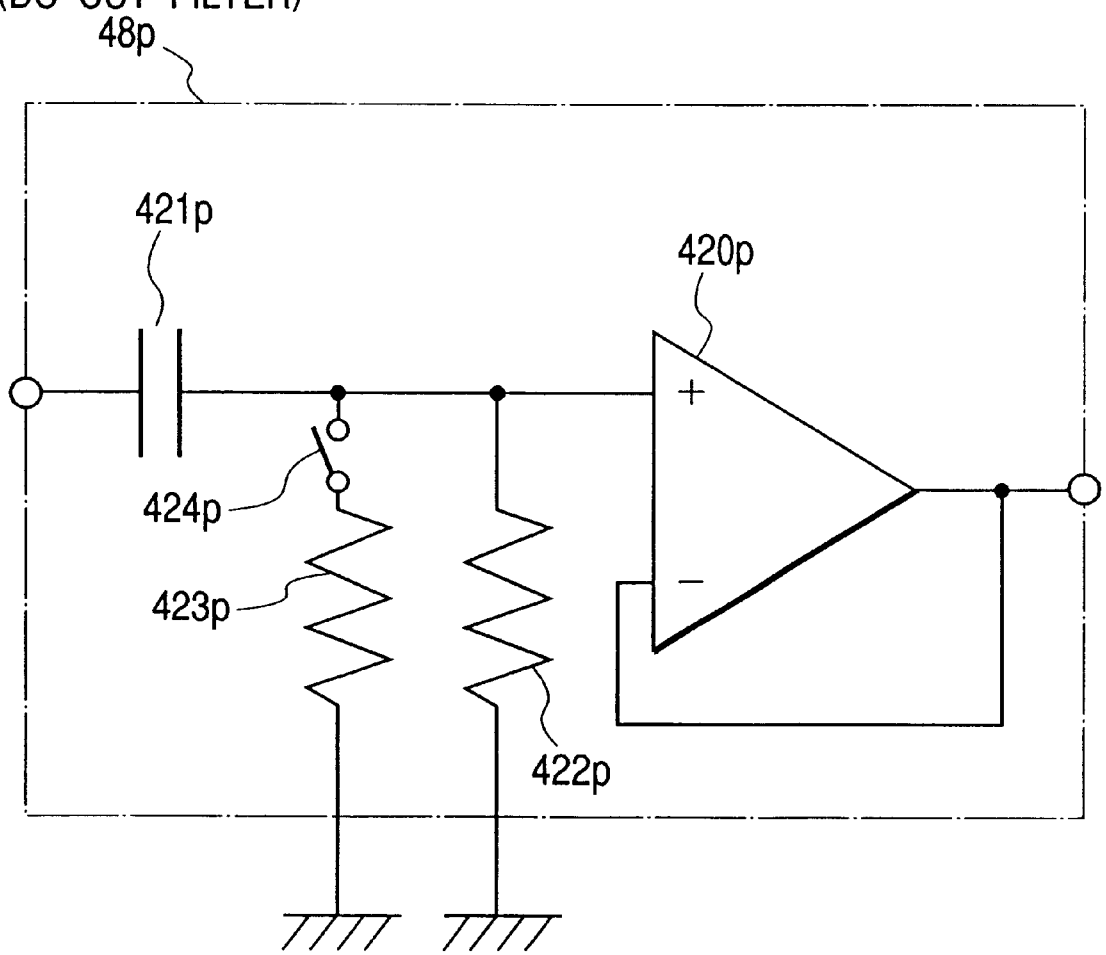

IMAGE BLUR PREVENTION APPARATUS

BACKGROUND OF THE INVENTION

1. Field of the Invention

The present invention relates to an image blur prevention apparatus which prevents image blur caused by hand fluctuation or the like in a camera, an optical apparatus, and the like.

2. Description of the Related Art

In current cameras, since exposure determining, focusing, and other operations important for photographing are all automated, even for persons unskilled in camera operation, a possibility of making a photographing failure is remarkably decreasing.

Moreover, in recent years, a system for preventing a hand fluctuation applied to a camera has been researched, and there are almost no factors for inducing photographers' photographing mistakes.

Here, the system for preventing the hand fluctuation will briefly be described.

The hand fluctuation of the camera during photographing is a vibration whose frequency is usually in the range of 1 Hz to 10 Hz. To allow photographs to be taken without any image blur even if such hand fluctuation is caused at the time of shutter release, as a fundamental concept, camera vibration by the hand fluctuation is detected, and a correction lens has to be displaced in accordance with a detected value. Therefore, to take photographs without causing any image blur even if camera fluctuation occurs, first, the camera vibration is exactly detected, and secondly, an optical axis change by the hand fluctuation needs to be corrected.

In principle, the detection of the vibration (camera fluctuation) can be performed by mounting onto the camera a blur detection device which is provided with a blur detection sensor for detecting acceleration, angular acceleration, angular speed, angular displacement, and the like and a calculation portion for appropriately calculating/processing an output of the sensor to correct the camera fluctuation. Then, based on detected information, correction means for decentering a photographing optical axis is driven to perform image blur suppression.

FIG. 31 is an appearance perspective view of a compact camera which has a blur prevention system, and the system has a function of performing blur correction for vertical and transverse camera fluctuations shown by arrows 42$p$ and 42$y$ relative to an optical axis 41.

Additionally, a camera main body 43 has a release button 43$a$, a mode dial 43$b$ (including a main switch), a retractable strobe 43$c$, and a finder window 43$d$.

FIG. 32 is a perspective view showing an inner constitution of the camera shown in FIG. 31. The constitution is provided with a camera main body 44, correction means 51, a correction lens 52, and a support frame 53 for freely driving the correction lens 52 in directions shown by arrows 58$p$ and 58$y$ to correct the blurs of the directions shown by the arrows 42$p$ and 42$y$ of FIG. 31, and details will be described later. Blur detection devices 45$p$, 45$y$ have an angular velocity sensor accelerometer or the like for detecting blur around axes as shown by arrows 46$p$ and 46$y$, respectively, and the like.

Outputs of the blur detection devices 45$p$ and 45$y$ are converted via calculation devices 47$p$ and 47$y$ described later to driving target values of the correction means 51, which are transmitted to coils of the correction means 51 to perform the blur correction. Additionally, numeral 54 denotes a base plate, 56$p$ and 56$y$ denote permanent magnets, and 510$p$ and 510$y$ denote coils.

FIG. 33 is a block diagram showing details of the calculation devices 47$p$ and 47$y$. Since the devices have similar constitutions, in the drawing only the calculation device 47$p$ is used for description.

The calculation device 47$p$ is provided with, as surrounded by a dot-dashed line, a DC cut filter 48$p$, a low-pass filter 49$p$, an analog/digital converting circuit (hereinafter referred to as A/D converting circuit) 410$p$, and a driving apparatus 419$p$, and as shown by a broken line, a camera microcomputer 411. Moreover, the camera microcomputer 411 is constituted of a memory circuit 412$p$, a differential circuit 413$p$, a DC cut filter 414$p$, an integral circuit 415$p$, a memory circuit 416$p$, a differential circuit 417$p$, and a PWM duty converting circuit 418$p$.

Here, the blur detection device 45$p$ used is a blur gyro which detects a camera fluctuation angular speed. The blur gyro is driven synchronously when the camera main switch is turned on, and starts detecting the blur angular speed applied to the camera.

For an output signal of the blur detection device 45$p$, a DC bias component superimposed to the output signal is cut by the DC cut filter 48$p$ constituted of an analog circuit. The DC cut filter 48$p$ has a frequency property of cutting signals whose frequencies are 0.1 Hz or less, so that a hand fluctuation frequency range applied to the camera of 1 to 10 Hz is not influenced. However, with the property of cutting 0.1 Hz or less, there is a problem that it takes almost ten seconds from when a blur signal is transmitted from the blur detection device 45$p$ until DC is completely cut. To solve the problem, by setting a time constant of the DC cut filter 48$p$ to be small within, for example, 0.1 second from when the camera main switch is turned on (providing a property of cutting a signal with a frequency of, for example, 10 Hz or less), DC is cut for a short time of about 0.1 second. Thereafter, by setting the time constant to be large (providing a property of cutting only a frequency of 0.1 Hz or less), deterioration of a blur angular speed signal is prevented by the DC cut filter 48$p$.

An output signal of the DC cut filter 48$p$ is appropriately amplified by the low-pass filter 49$p$ constituted of the analog circuit in accordance with a resolution of A/D converting circuit 410$p$, while a high-frequency noise superimposed to the blur angular speed signal is cut. This prevents a reading error from being caused by noise of the blur angular speed signal during sampling of the A/D converting circuit 410$p$ when the blur angular speed signal is transmitted to the camera microcomputer 411. Moreover, an output signal of the low-pass filter 49$p$ is sampled by the A/D converting circuit 410$p$ and transmitted into the camera microcomputer 411.

The DC bias component is cut by the DC cut filter 48$p$, but by the subsequent amplification of the low-pass filter 49$p$ the DC bias component is again superimposed to the blur angular speed signal. Therefore, in the camera microcomputer 411 DC cutting needs to be performed again.

In this case, for example, the blur angular speed signal sampled 0.2 second after the camera switch is turned on is stored in the memory circuit 412$p$, and a difference between the stored value and the blur angular speed signal is obtained by the differential circuit 413$p$ to perform DC cutting. Additionally, since in the operation the DC cutting can only be roughly performed (because the blur angular speed signal, stored 0.2 second after the camera main switch is turned on, includes not only DC component but also actual hand fluctuation), in a later stage a sufficient DC cutting is performed by the DC cut filter 414p constituted of a digital filter. A time constant of the DC cut filter 414p can also be changed in the same manner as the analog DC cut filter 48p. For further 0.2 second after 0.2 second time periods elapsed after turning on of the camera main switch, the time constant is gradually increased. Specifically, when 0.2 second elapses from the turning-on of the main switch, the DC cut filter 414p has the filter property of cutting the frequency of 10 Hz or less. Thereafter, every time 50 msec elapse, the frequency to be cut by the filter is lowered to 5 Hz, 1 Hz, 0.5 Hz, and 0.2 Hz.

However, during the above-described operation, if the photographer depresses the release button 43a half way (turns on sw1) to perform photometry, or distance measurement, photographing may immediately be performed. In this case, it is unfavorable to consume time to change the time constant. Therefore, in such a case, the changing of the time constant is discontinued in accordance with photographing conditions. For example, when as a photometry result a photographing shutter speed is found to be 1/60, and a photographing focal distance is 150 mm, blur prevention precision is not particularly demanded. Therefore, time constant changing is completed when the DC cut filter 414p is given the property of cutting the frequency of 0.5 Hz or less (the change amount of the time constant is controlled by a product of the shutter speed and the photographing focal distance). Thereby, the time of the time constant changing can be shortened, and priority can be given to a shutter chance photo-opportunity. Naturally, with a faster shutter speed, or a shorter focal length, the time constant changing is completed when the DC cut filter 414p is given the property of cutting the frequency of 1 Hz or less. On the other hand, with a slower shutter speed, or a longer focal distance, photographing is inhibited until the time constant is completely changed to the end.

In response to the half depressed camera release button 43a (sw1 on), the integral circuit 415p starts integrating output signals of the DC cut filter 414p to convert the angular speed signal to an angular signal. However, as described above, when the time constant changing of the DC cut filter 414p is not completed, the integrating operation is not performed until the completion of the time constant changing. Additionally, as omitted from FIG. 33, the integrated angular signal is appropriately amplified on the basis of the focal distance, and subject distance information of that time, and converted in such a manner that the correction means 51 is driven by an appropriate amount in accordance with a blur angle (this correction is necessary because a photographing optical system is changed by zoom focus, and an optical axis eccentric amount changes relative to the driven amount of the correction means 51).

When the release button 43a is completely depressed (sw2 on), the correction means 51 starts to be driven in response to the blur angular signal. At this time, it needs to be noted that the correction means 51 should not start its blur correcting operation rapidly. As countermeasures, the memory circuit 416p and the differential circuit 417p are provided. The memory circuit 416p stores the blur angular signal of the integral circuit 415p in synchronization with the completely depressed release button 43a (sw2 on). The differential circuit 417p obtains a difference between the signal of the integral circuit 415p and the signal of the memory circuit 416p. Therefore, when the switch sw2 is turned on, two signal inputs of the differential circuit 417p are equal to each other, and a driving target value signal of the differential circuit 417p for the correction means 51 is zero, but thereafter outputs are continuously emitted from zero (the memory circuit 416p has a function of returning to its origin an integral signal at the time of the turning-on of the switch sw2). This prevents the correction means 51 from being abruptly driven.

The target value signal from the differential circuit 417p is transmitted to the PWM duty converting circuit 418p. By applying to the coil 510p of the correction means 51 (see FIG. 32) a voltage or a current corresponding to the blur angle, the correction lens 52 is driven in accordance with the blur angle, but PWM driving is preferable to save drive power consumption of the correction means 51 and power of a coil driving transistor.

For this purpose, the PWM duty converting circuit 418p changes coil driving duty in accordance with the target value. For example, in PWM having a frequency of 20 KHz, when the target value of the differential circuit 417p is "2048", the duty is changed to "0". When the value is "4096", the duty is changed to "100". Then, an interval between them is divided into equal parts and the duty is determined in accordance with the target value. Additionally, the duty determination is finely controlled not only by the target value, but also camera photographing conditions at that time (temperature, camera posture, power supply state) so that precise blur correction can be performed.

An output of the PWM duty converting circuit 418p is transmitted to the known driving apparatus 419p such as PWM driver, and an output of the driving apparatus 419p is applied to the coil 510p of the correction means 51 (see FIG. 32) to perform the blur correction. The driving apparatus 419p is turned on in synchronization with the turning-on of the switch sw2, and turned off when exposure to a film is completed. Moreover, even upon completion of the exposure, as long as the release button 43a is half depressed (sw1 on), the integral circuit 415p continues integrating. When the switch sw2 is next turned on, the memory circuit 416p again stores a new integral output.

When the half depressed release button 43a is released, the integral circuit 415p stops integrating the outputs of the DC cut filter 414p, and resetting of the integral circuit 415p is performed. The reset means that information integrated by that time is all emptied.

When the main switch is turned off, the blur detection device 45p is turned off, thereby ending the blur prevention sequence.

Additionally, when the output signal of the integral circuit 415p is larger than a predetermined value, it is judged that the camera has been panned, and the time constant of the DC cut filter 414p is changed. For example, the property of cutting the frequency of 0.2 Hz or less is changed to the property of cutting 1 Hz or less, and the time constant is returned to the original in the predetermined time. The time constant change amount is also controlled by the size of the output of the integral circuit 415p. Specifically, when the output signal exceeds a first threshold, the property of the DC cut filter 414p is changed to the property of cutting 0.5 Hz or less. When the signal exceeds a second threshold, the property is changed to the property of cutting 1 Hz or less. When the signal exceeds a third threshold, the property is changed to the property of cutting 5 Hz or less.

Moreover, when the output of the integral circuit 415p becomes very large, the integral circuit 415p is once reset to prevent calculation overflow.

In FIG. 33, the DC cut filter 414p is constructed to start its operation 0.2 second after the main switch is turned on, but is not limited, and the operation may be started when the release button 43a is half depressed. In this case, when the time constant changing of the DC cut filter is completed, the integral circuit 415p is operated.

Moreover, the integral circuit 415p also starts its operation when the release button 43a is half depressed (sw1), but may be constructed to start its operation when the release button 43a is completely depressed (sw2). In this case, the memory circuit 416p and the differential circuit 417p become unnecessary.

In FIG. 33, the DC cut filter 48p and the low-pass filter 49p are disposed in the calculation device 47p, but needless to say they may be disposed in the blur detection device 45p.

FIGS. 34 to 36 are views showing details of the correction means 51. Specifically, FIG. 34 is a front view of the correction means 51, FIG. 35A is a side view as seen from a direction of arrow 35A of FIG. 34, FIG. 35B is a sectional view taken along 35B—35B of FIG. 34, and FIG. 36 is a perspective view of the correction means 51.

In FIG. 34, the correction lens 52 (as shown in FIG. 35B, the correction lens 52 comprises two lenses 52a and 52b fixed to the support frame 53, and a lens 52c fixed to the base plate 54, to constitute a photographing optical system group) is fixed to the support frame 53.

To the support frame 53 a yoke 55 of a ferromagnetic material is attached, and to a back surface of the yoke 55 of the drawing, the permanent magnets 56p and 56y of neodymium are adsorbed/fixed (as shown by hidden lines). Moreover, three pins 53a radially extended from the support frame 53 are engaged in elongated holes 54a formed in a side wall 54b of the base plate 54.

As shown in FIGS. 35A and 36, the pin 53a is engaged in the elongated hole 54a in a direction of an optical axis 57 of the correction lens 52 without any looseness. However, since the elongated hole 54a extends in a direction orthogonal to the optical axis 57, the support frame 53 is inhibited from moving in the direction of the optical axis 57 relative to the base plate 54, but can freely move in a plane orthogonal to the optical axis (arrows 58p, 58y, 58r). However, as shown in FIG. 34, since tensile springs 59 are extended between hooks 53b on the support frame 53 and hooks 54c on the base plate, the frame is elastically regulated in each direction (58p, 58y, 58r).

To the base plate 54, the coils 510p, 510y are attached opposite the permanent magnets 56p, 56y (partially hidden lines). The yoke 55, the permanent magnet 56p, and the coil 510p are arranged as shown in FIG. 35B (the permanent magnet 56y and the coil 510y are arranged in the same manner). When an electric current is passed through the coil 510p, the support frame 53 is driven in the direction of arrow 58p. When current is passed through the coil 510y, the support frame 53 is driven in the direction of arrow 58y.

Additionally, the driving amount is obtained by a balance of a spring constant of the tensile spring 59 in each direction and a thrust generated by association of the coil 510p, 510y and the permanent magnet 56p, 56y. Specifically, based on an amount of currents passed through the coil 510p, 510y, the eccentric amount of the correction lens 52 can be controlled.

As described with reference to FIG. 33, for the signal of the blur detection device 45p (45y), the DC bias component superimposed on the signal is cut by the DC cut filter 48p constituted of the analog circuit. As shown in FIG. 37, the DC cut filter 48p is constituted of an operation amplifier 420p, a capacitor 421p, resistances 422p, 423p and a switch 424p (DC cut filter of the blur detection device 45y is constituted in the same manner). To set the property of the DC cut filter 48p to the property of cutting the frequency of 0.1 Hz or less, for example, the capacitor 421p is set to 10 $\mu$F, and the resistance 422p is set to 160 k$\Omega$.

Additionally, a resistance value of the resistance 423p is set, for example, to 1.6 k$\Omega$. In this case, when the switch 424p is closed, the DC cut filter 48p cuts the frequency of 10 Hz or less. When the switch 424p is opened, the filter has the property of cutting the frequency of 0.1 Hz or less. Therefore, as described above, by closing the switch 424p until, for example, 0.1 second has elapsed from the turning-on of the camera main switch, the DC component can be cut in an early stage.

Furthermore, in the circuit constitution of FIG. 37, since a large-capacity capacitor of 10 pF is used in the capacitor 421p, the circuit is remarkably enlarged, and a problem arises that costs are raised. Furthermore, when the DC cut filter 48p is constituted in this manner, another problem arises that the blur prevention precision is lowered. This respect will be described with reference to FIGS. 38A and 38B.

FIGS. 38A and 38B conceptually show the frequency property of the DC cut filter 48p of FIG. 37, a line segment 425 shows a ratio (gain) of an output signal relative to a signal which is transmitted to the DC cut filter 48p, and a line segment 426 likewise shows a phase of the signal to be output relative to the input signal.

Referring to the line segment 425, the gain decreases at frequencies below 0.1 Hz, whereby signal outputs of 0.1 Hz or less are attenuated, and DC cut property can be obtained.

In order to precisely prevent blur, the signal of the blur detection device needs to be transmitted to the correction means without any phase deviation, if possible. Referring to the line segment 426, in a hand fluctuation frequency range of 1 to 10 Hz, particularly on a low frequency side, the phase advances, and the blur cannot precisely be prevented.

To enhance the blur prevention precision, for example, the current property of the DC cut filter which cuts the frequency of 0.1 Hz or less may be changed to the property of cutting 0.01 Hz. In this case, however, the capacity of the capacitor 421p needs to be increased, for example, to 100 $\mu$F (or the resistance 422p needs to be increased to 1.6 M$\Omega$), which is unfavorable also considering from a circuit scale, and a noise respect.

As described above, the current DC cut filter has problems that the capacitor is large and unsuitable for miniaturization and cost reduction and that the blur prevention precision is lowered.

One of objects of the present invention is to provide a blur prevention apparatus which is reduced in size and weight, which removes an offset signal superimposed on a blur detection signal in accordance with a state of the blur prevention apparatus and a state of an apparatus on which the blur prevention apparatus is mounted, and which can output a highly precise blur detection signal.

SUMMARY OF THE INVENTION

According to one aspect of the invention, there is provided an image blur prevention apparatus provided with a microcomputer which receives a blur signal from blur detection means for detecting blur, uses the received blur signal to perform a digital calculation, and forms an image blur prevention signal for controlling an image blur preventing operation. The apparatus comprises: offset signal removing means for removing an offset component of the blur signal received from the blur detection means before the blur signal is transmitted to the microcomputer, determining an offset value to be removed from the blur signal in response to the blur signal, and subsequently continuously performing an offset removing operation by the use of the offset value, and variable means for varying a manner of determining the offset value for use in the offset removing operation by the offset signal removing means, whereby when the offset signal removing means is utilized, more suitable utilization can be realized.

According to another aspect of the invention, there is provided an image blur prevention apparatus provided with a microcomputer which receives a blur signal from blur detection means for detecting blur, uses the received blur signal to perform a digital calculation, and forms an image blur prevention signal for controlling an image blur preventing operation. The apparatus comprises: offset signal removing means as an outer constitution of the microcomputer for removing an offset component of the blur signal received from the blur detection means, determining an offset value to be removed from the blur signal in response to the blur signal, and subsequently continuously performing an offset removing operation by the use of the offset value, and resetting means for resetting the offset value in a state where the offset value of the offset signal removing means is set and the subsequent continuous offset signal removing operation by the use of the offset value is already performed, whereby when the offset signal removing means is utilized, more accurate offset signal removing can be realized.

BRIEF DESCRIPTION OF THE DRAWINGS

FIGS. 2A and 2B are timing charts showing from when blur detection starts until an offset component is removed in the first embodiment of the present invention.

FIG. 35A is a view of the correction means shown in FIG. 34 as seen from a direction 35A, and FIG. 35B is a sectional view taken along section line 35B—35B of the correction means shown in FIG. 34.

FIG. 37 is a circuit diagram showing a constitution of DC cut filter shown in FIG. 33.

DETAILED DESCRIPTION OF THE PREFERRED EMBODIMENTS

Figure 1:
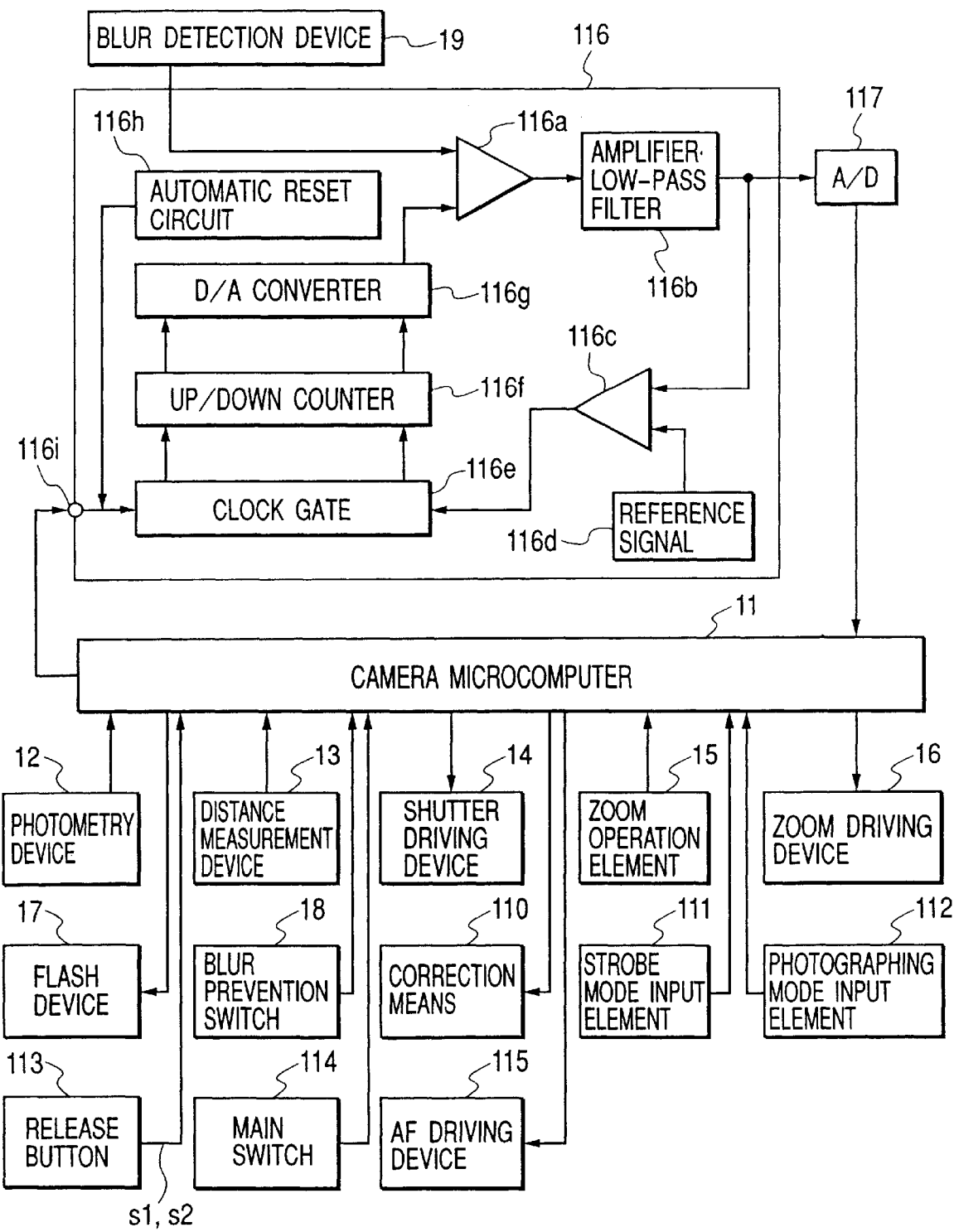
FIG. 1 is a block diagram showing a camera main portion constitution according to a first embodiment of the present invention.

The present invention will be described hereinafter in detail based on embodiments shown in the drawings.

FIRST EMBODIMENT

FIG. 1 is a block diagram showing a camera circuit constitution according to a first embodiment of the present invention; only a portion associated with the embodiment is shown, and other camera elements are omitted to facilitate the description.

In FIG. 1, upon input of an on-signal of a main switch 114, a camera microcomputer 11 delivers a photographing lens tube from a state of a depressed barrel to a state of an optical system ready for photographing, and additionally opens a lens barrier. In this case, a blur detection device 19 is also started.

From a photographing mode input element 112 a photographing mode selected by a photographer is transmitted to the camera microcomputer 11. For example, photographing modes include a sport mode suitable for photographing subjects moving around, a portrait mode suitable for close-up photographing persons, a macro mode suitable for close-up photographing subjects, and a night view mode suitable for photographing a night view.

From a strobe mode input element 111 a strobe mode is transmitted to the camera microcomputer 11. Strobe modes include a strobe off mode in which no strobe is used, a strobe on mode in which a strobe is forced to emit light, and a strobe automatic mode in which the strobe is controlled in accordance with subject luminance, light beam direction, and the like whether or not the strobe is allowed to emit light. Moreover, when the strobe emits light, it can be judged whether or not a red-eye moderating function is operated.

From a blur prevention switch 18, information, determined by the photographer, concerning whether or not blur correction is performed during photographing is transmitted to the camera microcomputer 11. From a zoom operation element 15 a zoom signal responding to a photographer's operation is transmitted to the camera microcomputer 11, and the camera microcomputer 11 controls a zoom driving device 16 to change a photographing focal distance.

When the photographing focal distance is determined, a release button 113 is half depressed by the photographer (s1 is turned on). At a timing of the half depression, a distance measurement device 13 measures a distance to the subject and transmits information (distance measurement information) to the camera microcomputer 11. Based on the distance measurement information the camera microcomputer 11 controls AF driving device 115 and partially or wholly drives the photographing lens tube to perform focus adjustment of the photographing optical system.

At this time, blur information from the blur detection device 19 is also transmitted to the camera microcomputer 11, and the camera microcomputer 11 determines from a blur state whether or not the camera is hand held or fixed to a tripod or a ground.

Moreover, a photometry device 12 measures the subject luminance, and transmits information to the camera microcomputer 11. Based on the information, film sensitivity and type, operation state of the blur prevention system, photographing focal distance and lens brightness at that time, photographing mode, selection of blur correction, distance information to the subject, blur information, and other photographing information determined by that time, the camera microcomputer 11 calculates an exposure time, and simultaneously determines whether to use a flash device 17 or not.

When the release button 113 is completely depressed (s2 is turned on), based on a signal of the blur detection device 19, the camera microcomputer 11 controls correction means 110 to start blur correction. Thereafter, a shutter driving device 14 is controlled to perform exposure to a film, and in accordance with a situation the flash device 17 is allowed to emit light.

An analog signal processing circuit 116 is constituted of the DC cut filter 48p and low-pass filter 49p described with reference to FIG. 33, which are conventional devices, and cuts an offset component and a noise component superimposed on an output of the blur detection device 19 to transmit an output to A/D converter 117. The A/D converter 117 samples a signal from the analog signal processing circuit 116, and transmits the signal to the camera microcomputer 11.

Here, in an offset signal cutting method of the blur detection device 19 in the analog signal processing circuit 116, instead of using the filter having the frequencies property as described with reference to FIG. 33, the following constitution is used.

The output signal of the blur detection device 19 is transmitted to the analog signal processing circuit 116, and first in a differential unit 116a subtraction is performed also using an offset extracted component described later. By an amplifier/low-pass filter 116b, in the same manner as the low-pass filter 49p of FIG. 33, noises with which an output signal of the differential unit 116a superimposed onto signal components are cut, and signal amplification is performed. An output signal of the amplifier/low-pass filter 116b is transmitted to the A/D converter 117, and is simultaneously transmitted to a comparator 116c.

The comparator 116c compares the signal from the amplifier/low-pass filter 116b with a reference signal 116d. The reference signal 116d has substantially a half of a power supply voltage applied to the blur detection device 19, and this is a central value of a signal output range of the blur detection device 19. Moreover, the reference signal also serves as a reference for the subsequent DC cutting by a digital filter in the camera microcomputer and for integrating.

When the signal from the amplifier/low-pass filter 116b is larger than the reference signal (there is a plus offset voltage), the comparator 116c transmits HIGH signal to a clock gate 116e. When the signal is smaller than the reference signal (there is a minus offset voltage), LOW signal is transmitted to the clock gate 116e.

When a clock signal is transmitted to the clock gate 116e from an automatic reset circuit 116h or a reset terminal 116i operable from the outside, the gate transmits the signal from the comparator 116c to an up/down counter 116f. The up/down counter 116f counts up one bit for every clock when the signal from the clock gate 116e is HIGH, and counts down one bit when the signal is LOW. D/A converter 116g emits an analog output of a signal in response to an output of the up/down counter 116f. For example, when the counter counts up one bit, plus 2 mV is transmitted to the differential unit 116a.

The automatic reset circuit 116h transmits the clock signal to the clock gate 116e, for example, for 0.1 second after 0.1 second elapses from when the analog signal processing circuit 116 starts its operation (power is supplied to the analog signal processing circuit).

In the above-described constitution, at the same time when the camera main switch 114 is first turned on, the blur detection device 19 and the analog signal processing circuit 116 start operating.

Now for the description, on the assumption that there is little vibration such as hand fluctuation, the output of the blur detection device 19 changes as shown by a waveform 118 of FIG. 2A from the start of the operation, and finally reaches an offset $V_1$.

Here the signal largely varies till time $T_0$. immediately after the operation starts. This indicates a signal variation until blur is stabilized, for example, when a known vibratory gyro is used as the blur detection device. When an angular acceleration meter is used, a signal variation until a circuit is stabilized is indicated.

The automatic reset circuit 116h incorporated in the analog signal processing circuit 116 transmits the clock signal to the clock gate 116e till time $T_2$ after $T_1$ (e.g., 0.1 second) elapses from the start of the operation. The clock signal is not transmitted to the clock gate 116e until time $T_1$ elapses. This is because as described above, the offset component superimposed on the signal of the blur detection device 19 varies till the time.

Since the signal offset $V_1$ in time $T_1$ is first generated for the output of the differential unit 116a, the comparator 116c emits a HIGH signal. Every time one clock signal is transmitted to the clock gate, the signal of the D/A converter 116g transmitted to the differential unit 116a is increased.

Therefore, the offset component of the signal of the differential unit 116a decreases every time the clock increases, and finally the signal of the differential unit 116a causes an alternating variation with the clock signal in a range of a minimum resolution (e.g., 2 mV) of the D/A converter 116g (arrow 120). At time $T_2$, since the automatic reset circuit 116h stops the output of the clock signal, the signal output to the differential unit 116a from the D/A converter 116g is fixed to a signal at the time the output of the clock signal is stopped. Thereby, the signal of the arrow 120 does not vary any more, and the offset component decreases to $V_2$.

Figure 33:
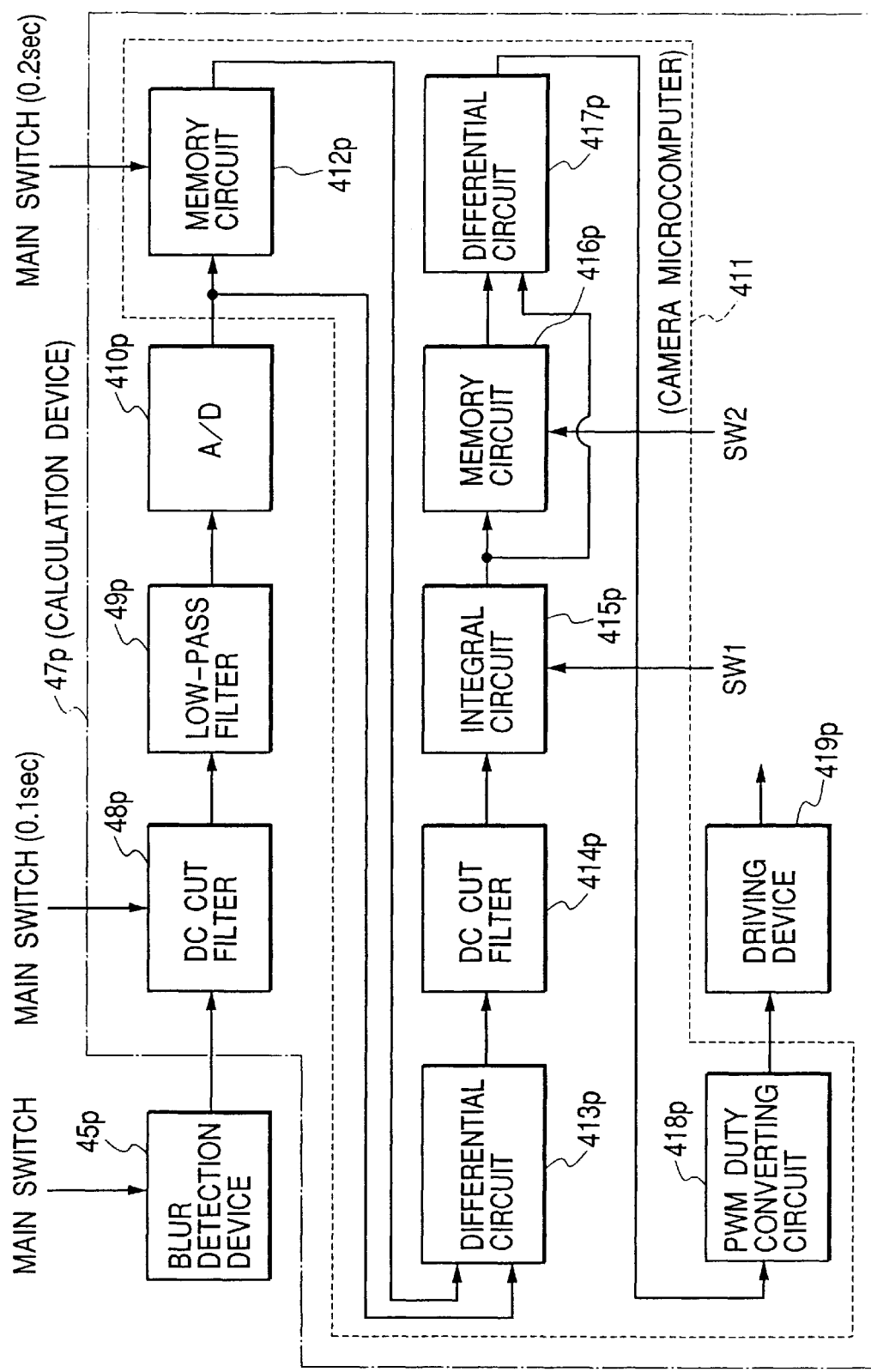
FIG. 33 is a block diagram showing an inner structure of a calculation device.
Figure 34:
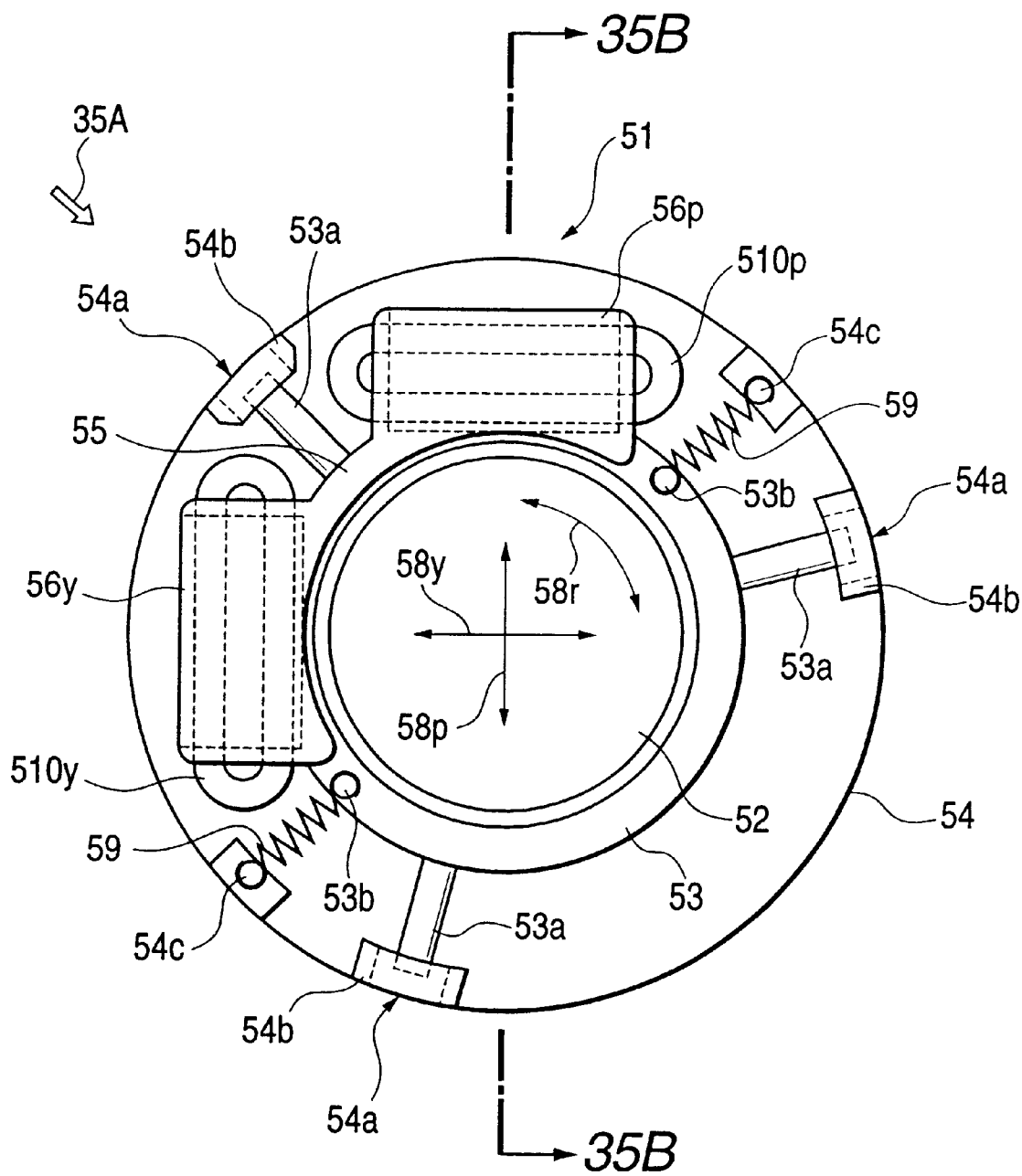
FIG. 34 is a front view of correction means mounted on the camera of FIG. 31.
Figure 36:
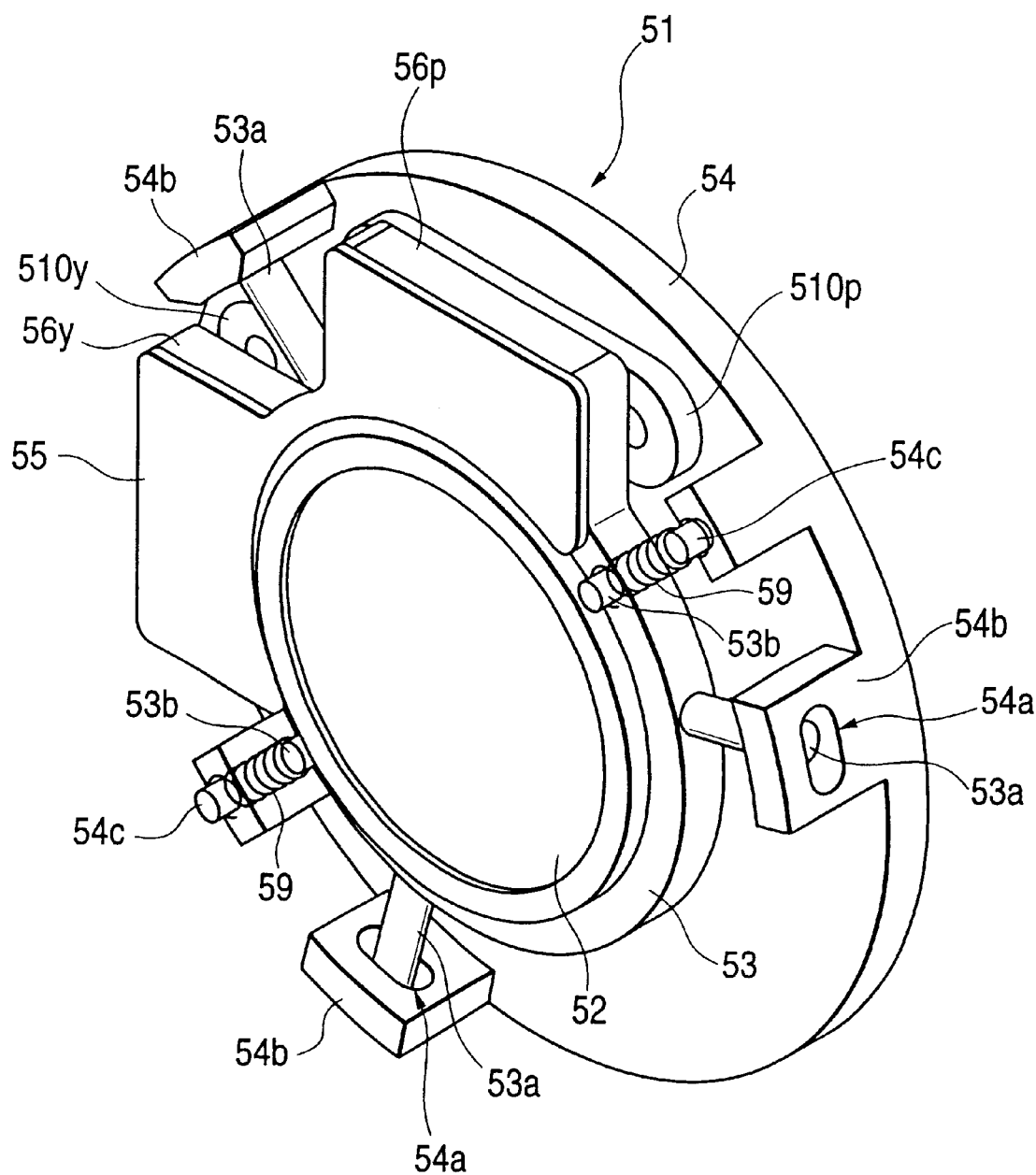
FIG. 36 is a perspective view of the correction means shown in FIG. 34.
Figure 38A:
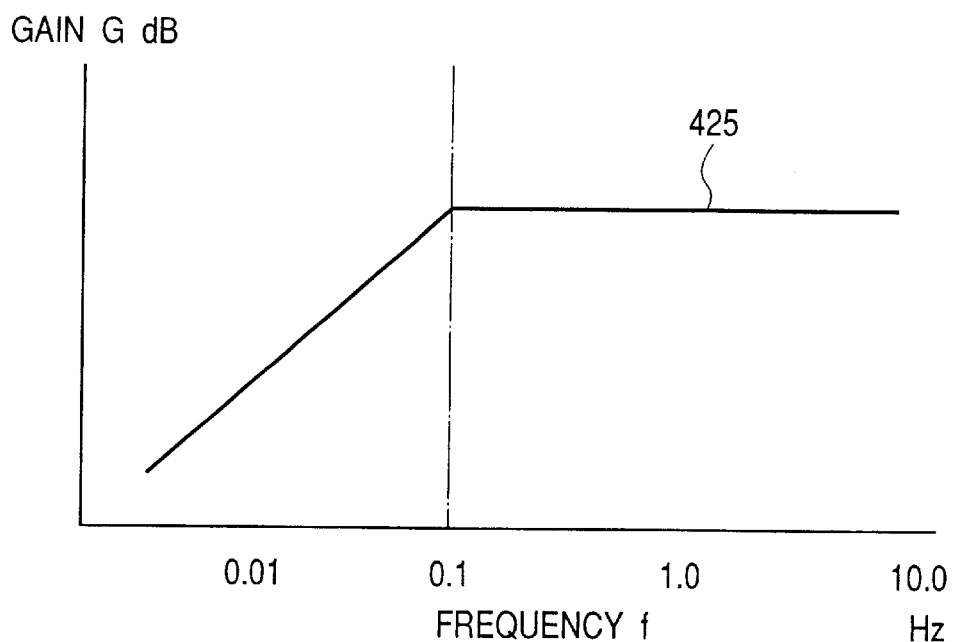
FIGS. 38A and 38B are views showing frequency properties of the DC cut filter having the constitution of FIG. 37.
Figure 38B:
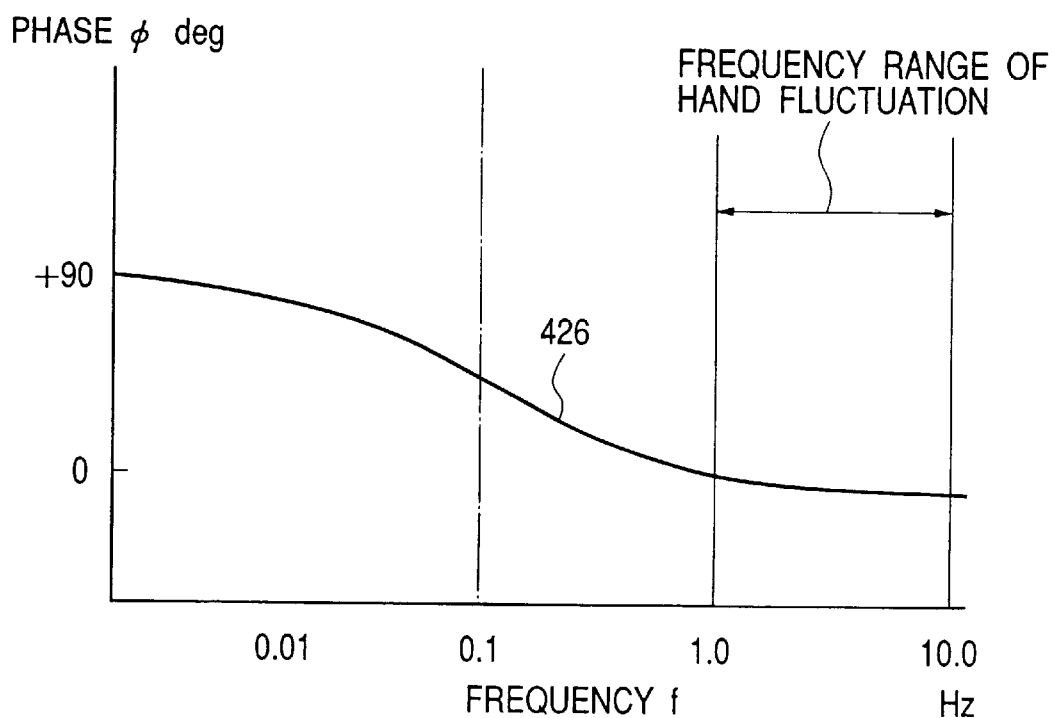

Here, in the conventional DC cut filter 48p described with FIG. 33 the offset component can finally be zero, but in the present system it can be expected that only a slight offset ($V_2$) remains. However, since the signal is removed by the DC cut filter 414p by the digital calculation in the camera microcomputer, there is no problem with blur prevention performance.

Although offset removal is finally performed in the camera microcomputer 11, the offset removal has to be performed also in the analog signal processing circuit 116. Reasons for this will be described hereinafter.

Now a case where no offset removal is performed in the analog signal processing circuit 116 is considered. The output of the blur detection device 19 is amplified with a remarkably high gain before the output is A/D converted and taken into the camera microcomputer 11. This is because the output of a hand fluctuation component detected by the blur detection device 19 is extremely small. There is a possibility that the signal of the amplifier is saturated by the offset component superimposed on the signal. Therefore, for the purpose of preventing the overflow, the signal offset of the blur detection device 19 needs to be decreased to a certain degree before the amplification.

In the constitution of FIG. 1, the offset component $V_1$ decreases to $V_2$, and this can prevent the signal of the amplifier/low-pass filter 116b from being saturated.

The actual output of the blur detection device 19 is not clear like the waveform 118 of FIG. 2A, and includes a signal by hand fluctuation like a waveform 121 shown in FIG. 2B. Therefore, at time $T_2$ an offset signal $V_3$ remains by the hand fluctuation output at the time the automatic reset circuit 116h stops the output of the clock signal (waveform 122), but it is a sufficiently small offset as compared with the initial offset component $V_1$, and the signal overflow on the analog signal processing circuit 116 can be prevented.

In the offset component removal by the above-described system, since, different from the conventional DC cut filter, no large-capacity capacitor is necessary, the circuit is considerably miniaturized. As another merit, since there is no time constant circuit constituted of a capacitor and a resistance, no deterioration is caused in the blur prevention precision by the phase deviation in the hand fluctuation frequency range.

In FIG. 1 the analog signal processing circuit 116 is provided with the reset terminal 116i operable from the outside, and reasons for this will be described.

In general the output of the blur detection device is extremely delicate, and the offset component superimposed on the signal changes with a slight change of the supplied power supply voltage. Moreover, the camera includes therein zoom drive (including an operation of driving the lens from the depressed barrel position to the delivered position), strobe zoom drive, focus adjustment drive, shutter drive and many other actuators and many elements such as a strobe charge whose operation varies the power supply voltage.

The power supplied to the blur detection device is considerably stabilized by a regulator and a DC/DC converter, but is slightly changed by the operations of the actuators and the strobe charge, which varies the signal offset of the blur detection device. Therefore, in this case, when the output of the clock signal is stopped at time $T_2$, as described with FIG. 2, the offset component cannot correctly be calculated.

Moreover, while the actuator is driven, the blur detection device also detects a drive blur. Therefore, no correct offset component can be obtained.

To solve the problem, the automatic reset circuit 116h is operated to transmit the clock signal to the clock gate 116e. When at time $T_2$ the output of the clock signal tries to be stopped, but the other camera actuators are operated, or a strobe capacitor is charged, then the camera microcomputer 11 in turn transmits the similar clock signal to the clock gate 116e via the reset terminal 116i. Thus the clock signal is continuously output until the operations of the actuators and the charging of the capacitor are completed. Subsequently, when the actuator operations and the capacitor charging are completed, the camera microcomputer 11 stops transmitting the clock signal to the clock gate 116e. In this manner, when the actuator operation, the strobe charging, and the like are performed during offset removal, the offset removing operation is continued at least until they are completed.

Therefore, the offset component superimposed on the output of the blur detection device 19 is removed while the other camera actuators are not operated and while the strobe capacitor is not charged. Therefore, an accurate offset removing can be performed.

As a similar way of thinking, during operation of camera operation members such as a zoom lever and a mode dial, much hand fluctuation is generated. In this case, at time $T_2$ the changing of a differential signal to the differential unit 116a is stopped, then the offset component cannot accurately be removed. Therefore, when blur is applied to the camera by operating the camera operation member (excluding a case where, for example, 0.3 second elapses immediately after the operating member is operated, and the half depressed release button is held for a long time), clock signal is continued.

Specifically, when at time $T_2$ the automatic reset circuit 116h tries to stop output of the clock signal and the camera operation member is operated, the camera microcomputer 11 transmits the clock signal to the clock gate 116e via the reset terminal 116i, instead of the automatic reset circuit 116h. When the operation of the camera operation member is completed (0.3 second elapses after the operating member is operated, and another operating member is not operated yet), the output of the clock signal is stopped.

This can prevent the case where the offset component of the blur detection device 19 is incorrectly removed because of the blur during the operation of the operating member.

As apparent from the above description, it requires a certain degree of time (e.g., 0.1 second) until the analog signal processing circuit 116 correctly removes the offset component superimposed on the blur detection device 19. In a certain photographing situation, by eliminating the standby time, an action for the shutter chance can be strengthened. This aspect will be described hereinafter.

The hand fluctuation applied to the camera becomes inconspicuous when the camera photographing focal distance is short and when the shutter speed is fast. Therefore, the blur prevention precision does not need to be remarkably high, and a certain degree of the offset component on the blur detection device 19 does not produce any large problem. Therefore, in this case the end (time $T_2$) of the clock signal of the automatic reset circuit 116h is advanced to start up the blur prevention system earlier.

The camera microcomputer 11 detects a zoom state and a shutter speed state during photographing. For example, when a zoom is wide, or the shutter speed is fast, and the offset removal precision of the blur detection device 19 does not have to be high, then in response to the half depressed release button 113, the clock signal of the automatic reset circuit 116h is prevented from being transmitted to the clock gate 116e.

For example, for the clock signal of the automatic reset circuit 116h started by turning on the camera main switch 114, when the release button 113 is half depressed, a signal having a reverse phase to the clock signal is applied to the reset terminal 116i so that the change of the differential output to the differential unit 116a is forced to be stopped.

As apparent from FIGS. 2A and 2B, when the clock signal is stopped before the time $T_2$, the offset component superimposed on the blur detection device 19 cannot sufficiently be removed. However, under the photographing conditions, since the blur prevention precision is not demanded, no large problem arises, and conversely priority can be given to the shutter chance.

When there is a time $T_2$ or more from when the main switch 114 is turned on until the release button 113 is half depressed, needless to say, the offset can sufficiently be removed, and a high blur prevention precision can be obtained.

Furthermore, when the focal distance is long and the shutter speed is slow, a higher blur prevention precision is demanded. In this case, from the time $T_2$ when the clock signal of the automatic reset circuit 116h ends, the camera microcomputer 11 transmits a clock signal to the clock gate 116e. Until a predetermined time (e.g., 0.2 second) elapses, the change of the differential output to the differential unit 116a is continued, the offset is sufficiently removed, and a high blur prevention precision is obtained.

There are other cases where the blur prevention precision is more necessary than usual, for example, a case where a posture in which the camera is set up differs. Specifically, when the camera is set up in a vertical position, more blur is applied as compared with when the camera is set up in a transverse position, and the blur prevention precision needs to be raised. In this case, for sufficient offset removal, on and after the time $T_2$, the change of the differential output to the differential unit 116a is continued for the predetermined time.

Moreover, for example, when the portrait mode is selected as the camera photographing mode, the photograph precision is requested to be high and sufficient offset removal is therefore necessary. Likewise in this case, on and after the time $T_2$, the change of the differential output to the differential unit 116a is continued for the predetermined time. Conversely when the sport mode is selected, priority is given to the shutter chance and therefore the offset calculation is stopped by half depressing the release button 113 in the same manner as described above.

At a low ambient temperature during photographing, since the blur detection device 19 is cooled, a time is lengthened until the offset of the waveform 118 in FIG. 2A is converged to $V_1$, and it is therefore desirable to also lengthen a time until the offset removal. Therefore, when the temperature during photographing is still low even after the stop of the clock signal output by the automatic reset circuit 116h, the camera microcomputer 11 in turn transmits the clock signal to the clock gate 116e for a while to prevent the offset removing precision from being deteriorated.

As described above, since the camera microcomputer 11 finely supplements/controls the output of the automatic reset circuit 116h in accordance with the camera photographing conditions, the blur prevention precision is maintained, and the shutter chance is secured.

Figure 3:
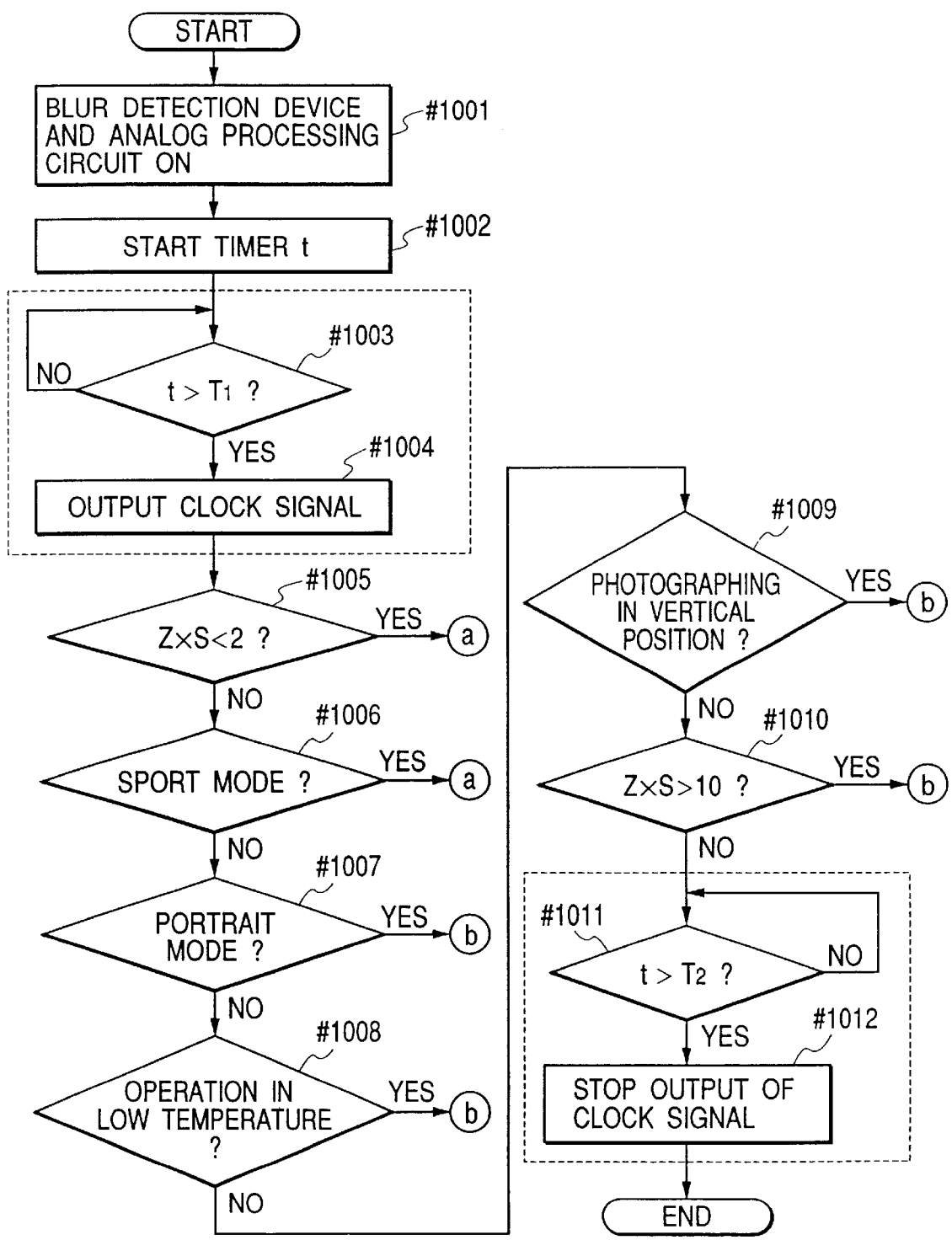
FIG. 3 is a flowchart showing a part of a camera operation according to the first embodiment of the present invention.
Figure 4:
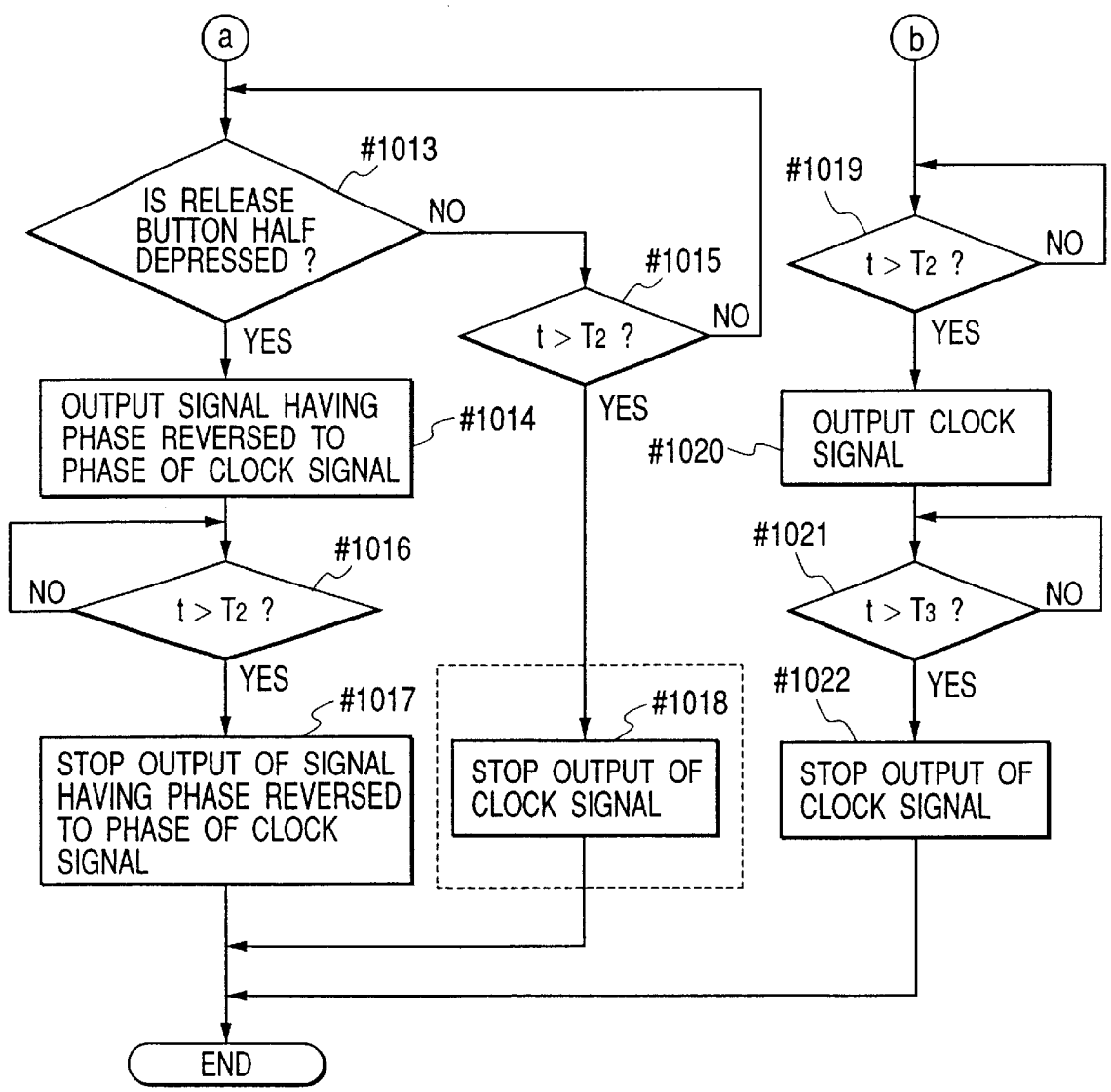
FIG. 4 is a flowchart showing the operation continued from FIG. 3.

FIGS. 3 and 4 are flowcharts showing the operation of the camera microcomputer 11, and a flow of the operation starts when the camera main switch 114 is turned on (even when the blur prevention switch 18 is off, the flow starts because the blur detection device 19 and the analog processing circuit 116 stand ready for driving).

In step #1001, the camera microcomputer 11 turns on the power of the blur detection device 19 and the analog processing circuit 116 to start the operation. Subsequently, in a next step #1002, an inner timer is started. In step #1003, a wait time is $T_1$ (e.g., 0.1 second). This is necessary because as described with FIG. 2A, when the blur detection device 19 is initially driven, there is a large variation of the offset component and an extraction error of the offset component needs to be avoided. In a subsequent step #1004, the automatic reset circuit 116h starts outputting the clock signal to the clock gate 116e.

Additionally, the steps #1003 and #1004 surrounded by a broken line are steps to which the analog processing circuit 116 starts operating and then automatically advances, and are not steps which are controlled by the camera microcomputer 11. (When the power is applied to the analog processing circuit 116, without the camera microcomputer 11, the analog processing circuit 116 can alone start the offset removing operation after $T_1$.)

Subsequently, in step #1005, a product of a photographing focal distance Z and a shutter speed S is obtained. When the product is less than "2", the process flows to step #1013 of FIG. 4. For example, when the focal distance is 200 mm, and the shutter speed is ⅙₀ second, the product is "3.3". When the shutter speed is ½₁₂₅ second, the product is "1.6". In the former case, since there is a possibility of image deterioration by hand fluctuation, the process flows to a usual step #1006. In the latter case, since there is a relatively small possibility of image deterioration by hand fluctuation, the process flows to step #1013 in which the shutter chance has priority over the blur prevention precision.

In step #1006 it is judged whether or not the camera photographing mode is a sport mode. If it is the sport mode, the process flows to the step #1013 of FIG. 4 to give priority to the shutter chance. If not, the process flows to step #1007. In the step #1007, it is judged whether or not the camera photographing mode is a portrait mode. When it is the portrait mode, in order to give priority to image quality and enhance the blur prevention precision, the process flows to step #1019 of FIG. 4 to take time in the offset removal. If not, the process flows to step #1008.

In the step #1008, an ambient temperature state during photographing is examined. In a low temperature, since a time for stabilizing the signal of the blur detection device 19 is lengthened, the process flows to the step #1019 to take time in the offset removal; otherwise the process flows to step #1009. In the step #1009, when the camera is vertically positioned from the posture of the camera, hand fluctuation is increased. Therefore, the process flows to step #1019 to enhance the blur prevention precision; otherwise the process flows to step #1010. The step #1010 is similar to the step #1005. When the product of the photographing focal distance and the shutter speed is larger than "10", for example, when the focal distance is 300 mm, and the shutter speed is ⅕, a high blur prevention precision is necessary. In this case, the process flows to step #1019 to enhance the blur prevention precision; otherwise the process flows to step #1011.

For conditions to advance the flow to the step #1011, a certain degree of the blur prevention precision is necessary, but a very high precision is not demanded. In this case, after the flow is on standby until the timer started by turning on the main switch 114 reaches $T_2$, it advances to step #1012. Then, in the step #1012, the automatic reset circuit 116h stops the output of the clock signal. The steps #1011 and #1012 surrounded by a broken line are not control steps of the camera microcomputer 11, but are steps automatically performed by the analog processing circuit 116 for a time after the power is turned on. Subsequently, as described above in the step #1012 the output of the clock signal is stopped, thereby ending the flow.

The flow on and after the step #1013 of FIG. 4 is continued from the step #1005 or the step #1006 and does not require the blur prevention precision very much. In the step #1013, it is judged whether or not the release button 113 is half depressed. When the release button 113 is half depressed, the process flows to step #1014; otherwise the process flows to step #1015, in which it is judged whether or not time $T_2$ elapses. When the release button 113 is not half depressed but the time $T_2$ elapses, the process flows to step #1018. When the time does not elapse, the flow returns to the step #1013.

When the release button 113 is half depressed before the time $T_2$ elapses, as described above the process flows to the step #1014, in which the camera microcomputer 11 outputs a signal having a phase reversed to a phase of the clock signal to the clock gate 116e via the reset terminal 116i. Thereby, the clock signal from the automatic reset circuit 116h is canceled by the clock signal from the camera microcomputer 11, and no clock signal is transmitted to the clock gate 116e. Therefore, at this time the offset removal of the blur detection device 19 is forcibly stopped.

Subsequently, in step #1016, the flow stands ready till time $T_2$ and advances to step #1017. In the next step #1017, the camera microcomputer 11 stops the output of the signal having the phase reversed to the phase of the clock signal. Just at this time the clock signal from the automatic reset circuit 116h stops the output, thereby ending the flow.

In the step #1015, after the time $T_2$ elapses, as described above, the process flows to the step #1018 to stop the output of the clock signal of the automatic reset circuit 116h. Specifically, the blur prevention precision is not highly necessary, but the half depressing of the release button 113 is not performed directly by turning on the camera main switch 114. In this case, the analog processing circuit 116 continues the offset removing operation, and performs a precise offset. Additionally, the step #1018 is also performed by the automatic reset circuit 116h alone, and surrounded by a broken line because it is independent of the operation of the camera microcomputer 11.

When in the steps #1007, #1008, #1009, #1010 it is determined that the blur prevention precision needs to be enhanced, as described above, the process flows to step #1019 of FIG. 4, in which the flow is on standby till $T_2$, then advances to step #1020. Subsequently, in the step #1020, the camera microcomputer 11 outputs the clock signal to the clock gate 116e via the reset terminal 116i. Just at this time, the output of the clock signal from the automatic reset circuit 116h is stopped, and instead of the automatic reset circuit 116h, the camera microcomputer 11 transmits the clock signal to the clock gate 116e, so that the analog processing circuit 116 is allowed to continue the offset removing operation.

Subsequently, in step #1021, the flow is on standby till time $T_3$ (e.g., 0.2 second from the clock signal output in the step #1020), then advances to step #1022. Then, in the step #1022, the clock signal output is stopped, thereby ending the flow.

As described above, when the process flows to steps #1013 to #1017, priority is given to the shutter chance rather than to the offset removal precision of the blur detection device 19. When the process flows to steps #1019 to #1022, priority is given to the offset removal precision of the blur detection device 19 rather than to the shutter chance. By controlling the offset removal precision of the output of the blur detection device 19 in accordance with the camera photographing conditions, a blur prevention system easy to operate can be constituted.

Here, there is considered a constitution where the analog processing circuit 116 is provided with no automatic reset circuit.

Figure 5:
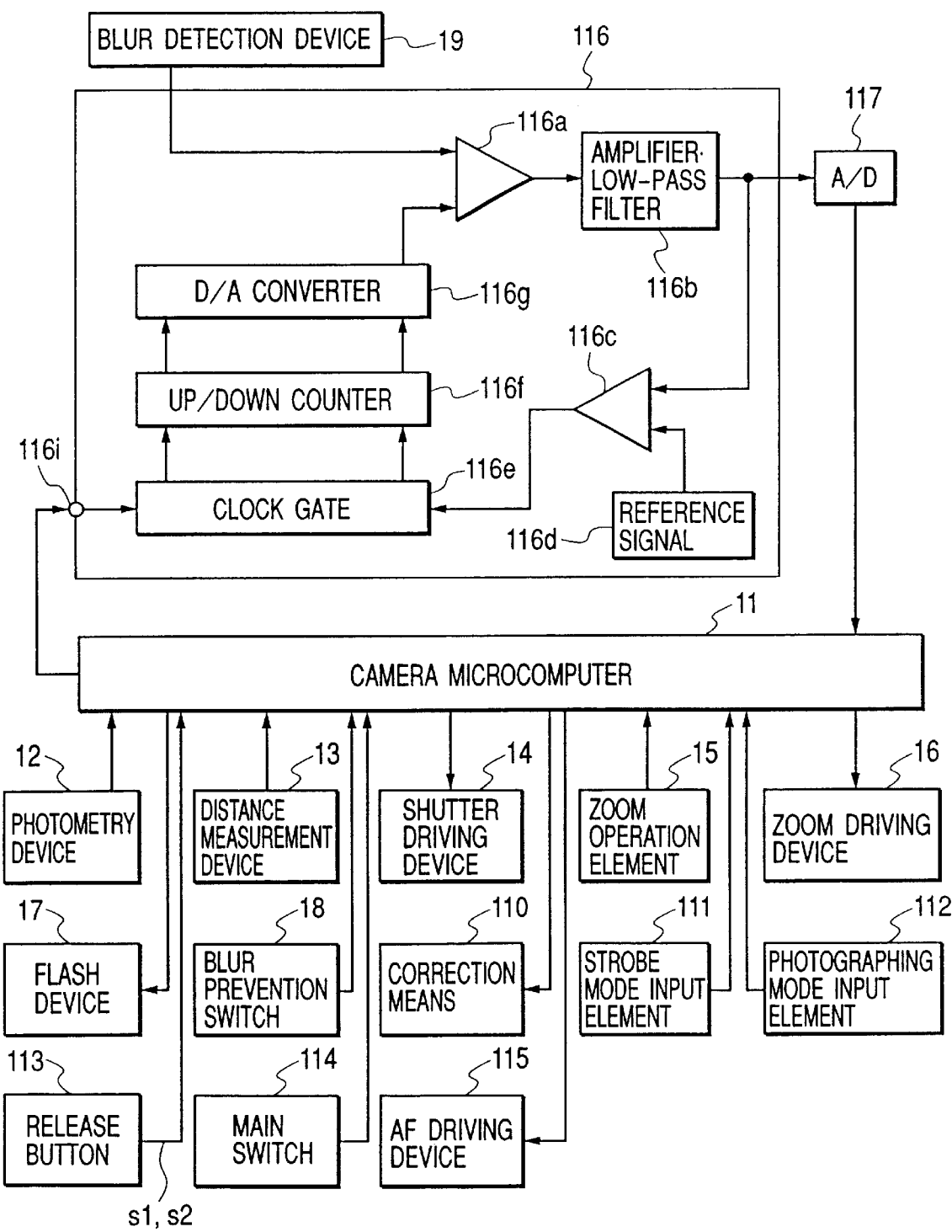
FIG. 5 is a block diagram showing another constitution example of the camera of the first embodiment of the present invention.

FIG. 5 is a block diagram showing the constitution, and in the constitution the clock gate 116e is all controlled by the clock signal from the camera microcomputer 11.

Figure 6:
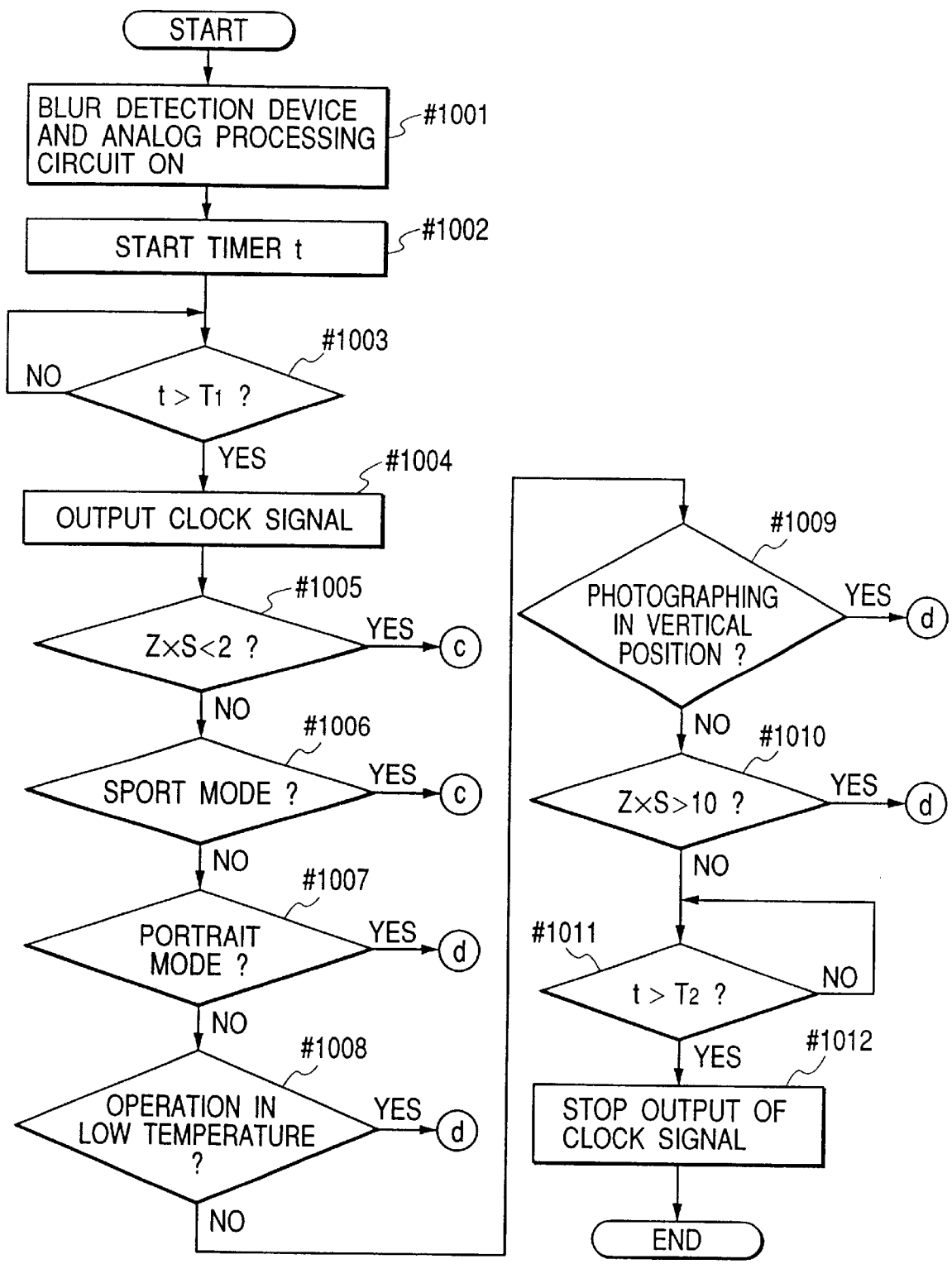
FIG. 6 is a flowchart showing a part of the operation in the constitution of FIG. 5.
Figure 7:
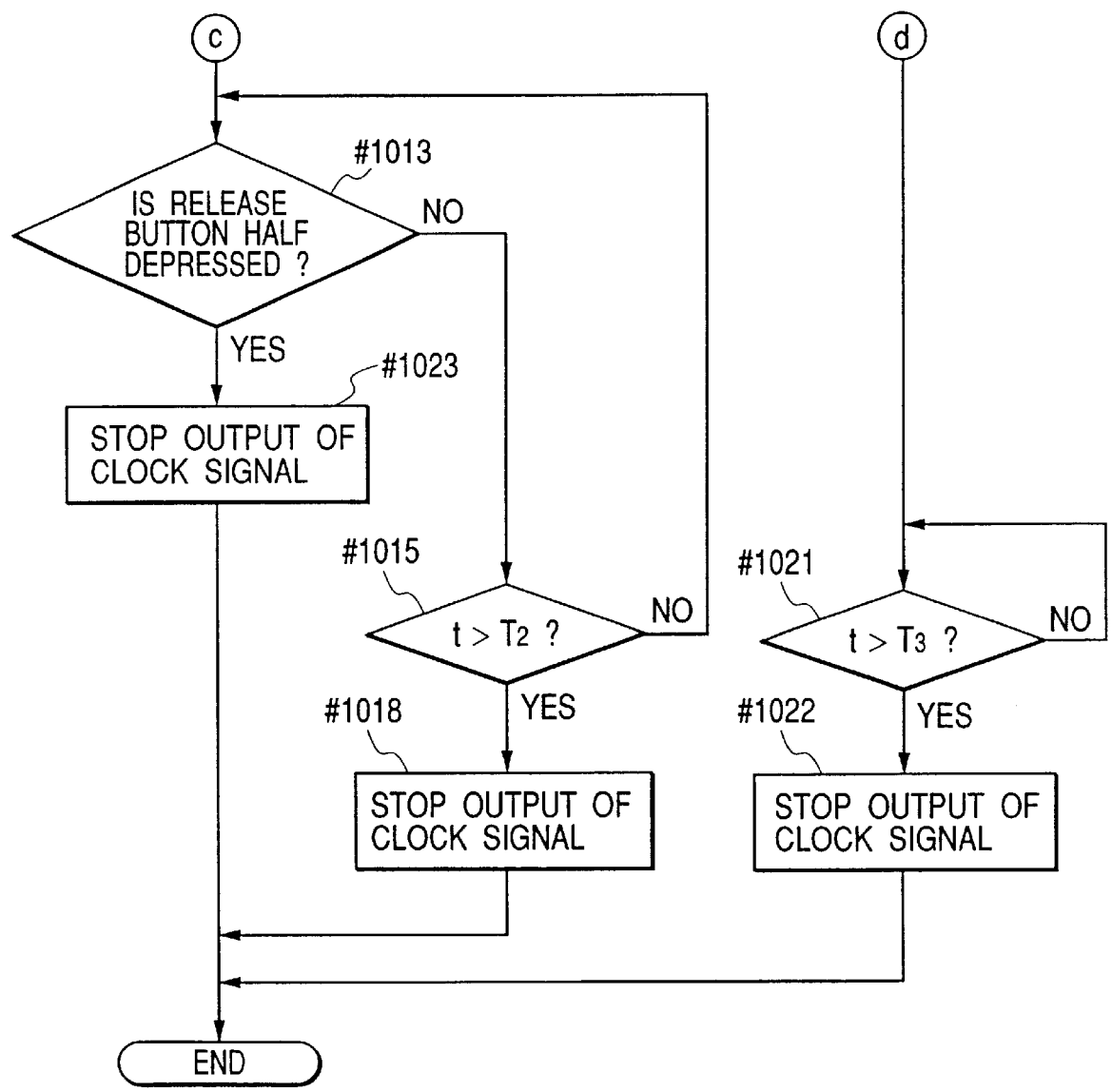
FIG. 7 is a flowchart showing the operation continued from FIG. 6.

FIGS. 6 and 7 are flowcharts in the constitution, and basically the same as FIGS. 3 and 4. However, since the steps surrounded by the broken lines in FIGS. 3 and 4 are performed in response to instructions from the camera microcomputer 11, the broken lines are omitted.

Moreover, in FIG. 4, in the steps #1014, #1016, #1017, the operation of canceling the clock signal from the automatic reset circuit or the like is performed, but in FIG. 7 the operation is unnecessary. Therefore, in step #1023, the output of the clock signal from the camera microcomputer 11 is stopped.

Furthermore, in FIG. 4, in the steps #1019, #1020, in order to perform the offset removing operation even after the output of the automatic reset circuit is stopped, the camera microcomputer 11 performs the operation of supplementing the clock signal. However, in the flow of FIG. 7, the output of the clock signal from the camera microcomputer 11 is merely prolonged (till the time $T_3$).

As described above, every control can be performed by the camera microcomputer 11 and simplified, but the analog processing circuit 116 of FIG. 1 is provided with the automatic reset circuit 116h. The constitution can therefore be mounted or applied onto even an apparatus having no microcomputer. In an apparatus from which the microcomputer is omitted to simplify the mechanism and reduce costs, or an apparatus in which a low-performance microcomputer is used, the analog processing circuit 116 cannot be controlled on the side of the microcomputer. During application to such apparatus, the automatic offset removal function by the automatic reset circuit is extremely convenient. Therefore, in the constitution of FIG. 1 the analog processing circuit is provided with the automatic reset circuit.

SECOND EMBODIMENT

In the above-described first embodiment, the blur detection device 19 and the analog processing circuit 116 are separate components. However, since both components are elements necessary for application of blur detection, they may be combined into one for compact construction and easy operation.

Figure 8:
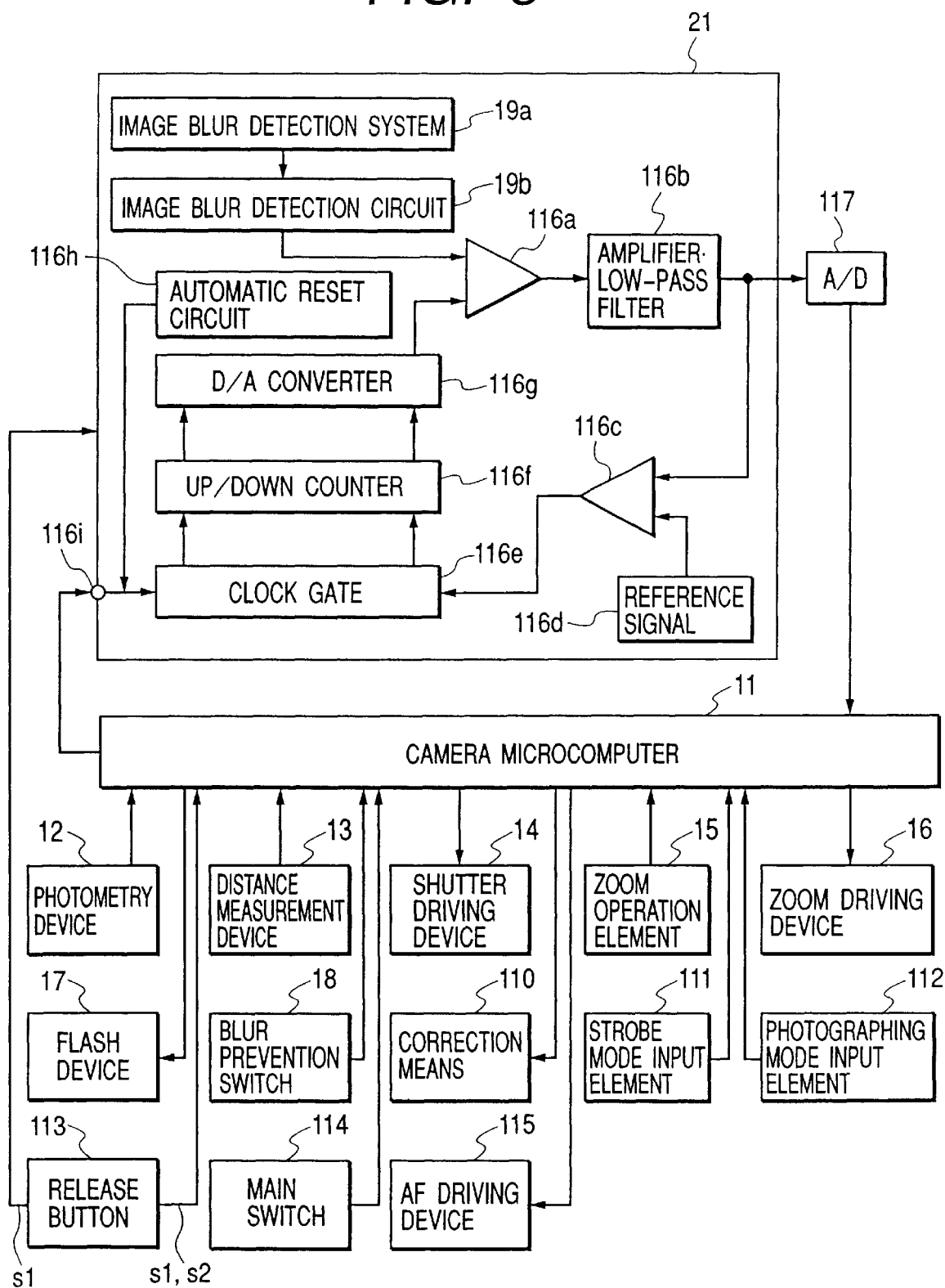
FIG. 8 is a block diagram showing the camera main portion constitution according to a second embodiment of the present invention.

FIG. 8 is a block diagram showing the camera main portion constitution according to a second embodiment of the present invention. As shown in the drawing, the blur detection device 19 and the analog processing circuit 116 of the first embodiment are combined into one unit as a blur detection unit 21.

In FIG. 8, the blur detection device 19 is constituted of an image blur detection system 19a and an image blur detection circuit 19b. For example, when the vibratory gyro is used as the blur detection device, the image blur detection system 19a is a vibrator, and the image blur detection circuit 19b is a portion for performing signal processing in which a signal having Coriolis force detected by the vibrator is detected in synchronization with a vibrating frequency of the vibrator and converted to an angular speed. Subsequently, the image blur detection circuit 19b and the analog processing circuit of the first embodiment are integrated into one package, and the image blur detection system 19a is disposed in the vicinity, so that one unit is constructed.

Moreover, the second embodiment is different from the first embodiment in that a signal indicative of a half depressed release button (s1 on) is transmitted to the blur detection unit 21 from the release button 113.

Furthermore, in the previous embodiment the automatic reset circuit 116h generates the clock signal slightly behind the turning-on of the power supply, and the output of the clock signal is stopped after the predetermined time. In the second embodiment, however, instead of generating the clock signal in response to the turning-on of the power supply, when a signal indicating the turning-on of s1 with the half depressed release button 113 is transmitted on the blur detection unit 21, the automatic reset circuit 116h transmits the clock signal to the clock gate 116e for the predetermined time (when the power supply is turned on in the blur detection unit 21, both the image blur detection system 19a and the image blur detection circuit 19b both start blur detection).

In a certain case, a large blur is generated between the operation of turning on the camera main switch 114 and the operation of directing the camera to the subject. In this case, because of the blur generated when the camera is set up, and the like, it becomes difficult to accurately remove offset signals.

The operation of half depressing the release button 113 is performed when the subject is targeted to perform photometry and distance measurement. In general, after the operation no large blur is generated. Therefore, the blur detection is started by the camera main switch 114 and stabilized beforehand, and the offset signal removing operation is performed from when the release button 113 is half depressed.

Specifically, the blur detection operation is already stabilized. Therefore, at the same time the signal of the half depressed release button 113 is transmitted on the blur detection unit 21, the automatic reset circuit 116h can output the clock signal to the clock gate 116e. Subsequently, after the predetermined time (e.g., 0.2 second) elapses, the output of the clock signal may be stopped to end the offset signal removing operation.

It has been described that when the release button 113 is half depressed, a large blur is scarcely generated. In actuality, however, to perform pre-focusing operation, while the release button 113 is half depressed, camera framing is changed. Therefore, there is a possibility that a large blur is transmitted during the offset signal removing operation.

To solve the problem, in the second embodiment, the offset signal removing operation is started from when the release button 113 is half depressed, but subsequently the offset signal removing operation is continued until the blur falls within a constant amount.

A camera fluctuation signal is transmitted to the camera microcomputer 11 from the blur detection unit 21. Immediately after the release button 113 is half depressed, the offset signal is not sufficiently removed, and accordingly accurate blur information cannot be obtained. However, a relatively large blur generated by camera framing operation can be detected. Among the signals transmitted to the camera microcomputer 11 from the blur detection unit 21, a hand fluctuation frequency signal (e.g., a signal of 1 to 5 Hz) is separated with a band-pass filter, and the like. When the signal exceeds the predetermined amount, it is judged that the framing operation is being performed, and the offset signal removing operation is continued.

Additionally, the circuit can easily be constituted by digital signal processing in the camera microcomputer 11. However, the circuit may be constituted of an exclusive analog circuit before input to camera microcomputer, or disposed in the blur detection unit 21.

Figure 9:
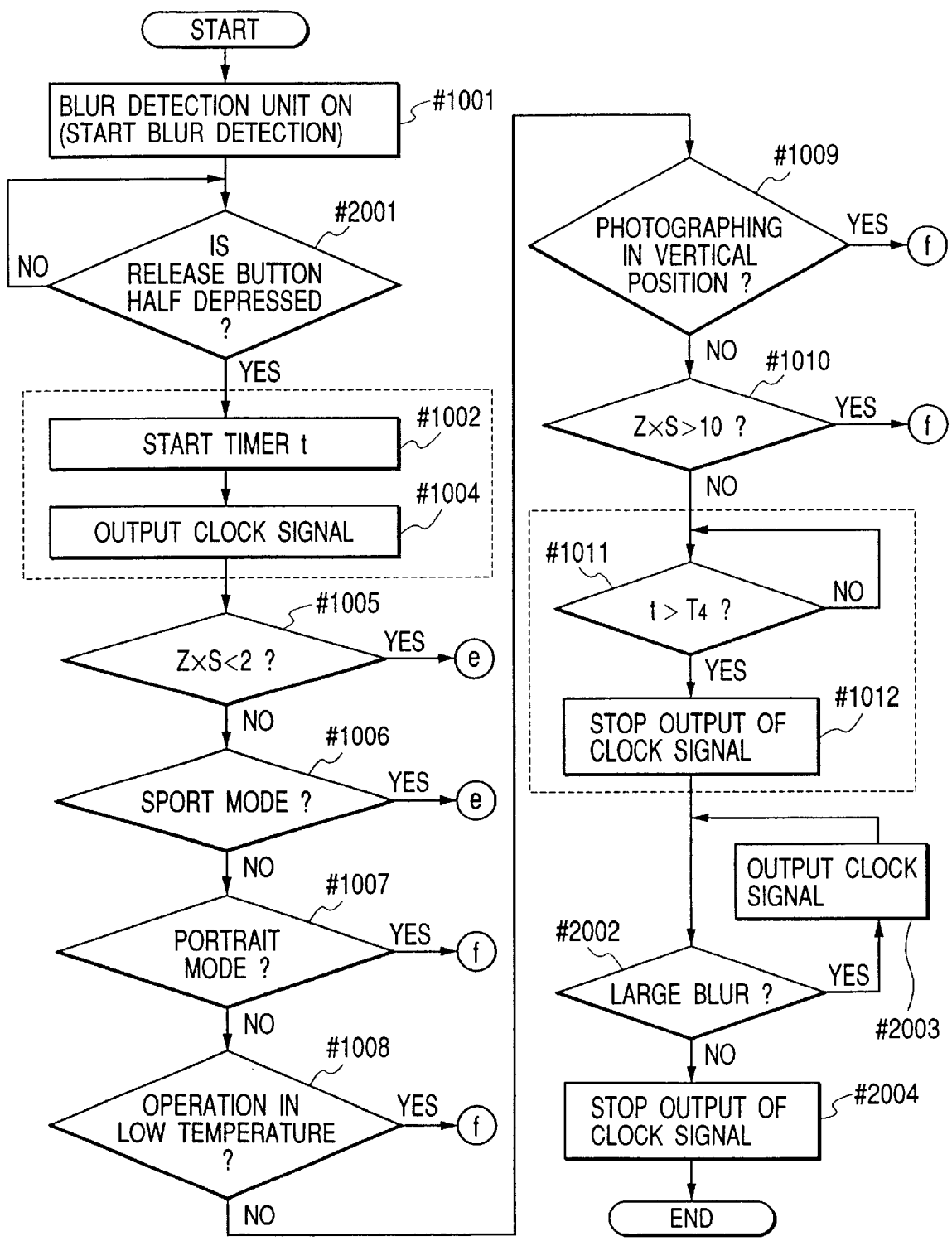
FIG. 9 is a flowchart showing a part of the camera operation according to the second embodiment of the present invention.
Figure 10:
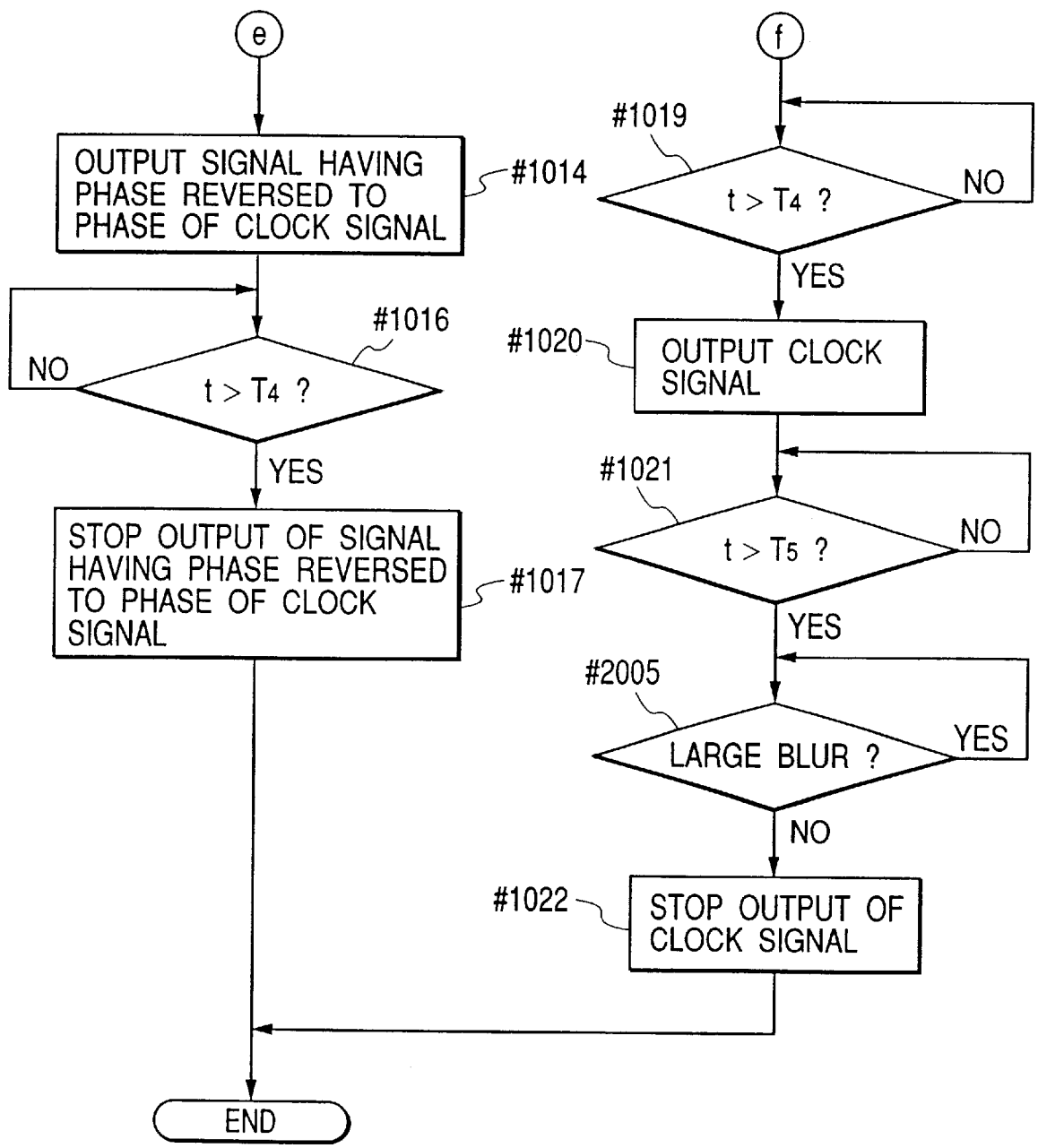
FIG. 10 is a flowchart showing the operation continued from FIG. 9.

FIGS. 9 and 10 are flowcharts showing the above-described operation, and different from FIGS. 3 and 4 in that in step #1001 the blur detection unit 21 is started, the process flows to step #2001 after the blur detection is started, and the flow stands ready until the release button 113 is half depressed. Subsequently, in the step #2001, when the release button 113 is half depressed, the process flows to step #1002 to start the inner timer. In the second embodiment, the step #1003 is omitted. When the timer is started, in the next step #1004 the clock signal is generated from the automatic reset circuit 116h. Thereafter, the operation is the same as in FIG. 3 until the step #1012.

In the step #1012 after the clock signal output the predetermined time elapses and the output of the clock signal from the automatic reset circuit 116h is stopped. The flow then advances to step #2002, in which it is judged whether or not the blur is large. When the blur is large, the process flows to step #2003, in which the camera microcomputer 11 outputs the clock signal to the clock gate 116e via the reset terminal 116i to continue the offset signal removing operation. Moreover, when the blur is small, the process flows to step #2004, in which the output of the clock signal is stopped while in the step #2003 the camera microcomputer 11 outputs the clock signal.

As apparent from the flow, by continuing the offset signal removing operation until blur is minimized (until the framing ends), DC cut precision is prevented from being deteriorated by the blur.

In the same manner, even when in step #1021 of FIG. 10 a clock output time prolonged to enhance the blur prevention precision elapses, but in step #2005 the blur is determined to be large, the flow is on standby until the blur is minimized without advancing to step #1022. Therefore, the offset signal removing operation is continued until the blur is minimized.

By changing the time of the offset signal removing operation in accordance with the blur state in this manner, a precise offset signal removal can be performed.

THIRD EMBODIMENT

In the block diagram of FIG. 8, the automatic reset circuit 116h is incorporated in the blur detection unit 21. However, the automatic reset circuit 116h can be omitted in the same manner as in the constitution example of FIG. 5.

Figure 11:
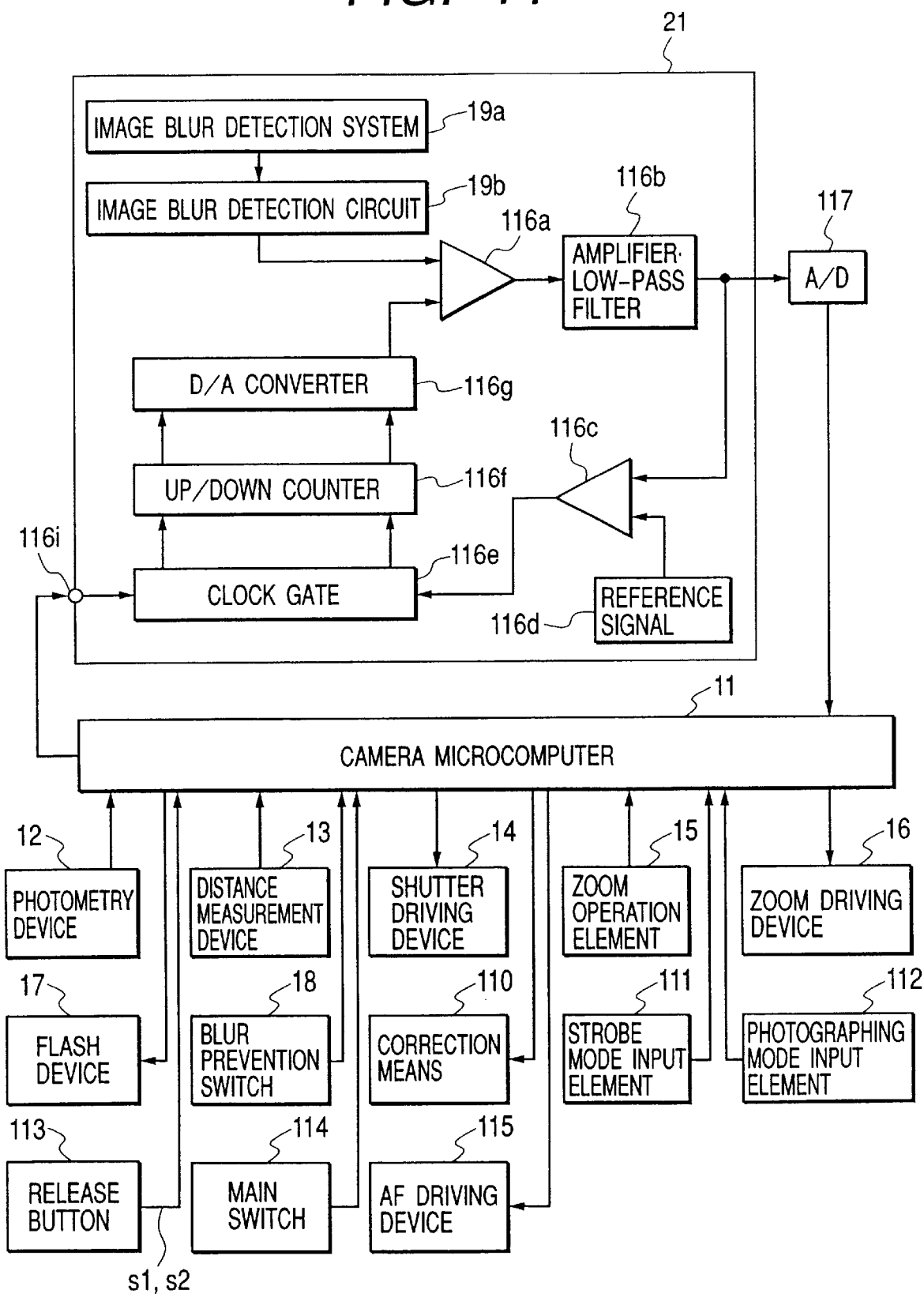
FIG. 11 is a block diagram showing the camera main portion constitution according to a third embodiment of the present invention.

FIG. 11 is a block diagram showing the camera main portion constitution according to a third embodiment of the present invention, in which the automatic reset circuit is omitted from the blur detection unit 21, and the signal transmitted directly on the blur detection unit 21 from the release button 113 is also omitted.

When the camera main switch 114 is turned on, the blur detection unit 21 starts operating to start blur detection. At this time, the offset removing operation is not started yet. Subsequently, when the signal indicative of the half depressed release button 113 is transmitted to the camera microcomputer 11, the camera microcomputer 11 outputs the clock signal to the clock gate 116e via the reset terminal 116i, and the blur detection unit 21 starts the offset removing operation.

Figure 12:
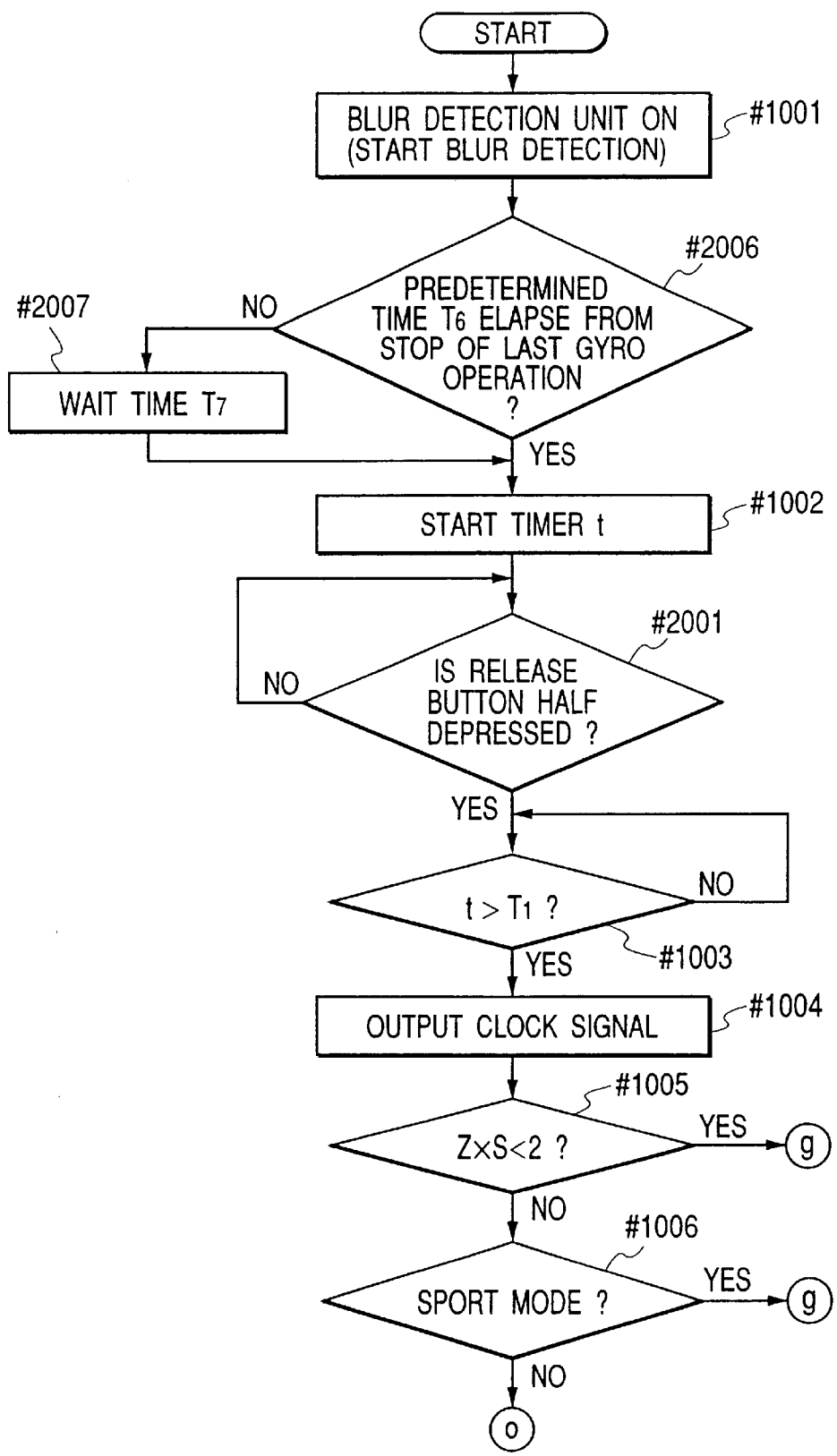
FIG. 12 is a flowchart showing a part of the camera operation according to the third embodiment of the present invention.
Figure 13:
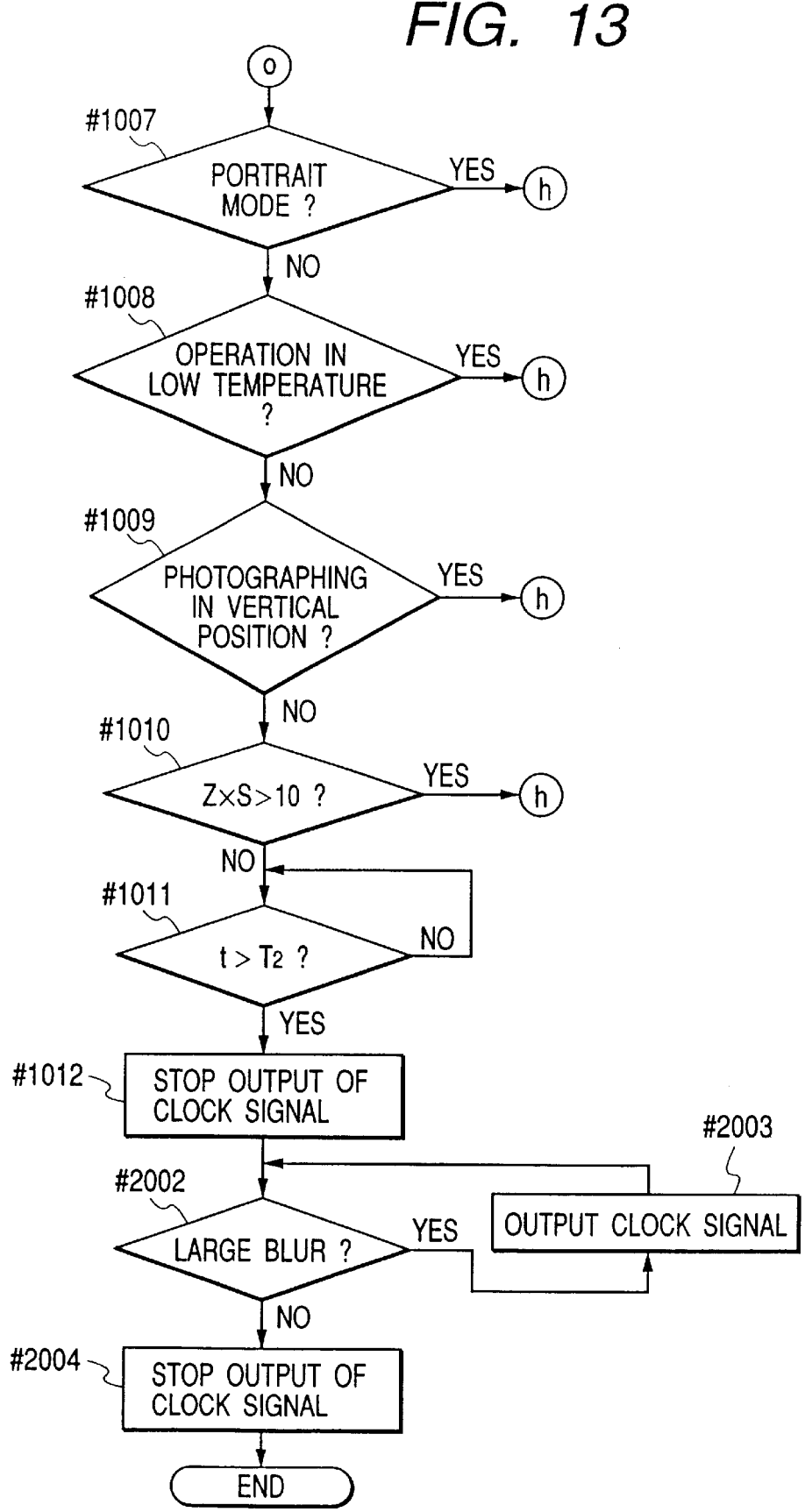
FIG. 13 is a flowchart showing the operation continued from FIG. 12.
Figure 14:
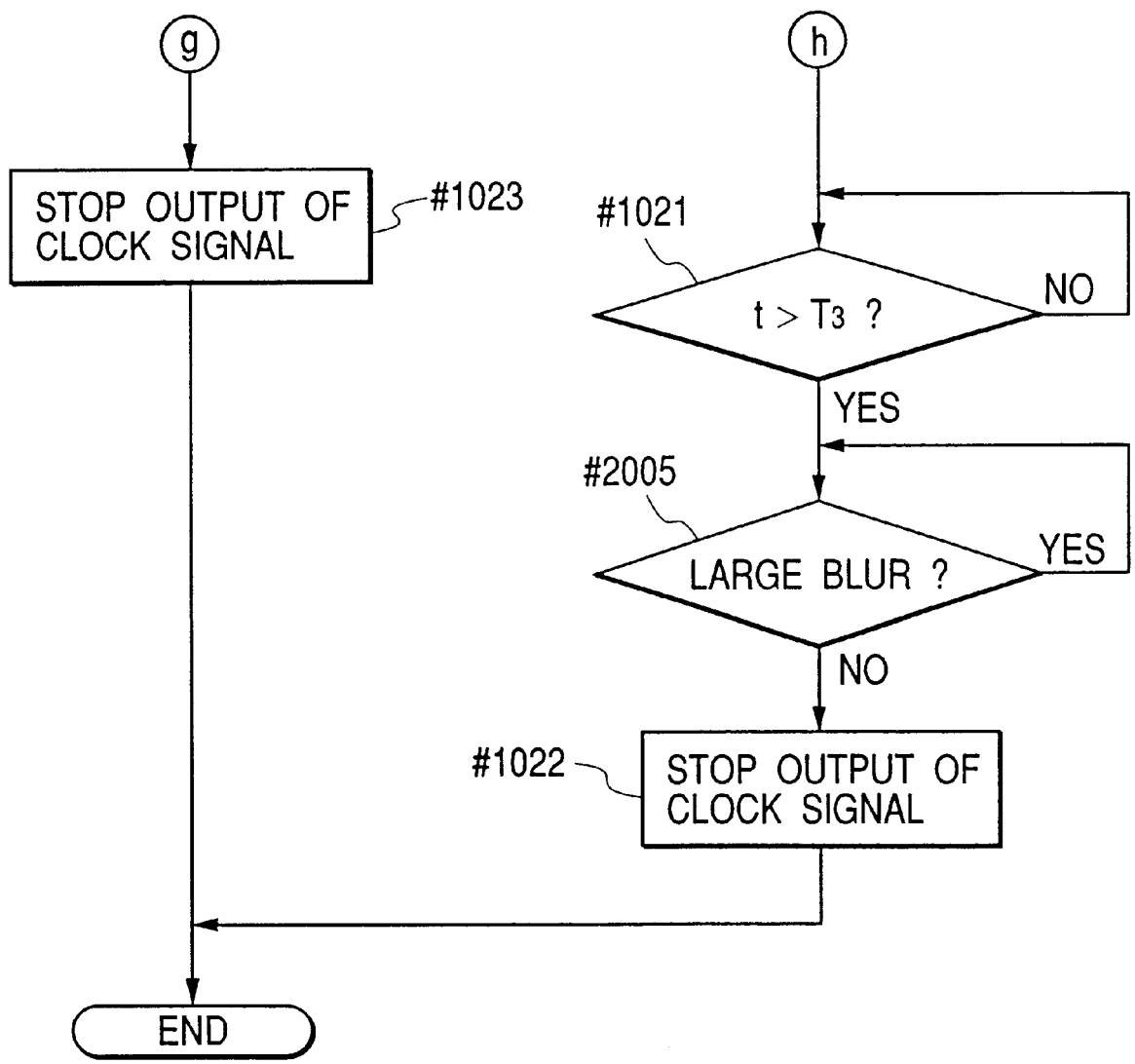
FIG. 14 is a flowchart showing the operation continued from FIG. 12 or FIG. 13.

Since FIGS. 12 to 14 are flowcharts showing the operation of the blur detection unit 21 and basically the same as FIGS. 9 and 10, only different aspects will be described.

After operation of the blur detection unit 21 is started in step #1001, the process flows to step #2006, in which a time elapsed from the end of the operation of the blur detection device 19 is referred to. When a given time ($T_6$) elapses, the flow immediately advances to step #1002. On the other hand, when the given time or more does not elapse, the process flows to step #2007. After a wait time of $T_7$ elapses, then the process flows to step #1002.

When the vibratory gyro is used as the blur detection device, the following property is a problem.

The vibratory gyro requires a relatively long time until its output is stabilized (the offset component is settled). Therefore, the vibratory gyro is operated before starting the offset removing operation, so that the output is stabilized. Therefore, when a short time elapses from when the previous operation of the vibratory gyro ends until the next operation is started, a short time is necessary until the output is stabilized. For this property, in the third embodiment, in order to start the offset removing operation even a little earlier, like in the steps #2006 and #2007, by referring to the time elapsed from the end of the previous operation, the offset removal wait time is changed.

Additionally, the determination of the elapsed time may be made by judging whether or not the vibratory gyro is again operated within a predetermined time (e.g., 4 minutes) after the operation of the vibratory gyro is completed (after the camera main switch 114 is turned off).

After in step #1003 time $T_1$ elapses on the timer, in step #1004 the camera microcomputer 11 is allowed to output the clock signal to the clock gate 116e. This constitution is also different from that of FIG. 9.

In FIG. 9, time is required from when the camera main switch 114 is turned on to start the blur detection unit 21 until the release button 113 is half depressed. Since it is considered that the output of the blur detection device is stabilized, the offset removal is performed immediately after the release button 113 is half depressed.

However, it is also expected that the camera main switch 114 is turned on while the release button 113 is half depressed. Therefore, in the third embodiment, the flow does not advance to step #1004 until the predetermined time $T_1$ elapses on the timer (step #1002 of FIG. 12) started after the main switch 114 is turned on.

Additionally, since also in step #2007 the wait time is provided, the $T_1$ of the step #1003 can be set to be shorter than $T_1$ of the step #1003 of FIG. 3 (when the vibratory gyro has just been operated, the offset removing operation can be started after a short time).

Moreover, since instead of the automatic reset circuit 116h, the camera microcomputer 11 entirely controls the clock signal, in FIG. 14 the steps #1014, #1016, #1017, #1019, #1020 of FIG. 10 are omitted in the same manner as in FIG. 7.

As described above, since the blur detection device and the analog processing circuit are constituted by the same unit, as compared with the DC cut filter having the capacitor used in the conventional device, and the like shown in FIG. 37, the reduction in size and weight is realized, and the precision in cutting the offset signal is enhanced.

FOURTH EMBODIMENT

The analog processing circuit 116 and the blur detection unit 21 can be applied not only to a still camera but also to a video camera and a binocular having a blur preventing function. Additionally, it is desirable to set an offset removal timing by a difference in apparatus.

For example, in the still camera, in order to save power, the offset removal is performed from when the release button is half depressed. Since the video camera is intended to operate for a long time, the offset removal may be performed when the main switch is turned on. Also in the video camera, by retarding the timing to start the offset removal (wait time after the blur detection device is operated), and further by lengthening the time for performing the offset removal, a precise offset removal may be performed (because in the video camera the time for performing the blur prevention is long).

Figure 15:
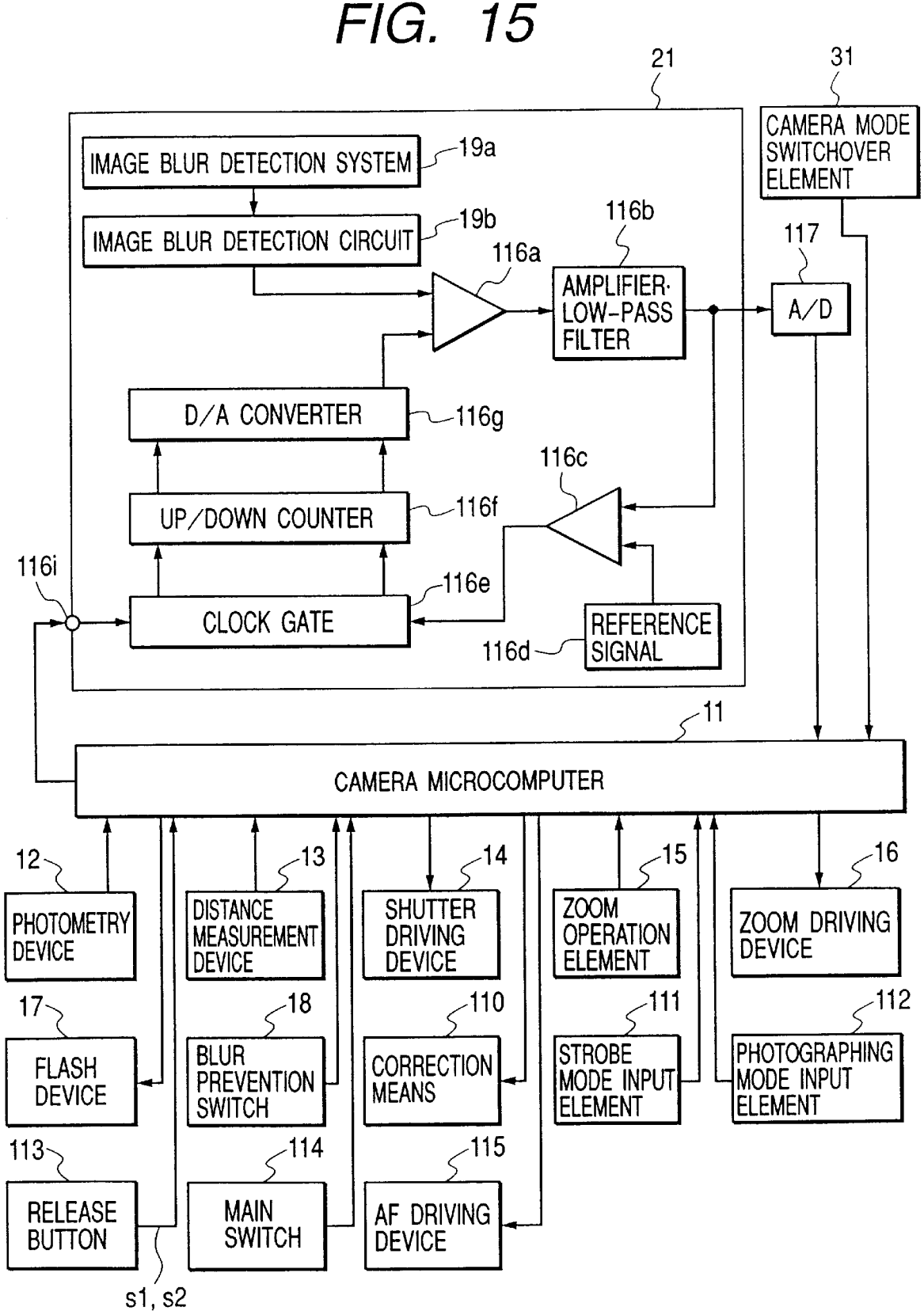
FIG. 15 is a block diagram showing the camera main portion constitution according to a fourth embodiment of the present invention.

FIG. 15 is a block diagram of the camera according to a fourth embodiment of the present invention, and is different from FIG. 11 in that there is a camera mode switch over element 31.

The camera of the fourth embodiment has two camera modes; a still camera mode and a video camera mode. In the still camera mode, when the release button 113 is depressed, photographing is performed at a predetermined shutter speed. In the video camera mode, video photographing is started by the operation of the release button 113.

Additionally, continuous photographing is performed in the video camera mode. Unless the offset superimposed onto the blur detection unit 21 is completely removed beforehand, a video screen fluctuates (operation error by the offset signal). It is preferable to automatically start the offset removal when the camera main switch 114 is turned on. In the still camera mode, it is preferable to perform the offset removal after the camera is set up for photographing. Therefore, the blur detection unit 21 is constructed to start the offset removal when the release button 113 is half depressed.

Figure 16:
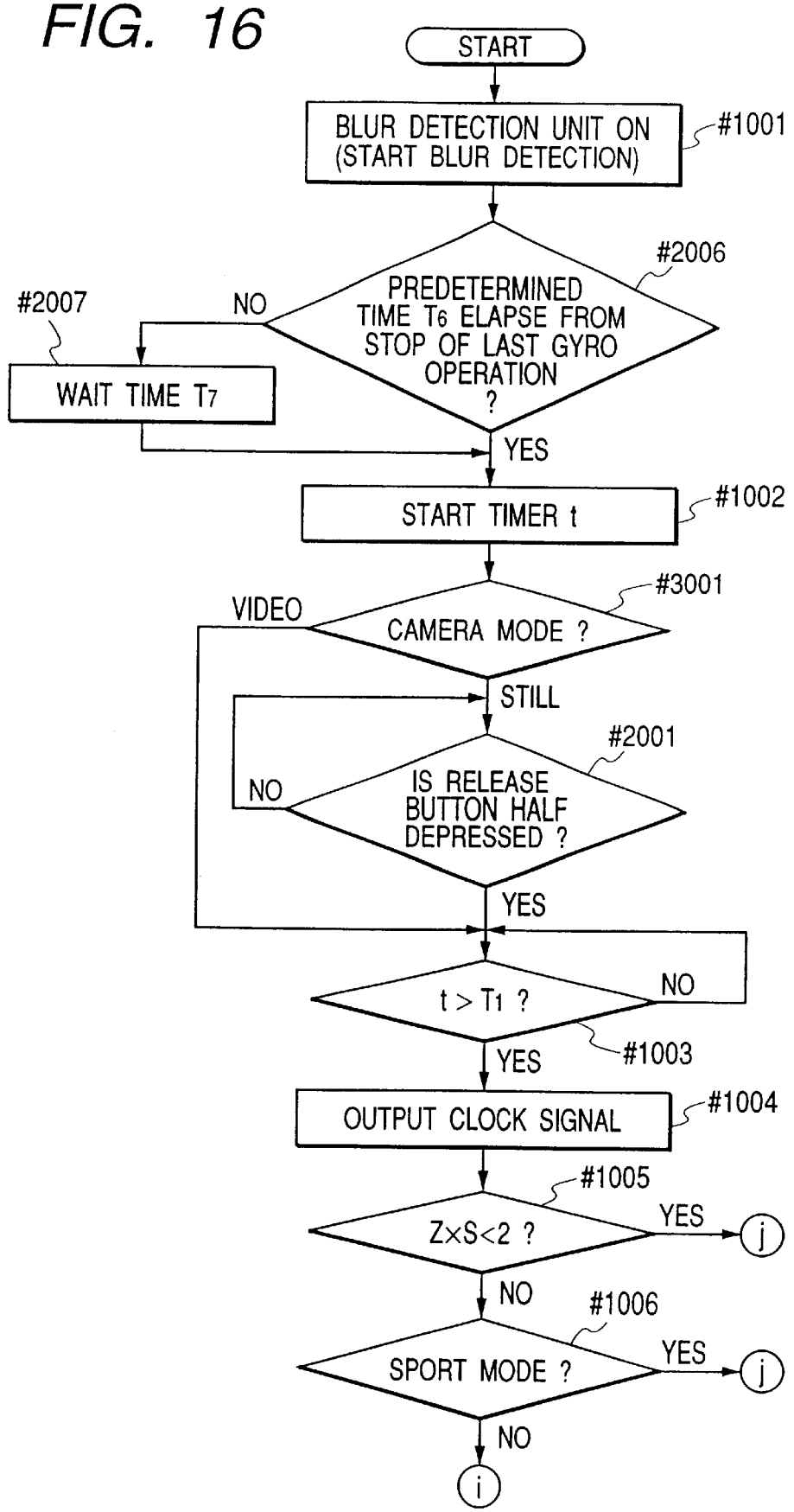
FIG. 16 is a flowchart showing a part of the camera operation according to the fourth embodiment of the present invention.
Figure 17:
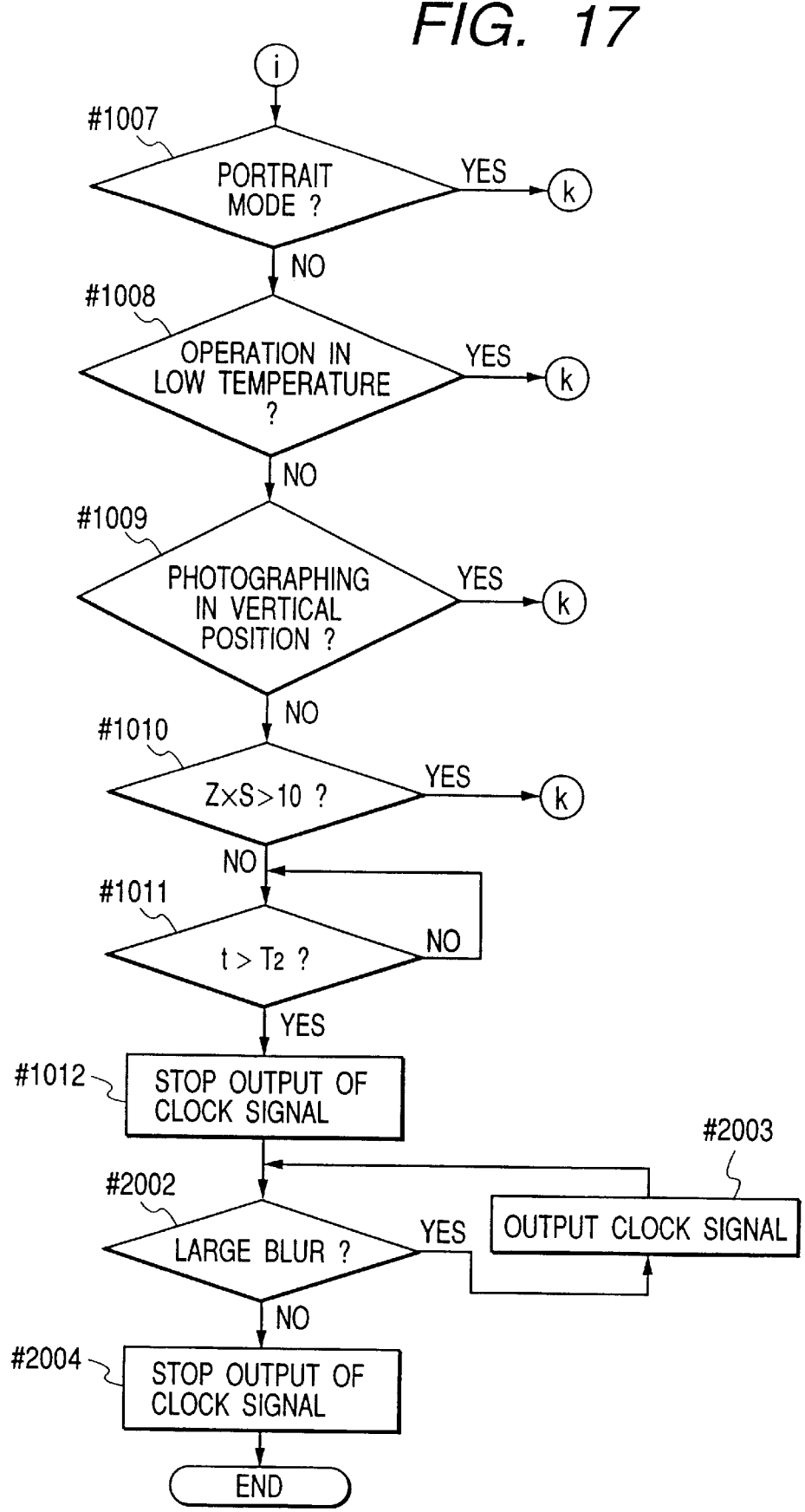
FIG. 17 is a flowchart showing the operation continued from FIG. 16.
Figure 18:
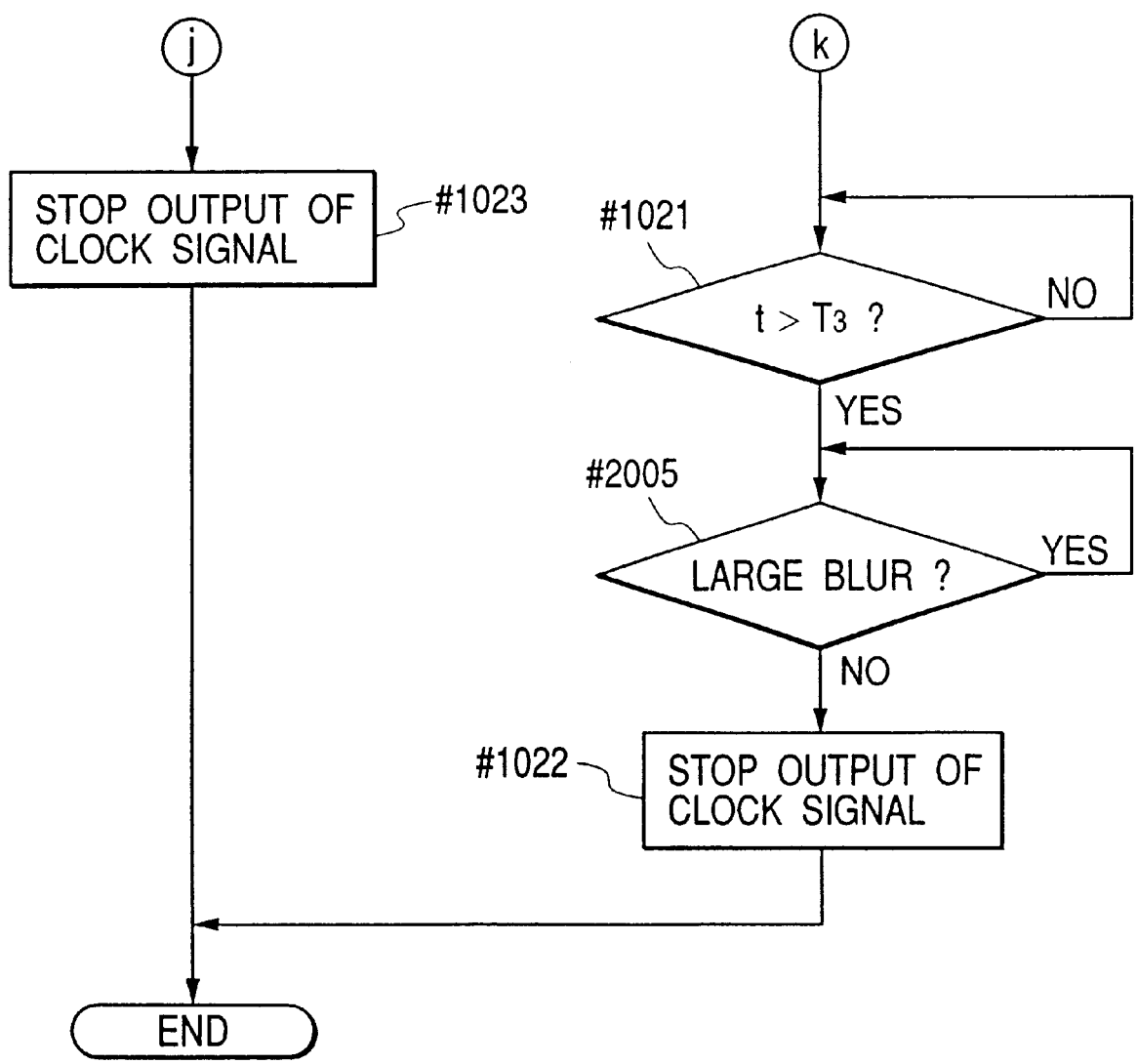
FIG. 18 is a flowchart showing the operation continued from FIG. 16 or FIG. 17.

FIGS. 16 to 18 are flowcharts for realizing the above-described operation, and different from the flowcharts of FIGS. 12 to 14 in that there is provided a step #3001. Only the flow will be described.

In the step #3001, it is judged whether the camera mode is a still mode or a video mode. In the still mode, the process flows to step #2001, in which the flow waits until the release button 113 is half depressed. Thereafter, when the release button 113 is half depressed, and time $T_1$ or more elapses after the main switch 114 is turned on, the camera microcomputer 11 allows the blur detection unit 21 to start the offset removing operation.

Moreover, when it is determined in the step #3001 that the video mode is selected, the flow skips the step #2001 and advances to step #1003. When the time $T_1$ elapses from when the main switch 114 is turned on, independent of the operation of the release button 113, the camera microcomputer 11 allows the blur detection unit 21 to start the offset removing operation.

In the video mode in which an image recording time is long, the offset component superimposed onto the signal of the blur detection unit 21 is removed before the start of the image recording. Therefore, during the image recording, the image fluctuation caused by the offset component can be suppressed. Moreover, in the still mode, since the recording time is short, the image fluctuation fails to exert a large influence on image performance. Therefore, by performing the offset removal from when the release button 113 is half depressed, the power saving can be realized, and the large blur caused during the handling of the camera can be prevented from influencing the offset removing operation.

FIFTH EMBODIMENT

Among recent optical apparatuses, there is a commercialized exchangeable lens which can be attached both to a still camera body and a video camera body. When the blur prevention system is mounted on the change lens, it is preferable to change a method of controlling the blur prevention system with the still body and the video body.

As described above, in the video camera, since the long-time image recording is performed, the precision in removing the offset component needs to be raised. However, the time until the blur prevention system is stabilized is allowable to some degree (regardless of the shutter chance).

When the exchangeable lens equipped with the blur prevention system is mounted on the video camera, a long time is taken until the offset removal is started (wait time until the output of the blur detection device is stabilized). Furthermore, a long time is also taken for performing the offset removing operation, whereby the offset removing precision is enhanced.

Figure 19:
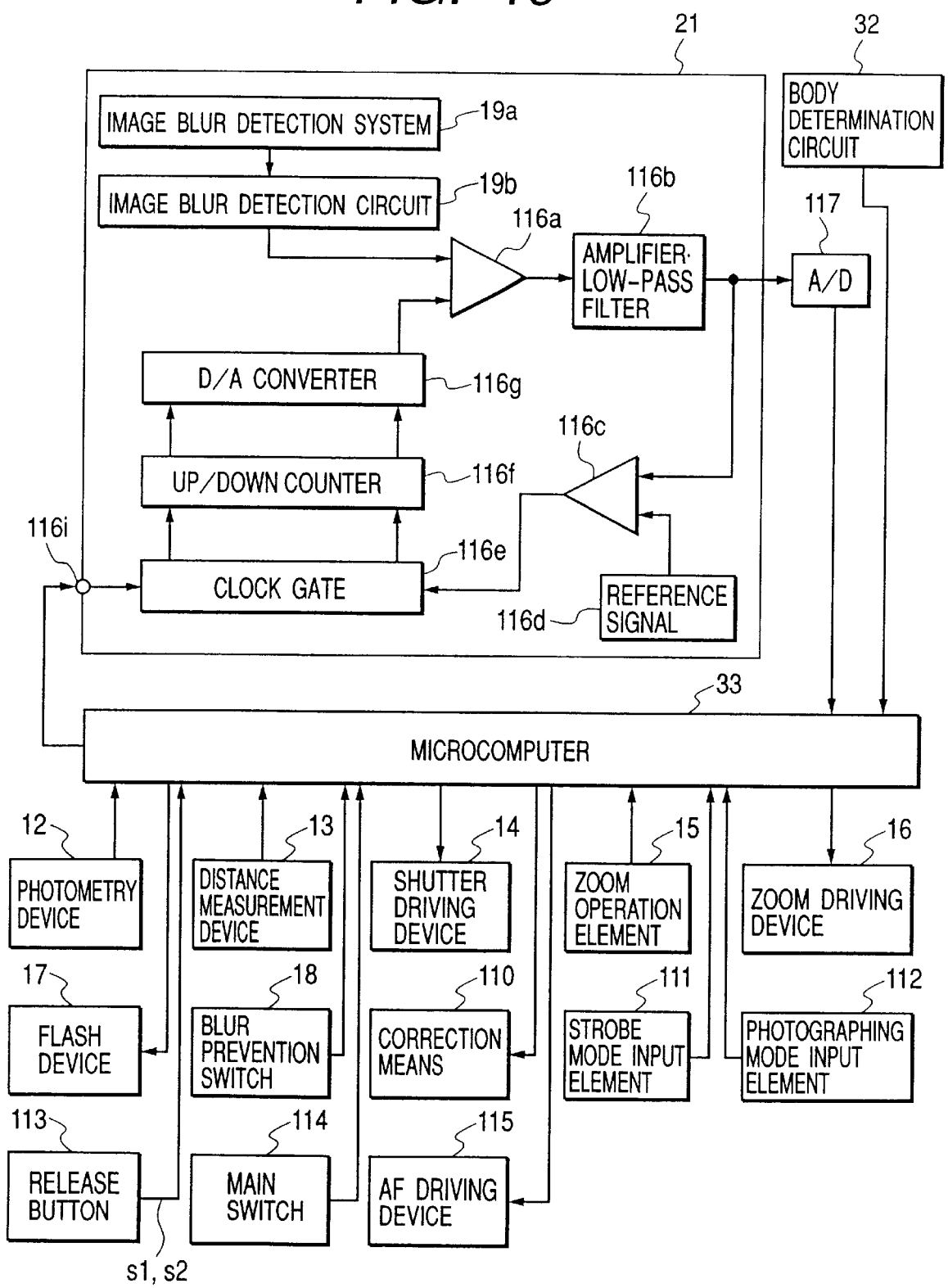
FIG. 19 is a block diagram showing the camera main portion constitution according to a fifth embodiment of the present invention.

FIG. 19 is a block diagram for realizing the above-described constitution according to a fifth embodiment of the present invention. In the drawing, a body determination circuit 32 determines whether the body to which the system is to be attached is a still camera body or a video camera body, and transmits a result to a microcomputer 33 (including a lens microcomputer and a camera microcomputer). Based on the signal, the microcomputer 33 changes the offset removing time and timing of the blur detection unit 21.

Figure 20:
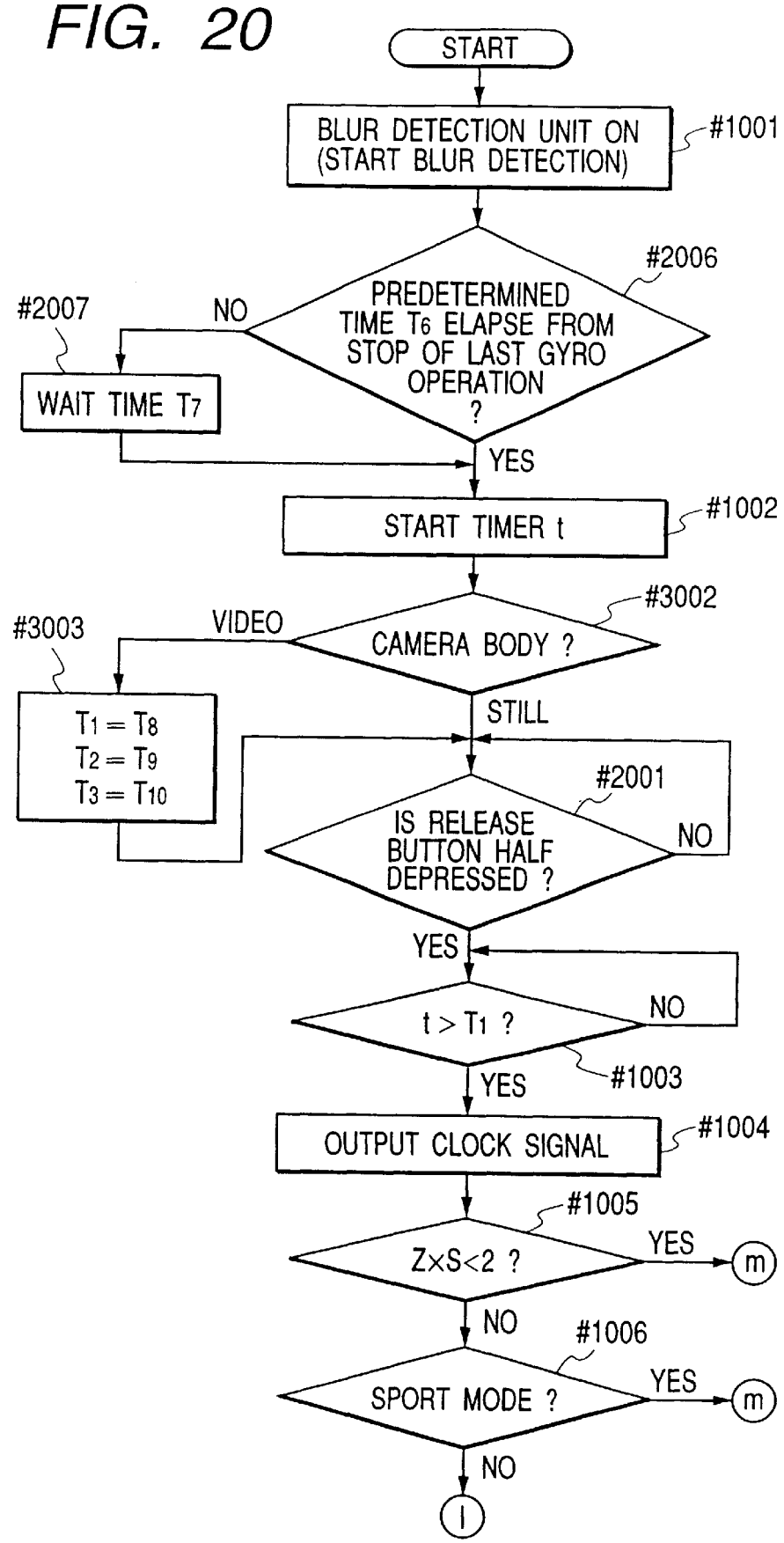
FIG. 20 is a flowchart showing a part of the camera operation according to the fifth embodiment of the present invention.
Figure 21:
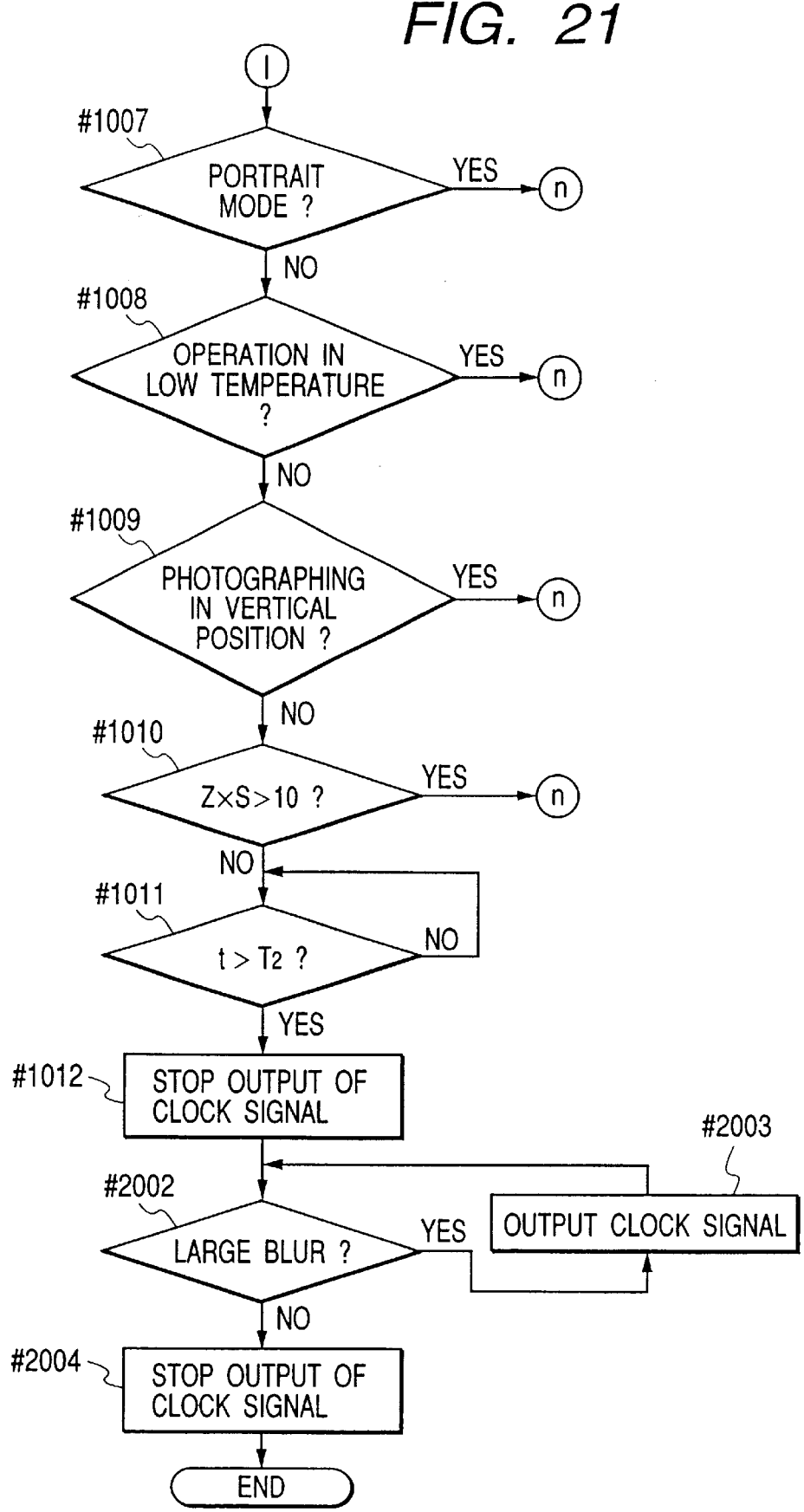
FIG. 21 is a flowchart showing the operation continued from FIG. 20.
Figure 22:
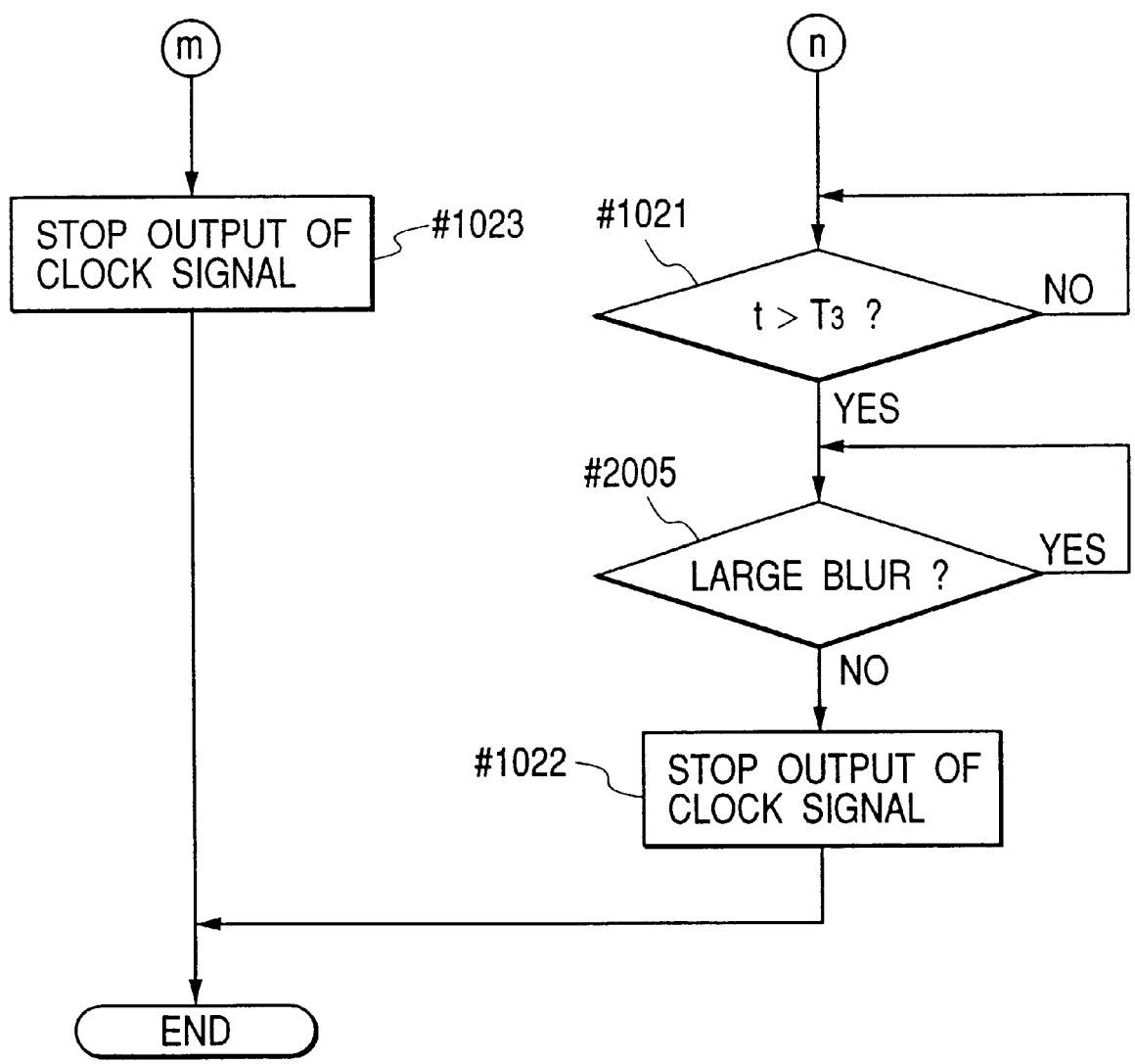
FIG. 22 is a flowchart showing the operation continued from FIG. 20 or FIG. 21.

FIGS. 20 to 22 are flowcharts showing the operation, and different from the flowcharts of FIGS. 12 to 14 in that there is provided a step #3002, and only this aspect will be described.

In the step #3002 of FIG. 20, it is judged whether the body to which the system is to be attached is a still camera body or a video body camera. In the still camera body, the process flows to step #2001, and waits until the release button 113 is half depressed. When the release button 113 is half depressed, and time $T_1$ or more elapses after the main switch 114 is turned on, the microcomputer 32 allows the blur detection unit 21 to start the offset removing operation. Moreover, when the video camera body is attached, the process flows to step #3003 to lengthen wait time $T_1$ until from when the main switch 114 is turned on to start the blur detection unit 21 until the signal offset removal is started, time $T_2$ for continuing the offset removal, and time $T_3$ for further continuing the offset removing operation to enhance the blur prevention precision, respectively ($T_8$, $T_9$, $T_{10}$). Then, the process flows to step #2001.

When the video camera body is attached in this manner, by changing the timing to start the offset removal, and the operating time, the offset removing precision is enhanced. When the still camera body is attached, the blur prevention system can be constructed to give priority to the shutter chance and to be easy to operate.

SIXTH EMBODIMENT

Figure 23:
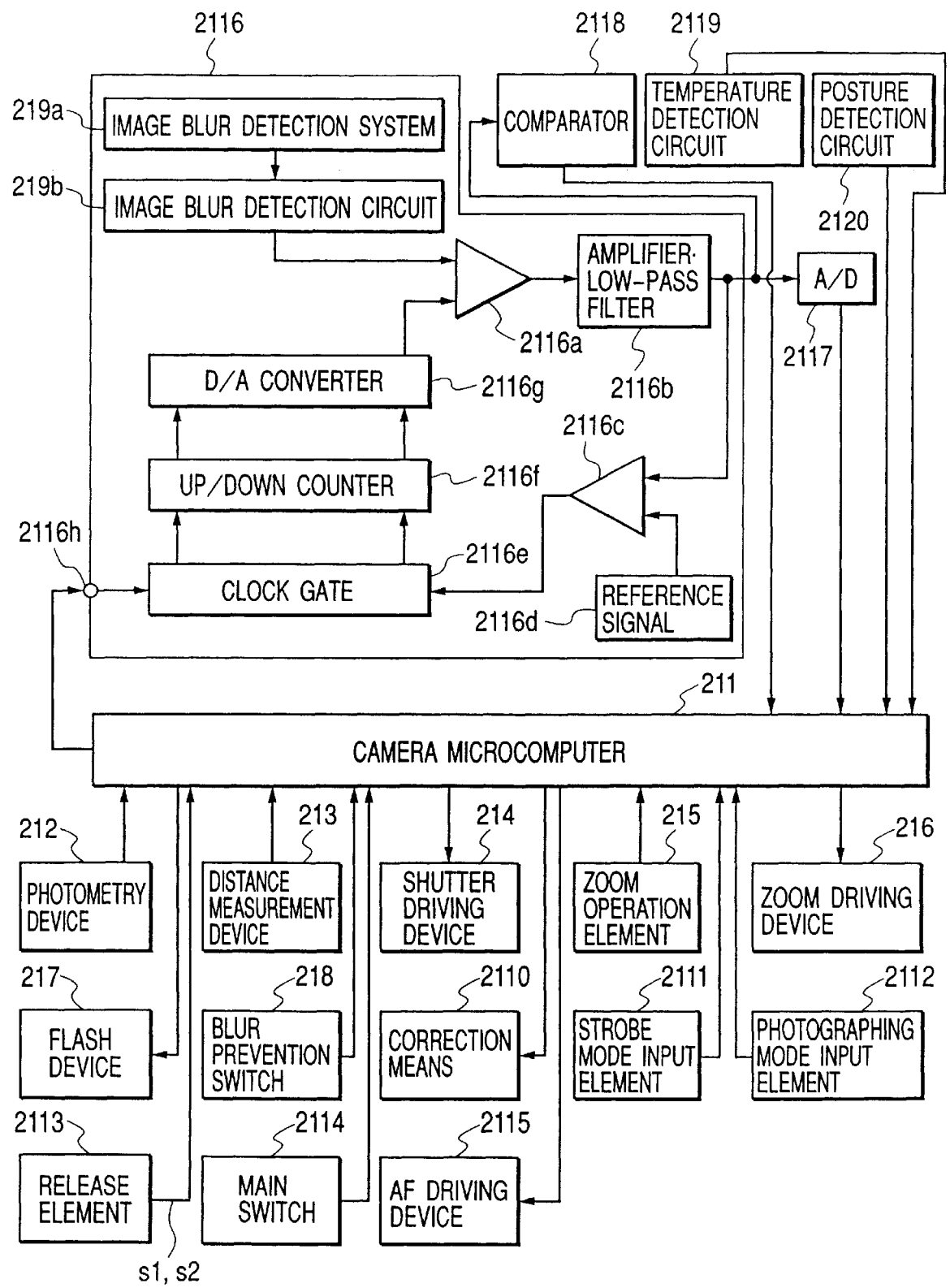
FIG. 23 is a block diagram showing the camera main portion constitution according to each of sixth to eighth embodiments of the present invention.

FIG. 23 is a block diagram showing the camera circuit constitution according to a sixth embodiment of the present invention, only a portion associated with the embodiment will be described, and description of other camera elements is omitted to simplify the description.

In FIG. 23, upon input of an on-signal of a main switch 2114, a camera microcomputer 211 (having the same constitution as that of the microcomputer 411 of FIG. 33) delivers a photographing lens tube from a state of a depressed barrel to a state of an optical system ready for photographing, and additionally opens a lens barrier. In this case, a blur detection device 219 constituted of an image blur detection system 219a and an image blur detection circuit 219b is also started.

From a photographing mode input element 2112 a photographing mode selected by a photographer is transmitted to the camera microcomputer 211. For example, photographing modes include a sport mode suitable for photographing subjects moving around, a portrait mode suitable for close-up photographing persons, a macro mode suitable for close-up photographing subjects, and a night view mode suitable for photographing a night view.

From a strobe mode input element 2111 a strobe mode is transmitted to the camera microcomputer 211. Strobe modes include a strobe off mode in which no strobe is used, a strobe on mode in which a strobe is forced to emit light, and a strobe automatic mode in which it is controlled in accordance with subject luminance, light beam direction, and the like whether or not the strobe is allowed to emit light. Moreover, when the strobe emits light, it can be judged whether or not a red-eye moderating function is operated.

From a blur prevention switch 218, information, determined by the photographer, concerning whether or not blur correction is performed during photographing is transmitted to the camera microcomputer 211. From a zoom operation element 215 a zoom signal responding to a photographer's operation is transmitted to the camera microcomputer 211, and the camera microcomputer 211 controls a zoom driving device 216 to change a photographing focal distance.

When the photographing focal distance is determined, a release member 2113 as the release button is half depressed by the photographer (s1 is on). At a timing of the half depressing, a distance measurement device 213 measures a distance to the subject and transmits information (distance measurement information) to the camera microcomputer 211. Based on the distance measurement information the camera microcomputer 211 controls AF driving device 2115 and partially or wholly drives the photographing lens tube to perform focus adjustment of the photographing optical system.

At this time, as described later blur information from the blur detection device 219 is also transmitted to the camera microcomputer 211 via an A/D converter 2117, and the camera microcomputer 211 determines from a blur state whether or not the camera is hand held or fixed to a tripod or a ground.

Moreover, from a photometry device 212 the subject luminance is transmitted to the camera microcomputer 211. Based on the information, film sensitivity and type, operation state of the blur prevention system, photographing focal distance and lens brightness at that time, photographing mode, selection of blur correction, distance information to the subject, blur information, and other photographing information determined by that time, the camera microcomputer 211 calculates an exposure time, and simultaneously determines whether to use a flash device 217 or not.

A temperature around the image blur detection system 219a from a temperature detection circuit 2119, and the current camera photographing posture from a posture detection circuit 2120 are transmitted to the current camera microcomputer 211, respectively.

When the release button 2113 is completely depressed (s2 is on), based on a signal of the blur detection device 219 the camera microcomputer 211 controls correction means 2110 to start blur correction. Thereafter, a shutter driving device 214 is controlled to perform exposure to a film, and in accordance with a situation the flash device 217 is allowed to emit light.

A blur detection unit 2116 is constituted of the blur detection device 219, and the like, and cuts an offset component and a noise component superimposed on an output of the blur detection device 219 to transmit an output to the A/D converter 2117. The A/D converter 2117 samples a signal of the blur detection unit 2116, and transmits the signal to the camera microcomputer 211.

Here, in an offset signal cutting method of the blur detection device 219 in the blur detection unit 2116, instead of using the filter having the frequencies property as described with FIG. 33, the following constitution is used.

A signal detected by the image blur detection system 219a is processed by the image blur detection circuit 219b to constitute an angular speed signal, and subtraction is performed also using an offset extracted component described later by a differential unit 2116a. By an amplifier/low-pass filter 2116b, in the same manner as the low-pass filter 49p of FIG. 33, noises with which a signal of the differential unit 2116a, superimposed on signal components are cut, and signal amplification is performed. An output signal from the amplifier/low-pass filter 2116b is transmitted to the A/D converter 2117, and is simultaneously transmitted to a comparator 2116c. The comparator 2116c compares the input signal of the amplifier/low-pass filter 2116b with a reference signal 2116d. The reference signal 2116d has substantially a half of a power supply voltage applied to the image blur detection circuit 219b, and this is a central value of a signal output range of the blur detection device 219. Moreover, the reference signal also serves as a reference for the subsequent DC cutting by a digital filter in the camera microcomputer 211 and for integrating.

When the signal of the amplifier/low-pass filter 2116b is larger than the reference signal (there is a plus offset voltage), the comparator 2116c transmits "H" signal to a clock gate 2116e. When the signal is smaller than the reference signal 211d (there is a minus offset voltage), "L" signal is transmitted to the clock gate 2116e. When a clock signal is transmitted from a reset terminal 2116h, the clock gate 2116e transmits the signal from the comparator 2116c to an up/down counter 2116f.

The up/down counter 2116f counts up one bit for every clock pulse when the signal from the clock gate 2116e is "H", and counts down one bit when the signal is "L". D/A converter 2116g emits an analog output of a signal in response to an output of the up/down counter 2116f. For example, when the counter counts up one bit, plus 2 mV is transmitted to the differential unit 2116a.

The image blur detection circuit 219b, the differential unit 2116a, the amplifier/low-pass filter 2116b, the comparator 2116c, the reference signal 2116d, the clock gate 2116e, the up/down counter 2116f, and the D/A converter 2116g are integrated into one circuit, and the image blur detection system 219a is disposed in the vicinity, so that a compact unit is constructed.

In the above-described constitution, when first the camera main switch 2114 is turned on, the blur detection unit 2116 starts operating, and by association of the image blur detection system 219a and the image blur detection circuit 219b, blur angular speed detection is started.

Figure 24A:
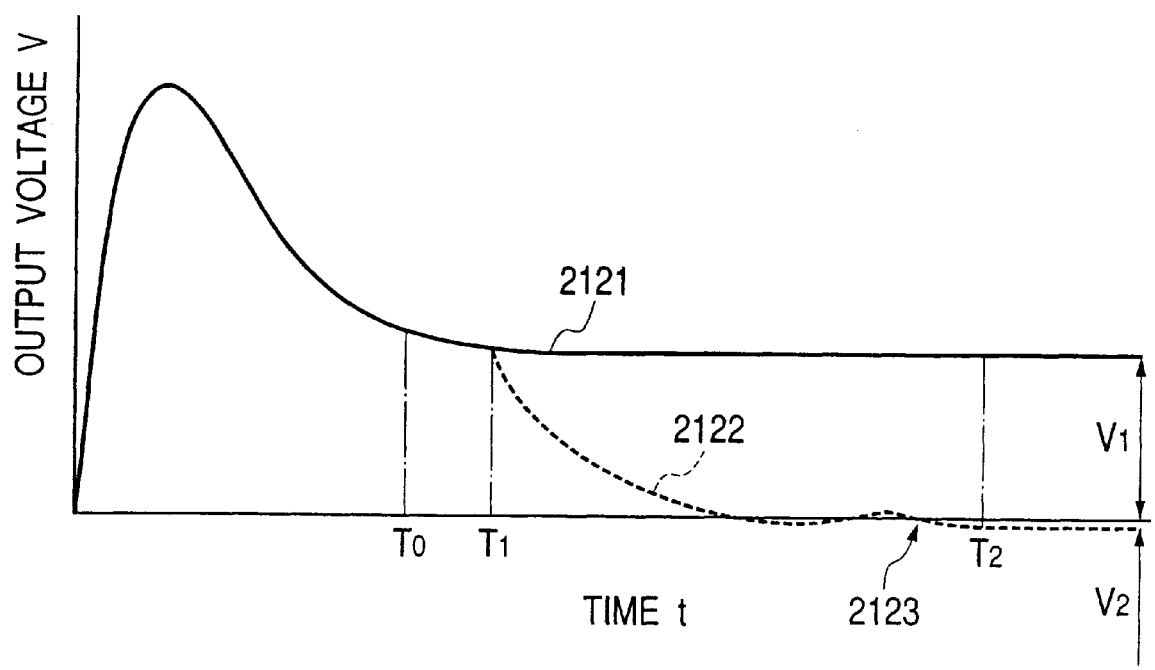
FIGS. 24A and 24B are timing charts showing from when the blur detection starts until the offset component is removed in the sixth to eighth embodiments of the present invention.

Now for the sake of description, on the assumption that there is little hand fluctuation or vibration, the output of the blur detection device 219 changes as shown by a waveform 2121 of FIG. 24A from the start of the operation, and finally reaches an offset $V_1$. Here the signal largely varies till time $T_0$ immediately after the operation starts. This indicates a signal variation until blur is stabilized, for example, when a known vibratory gyro is used as the blur detection device 219. When an angular acceleration clock is used, a signal variation until a circuit is stabilized is indicated. Therefore, even when DC offset removing operation is performed during this period, a precise DC removal cannot be realized.

Therefore, till time $T_2$ after $T_1$ (e.g., 0.1 second) elapses after the operation start of the image blur detection system 219a and the image blur detection circuit 219b, the camera microcomputer 211 transmits the clock signal to the clock gate via the reset terminal 2116h.

Since the signal offset $V_1$ in time $T_1$ is first generated for the output of the differential unit 2116a, the comparator 2116c emits "H" signal. Every time one clock pulse is transmitted to the clock gate, the signal of the D/A converter 2116g transmitted to the differential unit 2116a is increased. Therefore, the offset component of the signal of the differential unit 2116a decreases every time the clock increases (waveform 2122), and finally in a range of a minimum resolution (e.g., 2 mV) of the D/A converter 2116g, the signal of the differential unit 2116a causes an alternating variation in accordance with the clock (arrow 2123).

Figure 24B:
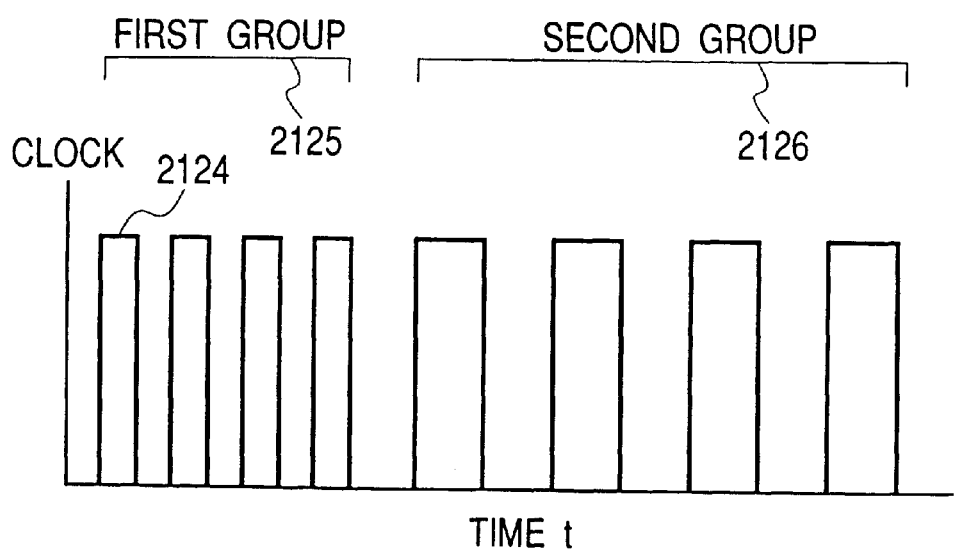

For the clock frequency, as shown in FIG. 24B, the frequency of clock 2124 is first high (first group 2125), then lowered (second group 2126). By raising the clock frequency, first the offset removal is roughly performed. Thereafter, the clock frequency is lowered and a steady offset removal can be performed, whereby time required for the offset removal is shortened.

At time $T_2$ since the camera microcomputer 211 stops output of the clock signal, the signal output to the differential unit 2116a from the D/A converter 2116g is fixed to a signal at the time the output of the clock signal is stopped. Thereby, the signal of arrow 2123 as shown in FIG. 24A does not vary any more, and the offset component decreases to $V_2$.

Here, in the conventional DC cut filter 48p described with FIG. 33, the offset component can finally be zero, but in the present system it can be expected that only a slight offset ($V_2$) remains. However, since the signal is removed by the DC cut filter 2414p by the digital calculation in the camera microcomputer 211, there is no problem with blur prevention performance.

Although the offset removal is finally performed in the camera microcomputer 211, the offset removal has to be performed also in the blur detection unit 2116. Reasons for this will be described hereinafter.

Now a case where no offset removal is performed in the blur detection unit 2116 is considered. The output of the blur detection device 219 is amplified with a remarkably high gain before the output is A/D converted and taken into the camera microcomputer 211. This is because the output of a hand fluctuation component detected by the blur detection device 219 is extremely small. There is a possibility that the signal of the amplifier is saturated by the offset component superimposed on the signal. Therefore, for the purpose of preventing the overflow, the signal offset of the blur detection device 219 needs to be decreased to a certain degree before the amplification.

In the constitution of FIG. 23, as shown in FIG. 24A, the offset component $V_1$ decreases to $V_2$, and this can prevent the signal of the amplifier/low-pass filter 2116b from being saturated.

Figure 25:
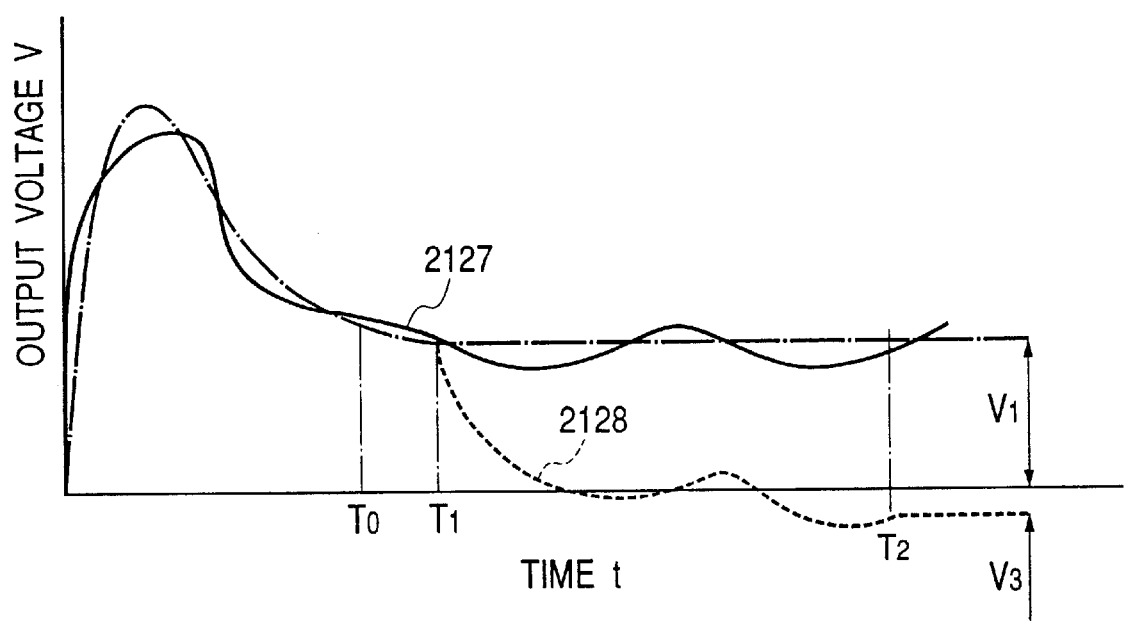
FIG. 25 is a timing chart showing an output waveform of FIG. 24A in terms of an actual blur output.

The actual output of the blur detection device 219 is not clear like the waveform 2121 of FIG. 24A, and includes a signal by hand fluctuation like a waveform 2127 shown in FIG. 25. Therefore, at time $T_2$ an offset signal $V_3$ remains by the hand fluctuation output at the time the camera microcomputer 211 stops the output of the clock signal (waveform 2128), but it is a sufficiently small offset as compared with the initial offset component $V_1$, and the signal overflow on the amplifier/low-pass filter 2116b can be prevented.

In the offset component removal by the above-described system, since, different from the conventional DC cut filter shown in FIG. 37, no large-capacity capacitor is necessary, the circuit is considerably miniaturized. As another merit, since there is no time constant circuit constituted of a capacitor and a resistance, no deterioration is caused in the blur prevention precision by the phase deviation in the hand fluctuation frequency range.

In FIG. 23, the output of the blur detection unit 2116 is also transmitted to a comparator 2118. By the above-described constitution of the blur detection unit 2116, the overflow of the amplifier/low-pass filter 2116b can usually be prevented. However, in a case where since during DC component extraction, noises are superimposed to the output of the image blur detection circuit 219b, a correct offset removal cannot be performed, or in a case where since during the DC component extraction a large blur (e.g., panning) is applied to the camera, the correct offset removal cannot be performed, it is expected that the output of the amplifier/low-pass filter 2116b is saturated or in an almost saturated state. As a countermeasure for this case, the comparator 2118 is disposed.

The comparator 2118 outputs a signal to the camera microcomputer 211, when the signal of the amplifier/low-pass filter 2116b exceeds a predetermined range, or when the signal exceeds the predetermined range continuously for a given period (e.g., when the signal is not in the range of 1V to 3V for 0.5 second). Upon reception of the output of the comparator 2118, the camera microcomputer 211 again outputs the clock signal to the reset terminal 2116h of the blur detection unit 2116 for a given time. In this constitution, even if the amplifier/low-pass filter 2116b should be in an almost overflow situation, the offset removing operation is performed again, and the overflow can be avoided.

Additionally, in FIG. 23, the comparator 2118 is disposed outside the camera microcomputer 211, but is not limited thereto. For example, by performing A/D conversion by the A/D converter 2117, and by regenerating the clock signal when the signal taken into the camera microcomputer 211 is not in the predetermined range for the given time or longer, the comparator 2118 may be omitted.

As described above, in the presence of a large offset to such a degree that the signal is saturated, even when the offset removing operation is performed again, for the clock signal, in the same manner as described with FIG. 24, the clock frequency is first raised to roughly perform the offset removal, then the clock frequency is lowered to perform a steady offset removing operation.

The offset component superimposed onto the angular speed output of the blur detection device 219 constituted of the image blur detection system 219a and the image blur detection circuit 219b changes with the elapse of time. Therefore, when the offset removal is performed once, but the blur prevention system continues to be used, the offset increases again, which causes a possibility that the amplifier/low-pass filter 2116b is saturated.

To solve the problem, the embodiment is constituted in such a manner that after a given time elapses, the offset removal is performed again.

A timer incorporated in the camera microcomputer 211 constantly counts time elapsed after the blur detection unit 2116 is operated, and the offset removing operation is performed again every time the given time (e.g., 4 minutes) elapses. To perform the offset removal again in such a situation, since not so large offset is superimposed onto the amplifier/low-pass filter 2116b, the output of the clock signal having a variable frequency as shown in FIG. 24B is unnecessary. From the first, with a low-frequency clock a steady offset removal is performed. Specifically, a mode of performing the offset removal when the power supply is turned on is set to be different from a mode of performing the offset removal again.

Moreover, the output offset of the image blur detection system 219a changes by temperature changes. Therefore, when the ambient temperature of the image blur detection system 219a changes during the operation of the blur detection unit 2116, by performing the offset removal again, the blur detecting precision is maintained.

In FIG. 23, when the ambient temperature of the image blur detection circuit 219b changes by a given value or more during the operation of the blur detection unit 2116, the temperature detection circuit 2119 outputs such situation to the camera microcomputer 211. In this situation, the camera microcomputer 211 outputs the clock signal on the blur detection unit 2116 to perform the offset removing operation again. Since the offset variation accompanied by the temperature change does not form an abruptly large offset, only the steady offset removal may be performed with a low clock frequency.

As described above, the output of the blur detection unit 2116 is transmitted to the camera microcomputer 211, and further its offset is removed in the digital filter. However, a certain time is necessary for accurately performing the offset removing operation by the digital filter, and a precise blur correction cannot be made until the time elapses. Therefore, when exposure is performed for many seconds, the blur prevention precision deteriorates. However, considering cases where long exposure is performed, in many cases the camera is attached to a tripod or the like. In these cases, as described with FIGS. 24A and 24B, the blur detection unit 2116 can perform the offset removal more accurately than in FIG. 25 (because there is no hand fluctuation).

Therefore, when a camera is attached to the tripod in this manner, or when the camera is found to be firmly fixed, the offset removal is performed again, so that a precise offset removal can be performed.

The camera microcomputer 211 checks signals from the blur detection unit 2116. When the signal fails to exceed a given range for a given period, it is determined that the camera is not hand held, and the offset cut operation is performed again. In this case, in the same manner as described above, the clock signal is transmitted on the blur detection unit 2116. However, since the offset removal is already performed once, the blur detection unit 2116 is in a situation with less blur. Therefore, even when the offset removal is performed earlier, a precise result can be obtained. Consequently, a time for generating the clock signal may be set to be shorter than that of the first performed offset removing operation, so that a precise blur correction can immediately be performed.

When the vibratory gyro is used as the blur detection device 219, it should be noted that the amount of offsets superimposed onto the signals by blurs from the outside changes. For example, in a single-lens reflex camera, during photographing, a quick return mirror is driven, and a shutter runs. Impacts by these operations and blurs by film transport cannot be ignored for the vibratory gyro. Moreover, the same applies to electric zoom drives such as a compact camera.

Therefore, when these operations are finished, the offset removal is performed again to absorb the variation of the offset signal. Specifically, when the photographing is finished, and the film transport is completed, the offset removing operation is performed again. When any one of camera operating means is operated, the offset removing operation is performed again after a predetermined time.

In general since the vibratory gyro has a beam structure, the offset amount changes even by deflection of a beam by gravity. Therefore, camera photographing posture is detected. When the photographing posture changes, the offset removing operation is performed again.

In FIG. 23, when the posture detection circuit 2120 detects that the camera posture changes after the blur detection unit 2116 starts operating (the camera is changed to a vertical position from a transverse position), the circuit outputs a signal to the camera microcomputer 211, and the camera microcomputer 211 outputs the clock signal on the blur detection unit 2116.

As described above, even when the offset removal is performed once, the offset removing operation is performed again depending on the state of the blur detection unit and the state of the camera. While the offset removing operation is performed, however, an accurate blur correction cannot be performed. Therefore, in the conditions where the offset removing operation is performed again during photographing, there is rather a possibility that image blur is caused. Therefore, in this embodiment, even in a situation where the offset removal needs to be performed again, if photographing is performed, the offset removing operation is inhibited until the photographing is finished.

Moreover, when photographing is started while the offset removal is performed again, a good image cannot easily be obtained. When the shutter chance takes priority, it is desirable to avoid performing the offset removal again if possible. Therefore, when the camera photographing mode is a sport mode; a discrimination level for another offset removing operation is lowered, and the offset removing operation is prevented from being easily performed again. In general in the sport mode, the shutter speed is not very slow. Therefore, even if the blur prevention precision is slightly lowered, it is preferable to give priority to the shutter chance. In this manner, the discrimination level for another offset removing operation is changed in accordance with the photographing mode.

As described above, since the camera microcomputer 211 finely removes the offsets of the blur detection unit 2116 in accordance with the camera photographing conditions, the blur prevention precision is maintained.

Figure 26:
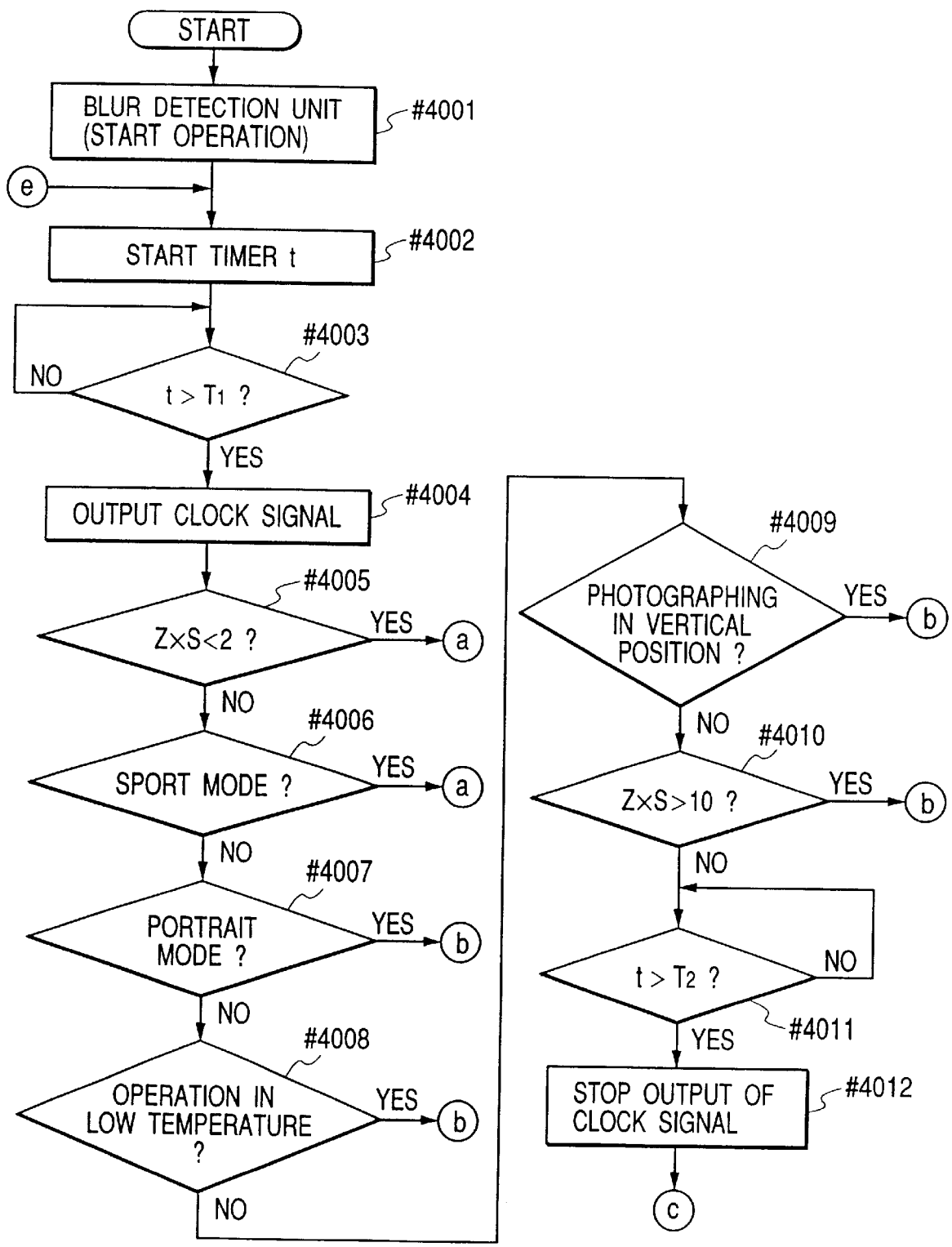
FIG. 26 is a flowchart showing a part of the camera operation according to the sixth embodiment of the present invention.
Figure 27:
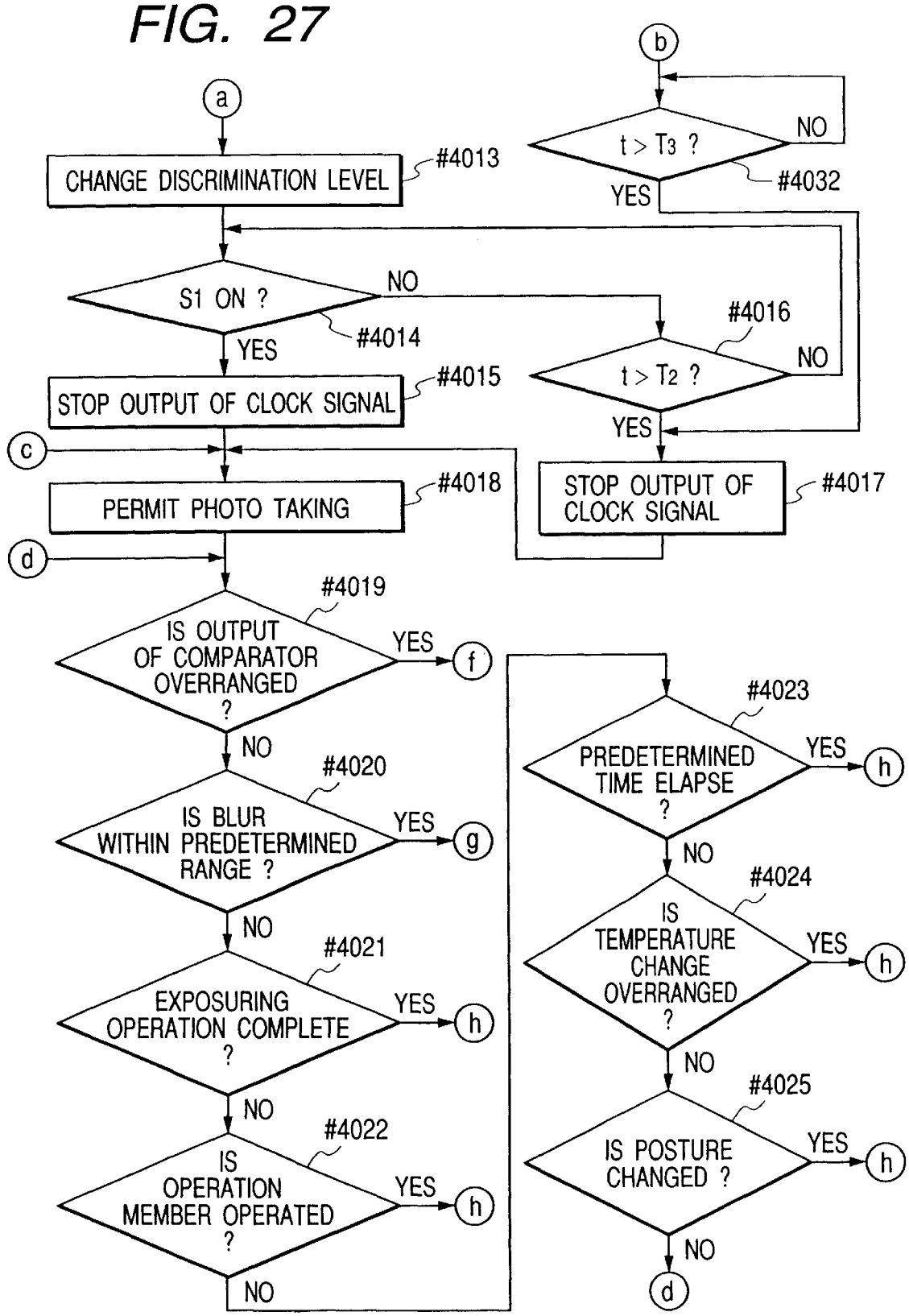
FIG. 27 is a flowchart showing the operation continued from FIG. 26.
Figure 28:
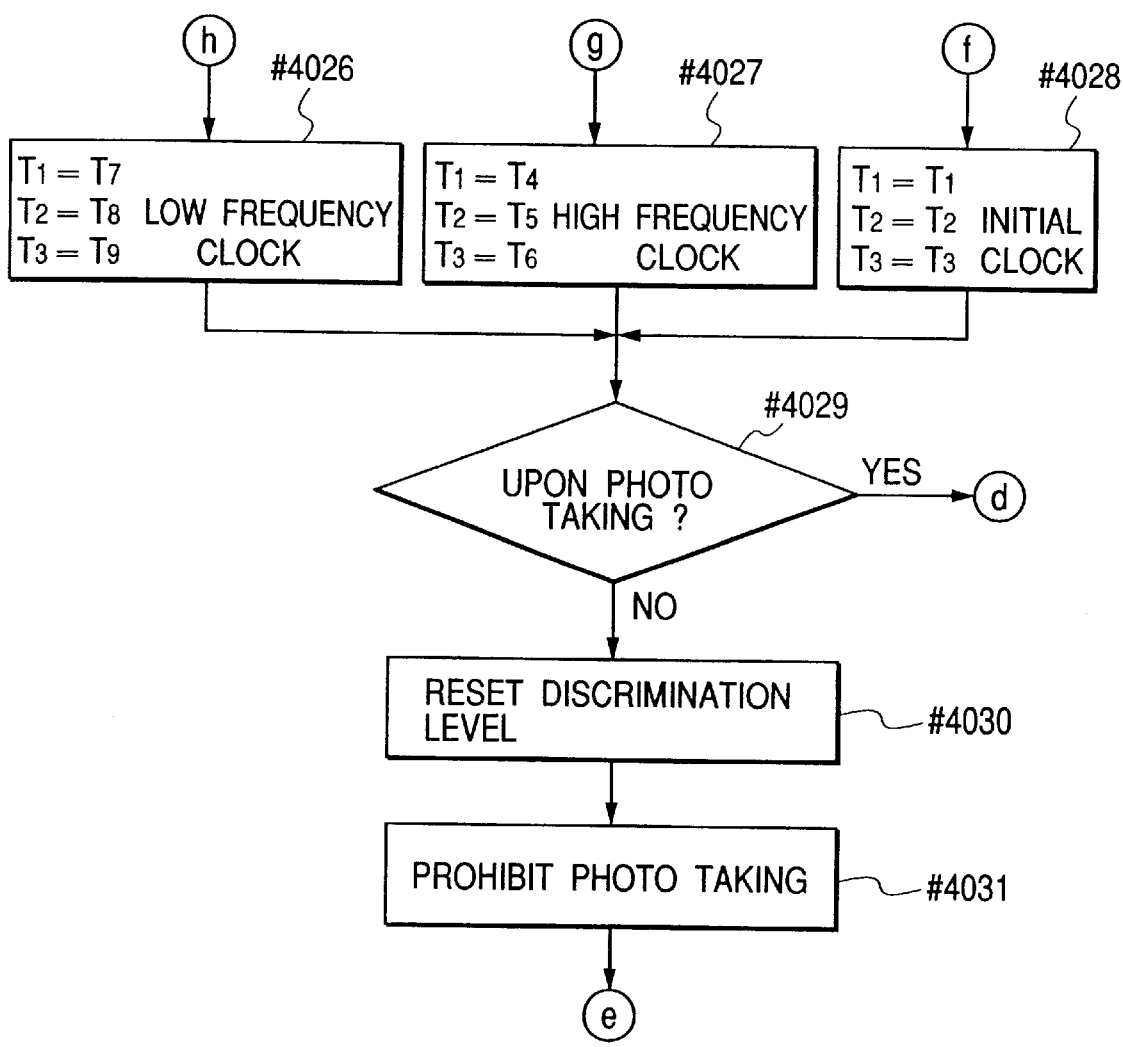
FIG. 28 is a flowchart showing the operation continued from FIG. 27.

FIGS. 26 to 28 are flowcharts for describing the operation of the camera microcomputer 211, and a flow of the operation starts when the main switch 2114 is turned on (even when the blur prevention switch 218 is off, the flow starts because the blur detection device 219 and the analog processing circuit 2116 stand ready for driving).

In step #4001 of FIG. 26, power is applied to the blur detection unit 2116 to start operation, and the image blur detection system 219a and the image blur detection circuit 219b are allowed to detect hand fluctuation angular speeds. In step #4002, a timer is started, and in a next step #4003, a wait time is $T_1$ (e.g., 0.1 second), then the process flows to step #4004. This is necessary because as described with FIG. 24, when the blur detection device 219 is initially driven, there is a large variation of the offset component and an extraction error of the offset component needs to be avoided.

In the step #4004, the camera microcomputer 211 starts outputting the clock signal to the clock gate 2116e. Subsequently, in the next step #4005, a product of a photographing focal distance Z and a shutter speed S is obtained. When the product is two or less, the process flows to step #4013. For example, when the focal distance is 200 mm, and the shutter speed is 1/60, the product is 3.3. When the shutter speed is 1/125, the product is 1.6. In the former case, since there is a possibility of image deterioration by hand fluctuation, the process flows to a usual step #4006. In the latter case, since there is a relatively small possibility of image deterioration by hand fluctuation, the process flows to step #4013 in which the shutter chance has priority over the blur prevention precision.

In step #4006 it is judged whether or not the camera photographing mode is a sport mode. If it is the sport mode, the process flows to the step #4013 to give priority to the shutter chance. If not, the process flows to step #4007. In the step #4007, it is judged whether or not the camera photographing mode is a portrait mode. When it is the portrait mode, the process flows to step #4032 to give priority to image quality and enhance the blur prevention precision. If not, the process flows to step #4008.

In the step #4008, an ambient temperature state during photographing is examined. In a low temperature, since a time for stabilizing the signal of the blur detection device 219 is lengthened, the process flows to the step #4032 to take time in the offset removal; otherwise the process flows to step #4009. In the step #4009, when the camera is positioned vertically from the camera posture, hand fluctuation is increased. Therefore, the process flows to step #4032 to enhance the blur prevention precision; otherwise the process flows to step #4010. Additionally, in the step #4008, it is judged whether or not the ambient temperature is lower than the predetermined temperature. As another example, temperatures between a first temperature and a second temperature are determined as an appropriate temperature range, and it may be judged whether or not the ambient temperature is in the appropriate temperature range.

The step #4010 is similar to the step #4005. When the product of the photographing focal distance and the shutter speed is larger than 10, for example, when the focal distance is 300 mm, and the shutter speed is $\frac{1}{15}$, a high blur prevention precision is necessary. In this case, the process flows to step #4032 to enhance the blur prevention precision; otherwise the process flows to step #4011.

For conditions to advance the flow to the step #4011, a certain degree of the blur prevention precision is necessary, but a very high precision is not demanded. In this case, after the flow is on standby until the timer started by turning on the main switch 2114 reaches $T_2$ (e.g., 0.3 second), it advances to step #4012. In the step #4012, the camera microcomputer 211 stops the output of the clock, and the process flows to step #4018.

The flow on and after the step #4013 of FIG. 27 is continued from the step #4005 or the step #4006 and does not require the blur prevention precision very much.

In the step #4013 of FIG. 27, a discrimination level for performing the offset removing operation again is lowered. As described above, by raising the discrimination level, the offset cut operation is prevented from being easily performed again, and instead the shutter chance is utilized. In the next step #4014, it is judged whether or not the release member is half depressed (s1 on). When the switch sw1 is turned on, the process flows to step #4015. Moreover, when the switch s1 is not turned on, the process flows to step #4016 to determine whether or not time $T_2$ elapses. When the time elapses, the process flows to step #4017. When it does not elapse, the flow returns to step #4014.

In step #4015, the camera microcomputer 211 stops the output of the clock signal to the clock gate 2116e. Therefore, at this time, the removal of the offset of the blur detection device 219 is forcibly stopped.

As described above, by turning on the switch s1 to immediately stop the offset removing operation and enter the photographing state, priority is given to the shutter chance.

In step #4017, the output of the clock signal from the camera microcomputer 211 is likewise stopped. Specifically, even in a case where the blur prevention precision is not particularly necessary, if the switch s1 is not turned on immediately after the main switch 2114 is turned on, the blur detection unit 2116 continues the offset removing operation until the switch is turned on, so that a precise offset removal is performed.

When in the steps #4007, #4008, #4009 and #4010 it is judged that the blur prevention precision needs to be raised, the process flows to step #4032, waits until t>$T_3$ (e.g., 0.4 second), then advances to step #4017. Specifically, by lengthening the time of the offset removing operation, the offset removing precision is enhanced.

As described above, when the process flows to the steps #4013, #4014, #4015, #4016, #4017, priority is given to the shutter chance rather than to the offset removal precision of the blur detection device 219. When the process flows to the steps #4032, #4017, priority is given to the offset removal precision of the blur detection device 219 rather than to the shutter chance. By controlling the offset removal precision of the output of the blur detection device 219 in accordance with the photographing conditions of the camera, a blur prevention system easy to operate can be obtained.

In the step #4018, photo-taking is permitted. Thereby, when there is an interrupt of a photographing command (switch s2 on) in the flow, photographing is performed (during the flow of the previous steps #4001 to #4018, even when photographing operation is performed, by not permitting the photographing, priority is given to the offset removing operation).

In the next step #4019, when the output of the comparator 2118 of FIG. 23 is overranged (or when the predetermined range is exceeded for the predetermined time), it is judged that overflow or a state close to the overflow occurs in the circuit, and the process flows to step #4028 of FIG. 28 to perform the offset removing operation again. Moreover, when the output of the comparator 2118 is in the predetermined range, the process flows to step #4020, in which the camera microcomputer 211 observes a taken state of hand fluctuation. When the hand fluctuation is in the predetermined range, it is judged that the camera is fixed to a tripod or the like. Then, the process flows to step #4027 of FIG. 28 to perform the offset removal again in a state free of blurs. When it is judged from the blur state that the camera is hand held, the process flows to step #4021.

In step #4021, it is judged whether or not exposure operation is complete. When the exposure is complete, the process flows to step #4026 of FIG. 28 to perform the offset removing operation again. Moreover, when the exposure is not performed, or during the exposure, the process flows to step #4022 to judge whether or not the camera operation member is operated. When any one of the camera operation members is operated, to avoid the offset variation by vibration by the operation or by vibration generated by driving the camera actuator, the process flows to step #4026 of FIG. 28 to perform the offset removing operation again. In this case, however, by performing the offset removing operation the predetermined time (e.g., 1 second) after the camera operation member is operated, the offset removing operation is performed again after the vibration to the camera is suppressed.

Moreover, when the camera operation member is not operated, the process flows to step #4023. When a predetermined time (e.g., 4 minutes) elapses after the main switch 2114 is turned on, the offset variation cannot be ignored. Therefore, the process flows to step #4026 of FIG. 28 to remove the offset again. Here, even when the offset removing operation is performed again, further four minutes later the offset is again removed. In this manner, the offset removing operation is performed at every interval of four minutes. When the predetermined time does not elapse, the process flows to step #4024. After the blur detection unit 2116 is operated (after the first offset removing operation is completed), a temperature change around the blur detection device 219 (in the vicinity of the image blur detection system 219a) occurs by a predetermined value or more. Then, the process flows to step #4026 of FIG. 28 to perform the offset removing operation again. When the temperature variation is small, the process flows to step #4025.

In the step #4025, when the camera photographing posture changes after the operation of the blur detection unit 2116 (after the completion of the first offset removing operation), the process flows to step #4026 of FIG. 28 to perform another offset removing operation. Moreover, when the photographing posture does not change, the flow returns to step #4019 to discriminate the necessity of another offset removal again.

In the step #4026 of FIG. 28, when it is judged in the steps #4021, #4022, #4023, #4024, #4025 that another offset removing operation is necessary, the timer is changed in the steps #4003, #4011, #4016, #4032 to perform the offset removing operation again. The timer is changed because in these steps the offset variation is relatively small, and the offset removal can steadily be performed.

The clock from the camera microcomputer 211 is fixed to second group 2126 of FIG. 24B, and timers are set from $T_1$ (0.1 second) to $T_7$ (0 second), from $T_2$ (0.3 second) to $T_8$ (0.2 second), and from $T_3$ (0.4 second) to $T_9$ (0.3 second), respectively.

In step #4027, when in the step #4020 it is judged that the offset removing operation needs to be performed again, the timer is changed in the steps #4003, #4011, #4016, #4032, and the offset operation is performed again. The reason why the timer is changed is that since in this case there is extremely little blur, the offset can be removed in an early stage.

The clock from the camera microcomputer 211 is fixed to first group 2125 of FIG. 24B, and timers are set from $T_1$ (0.1 second) to $T_4$ (0 second), from $T_2$ (0.3 second) to $T_5$ (0.1 second), and from $T_3$ (0.4 second) to $T_6$ (0.2 second), respectively.

In the step #4028, when in the step #4019 it is judged that the offset removing operation needs to be performed again, the timer for performing the offset operation again is set. Here, since the cause is the circuit overflow, the offset removal needs to be performed again from the first, and change from the initial set timer is not performed. Specifically, the clock from the camera microcomputer 211 is constituted of the first group 2125 and the second group 2126 of FIG. 24B, and the timers are set from $T_1$ (0.1 second) to $T_1$ (0.1 second), from $T_2$ (0.3 second) to $T_2$ (0.3 second), and from $T_3$ (0.4 second) to $T_3$ (0.4 second), respectively.

After the operation of the step #4026, #4027 or #4028 is completed, in each case the process flows to step #4029, in which it is judged whether or not it is upon photo-taking. If the offset removing operation is performed again during photographing, there is a possibility that a taken image is deteriorated. Therefore, the offset removing operation is again prohibited, thereby advancing to step #4019. Moreover, when photographing is not performed, the process flows to step #4030.

In the step #4030, when in the step #4013 the discrimination level is changed, the level is reset, thereby advancing to step #4031. Subsequently, in the step #4031, photo-taking is placed in a prohibited state in such a manner that even if photographing is tried (the release button is completely depressed), no photographing is performed, then returning to step #4002. The step #4002 and the subsequent steps constitute steps to remove the offset again.

As described above, since the state requiring the offset removal again is discriminated and the offset removal is performed again, a precise blur prevention system can be constructed.

SEVENTH EMBODIMENT

Figure 29:
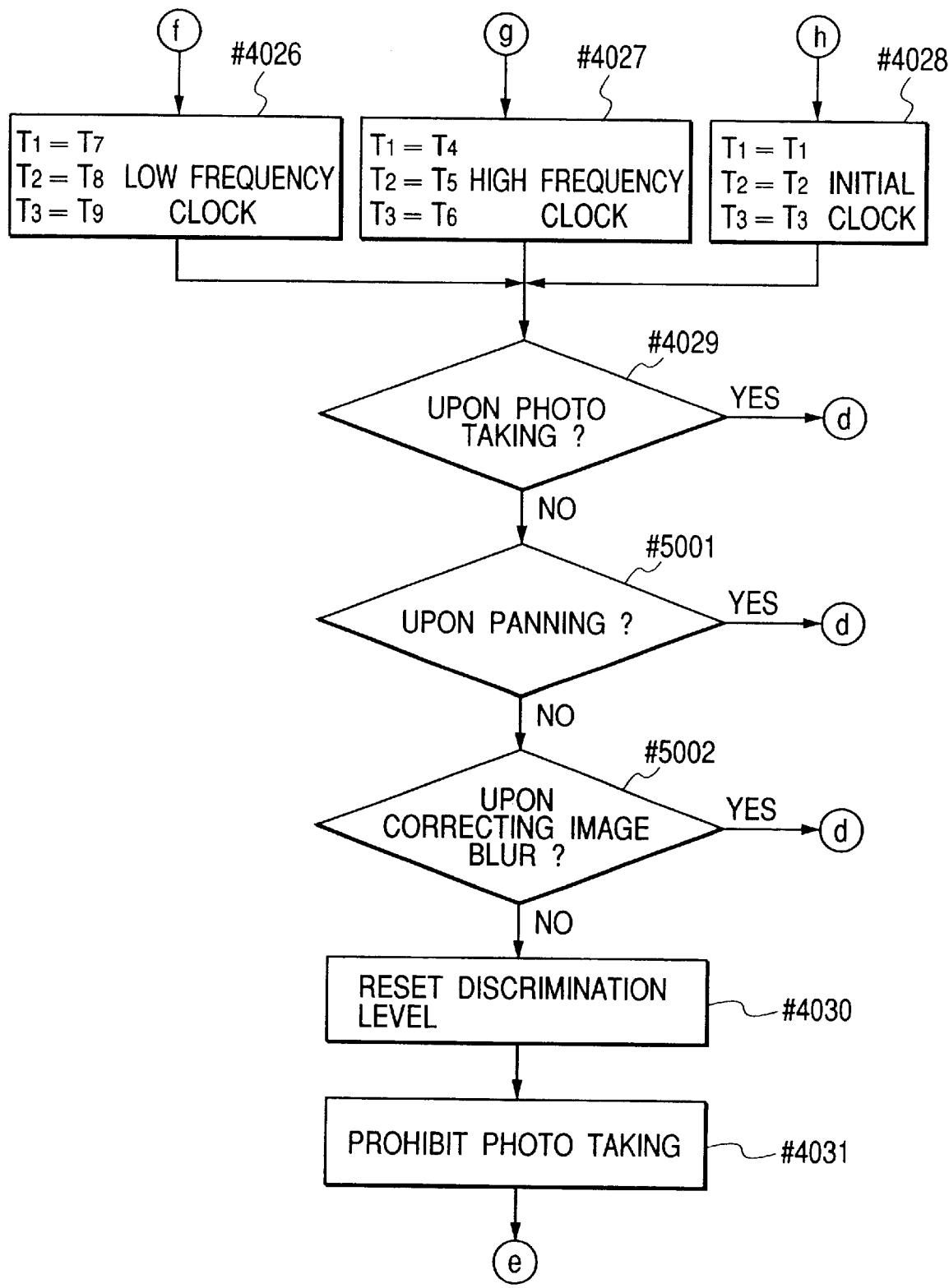
FIG. 29 is a flowchart showing the operation of a camera main portion of the seventh embodiment of the present invention.

FIG. 29 is a flowchart showing the operation of the camera main portion according to a seventh embodiment of the present invention, and corresponds to FIG. 28 in the sixth embodiment. Since the other aspects are the same as in the above-described sixth embodiment, the description thereof is omitted.

What differs from FIG. 28 is that steps #5001, #5002 are added to FIG. 28.

In the step #5001, when the camera microcomputer 211 judges based on hand fluctuation data from the blur detection unit 2116 that it is upon panning, the second offset removing operation is prohibited, and the process flows to step #4019. This is because when the offset removal is performed again during panning, an angular speed component having a relatively low frequency close to DC by panning is regarded as the offset component and removed, and a precise offset removal cannot be performed.

In the step #5002, it is judged whether or not it is upon correcting image blur. When the blur correction is performed, the second offset removal is prohibited, and the process flows to step #4019. This is because if the offset removing operation is performed during the blur correction, the correction lens is uncomfortably fluctuated largely during the offset removing operation.

Therefore, by prohibiting the offset removing operation during panning, incorrect offset removal can be prevented from being performed. By preventing the offset removal from being performed during the blur correction, the photographer feels neither discomfort nor unnecessary concern.

As described above, there are provided means for performing the offset cut operation again even after the offset cut operation is completed once, and the prohibiting means for prohibiting the operation of the means. While the camera is panning, or during blur correction, the means are constituted to be prohibited from operating, so that a blur prevention system easy to operate can be realized.

EIGHTH EMBODIMENT

Figure 30:
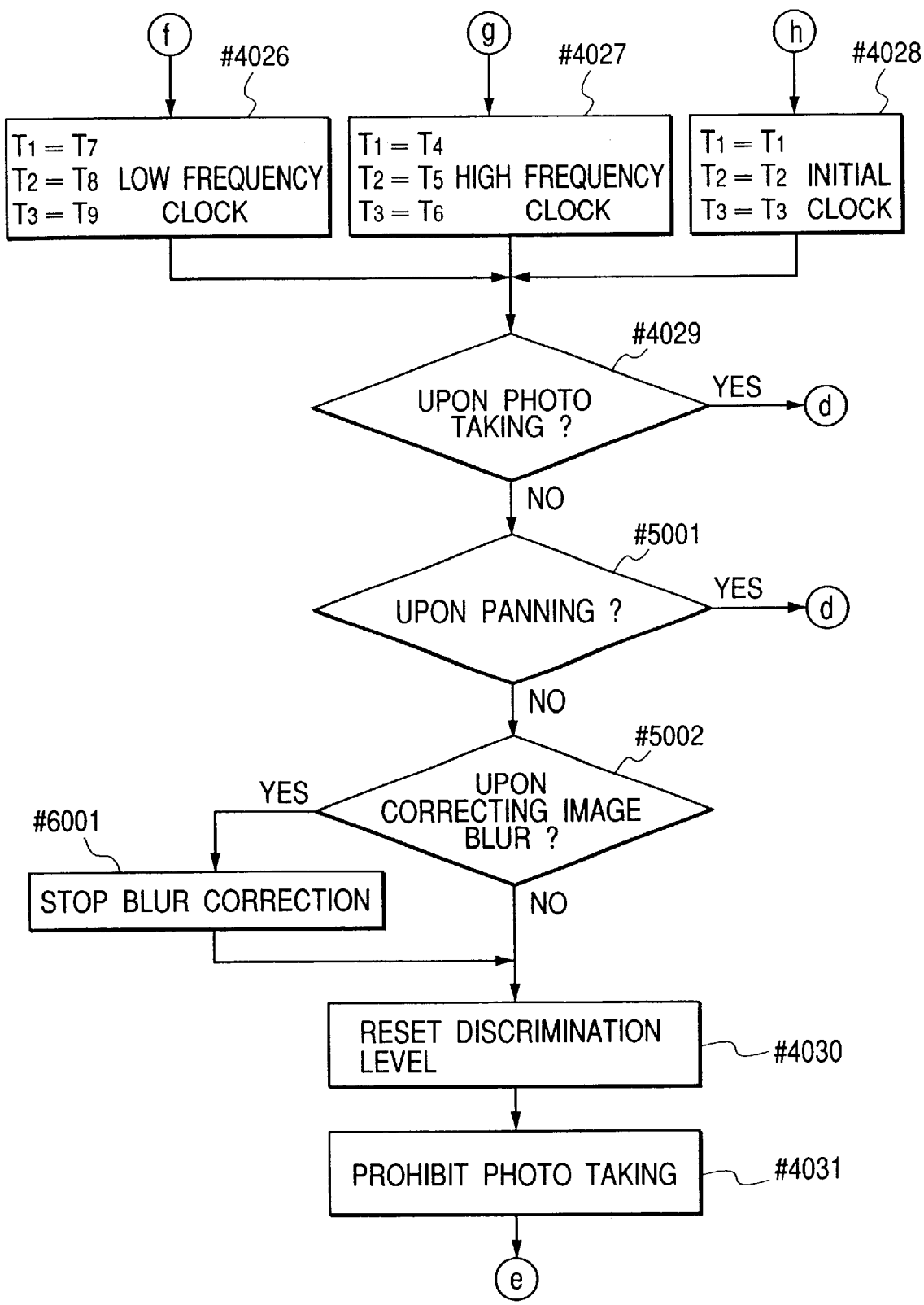
FIG. 30 is a flowchart showing the operation of the camera main portion of the eighth embodiment of the present invention.
Figure 31:
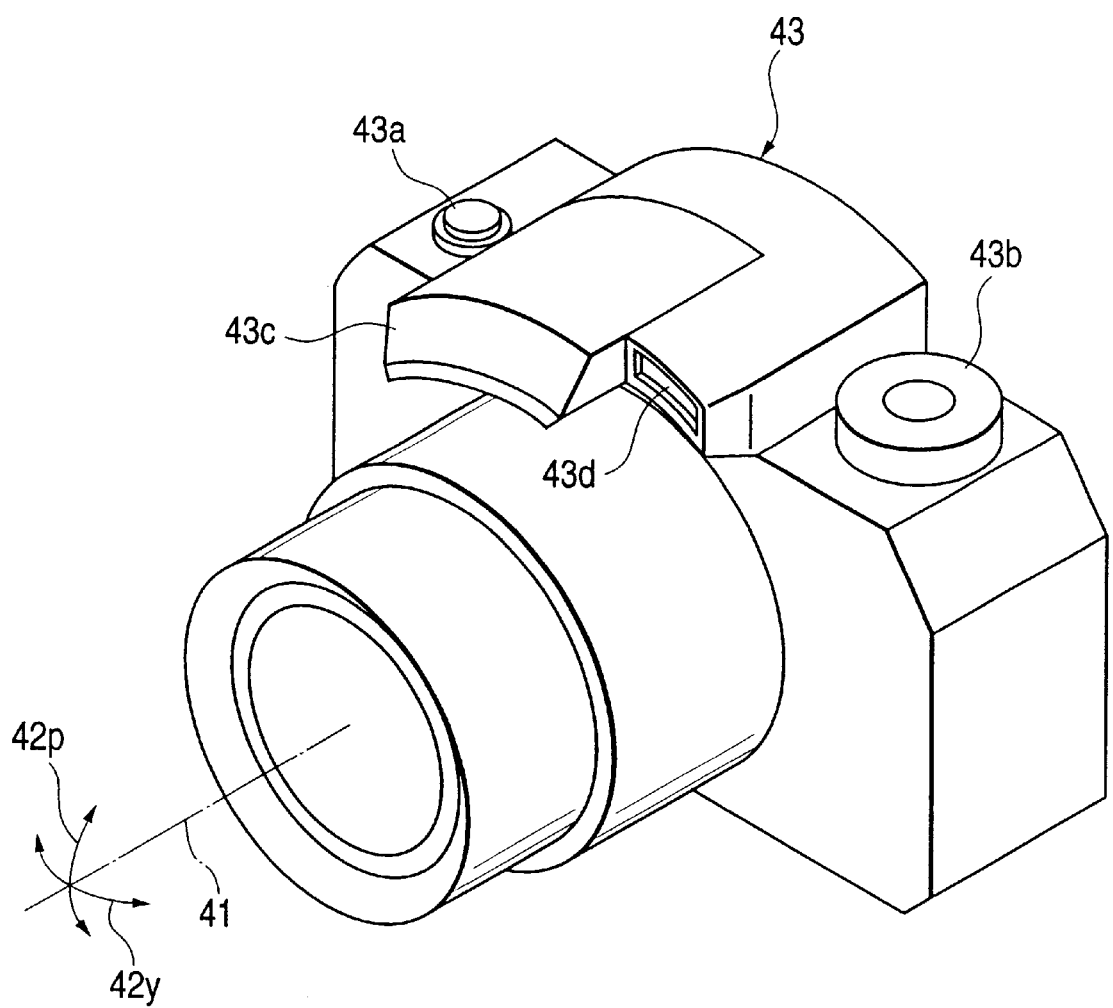
FIG. 31 is a perspective view of a conventional compact camera which has a blur prevention system.
Figure 32:
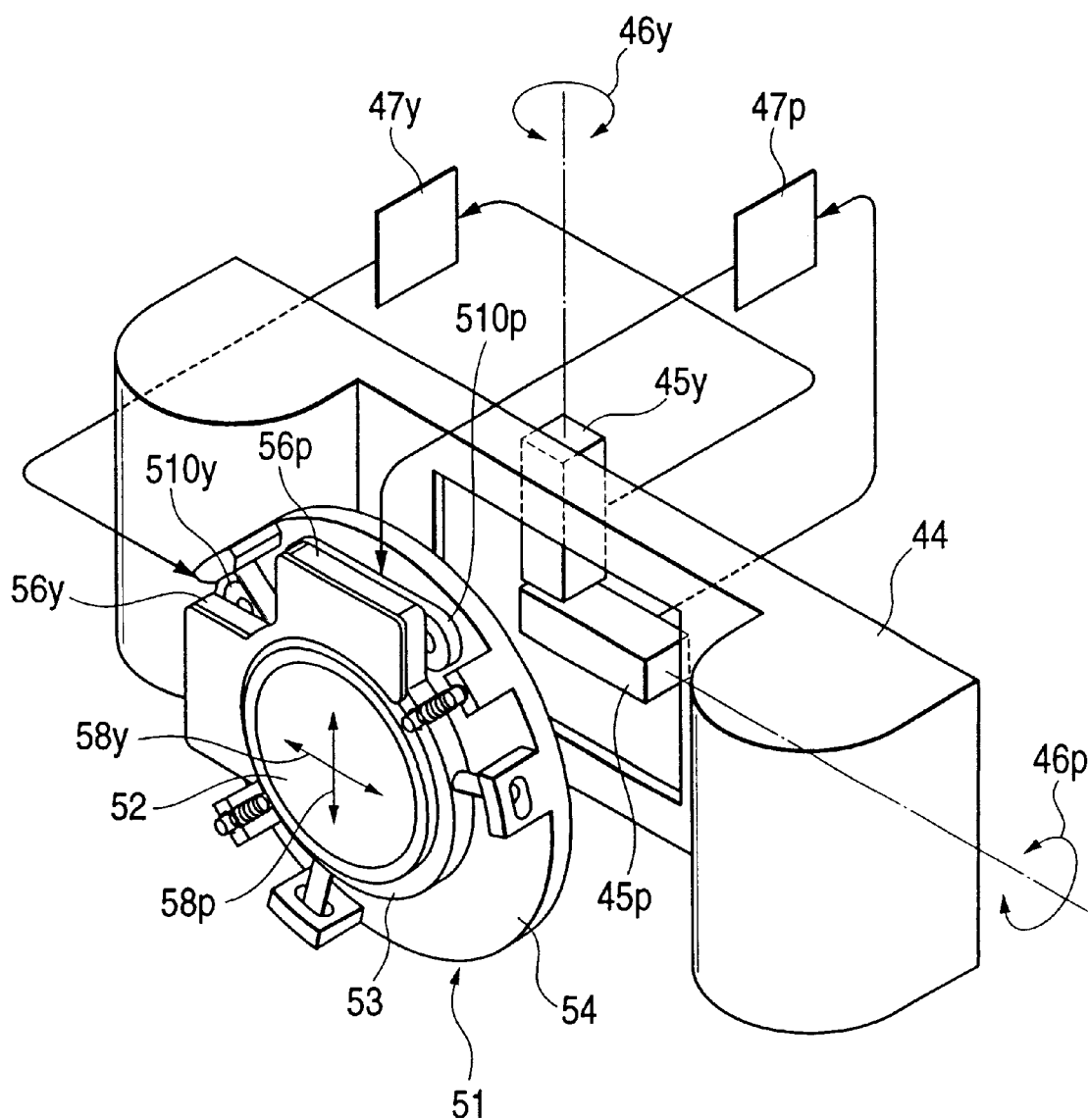
FIG. 32 is a perspective view showing an inner mechanism of the camera of FIG. 31.

FIG. 30 is a flowchart showing the operation of the camera main portion according to the eighth embodiment of the present invention, and corresponds to FIG. 29 in the seventh embodiment. Since the other aspects are the same as in the sixth embodiment, the description thereof is omitted.

What differs from FIG. 29 is only that step #6001 is added to FIG. 29.

In the seventh embodiment, when it is judged in the step #5002 that the blur correction is being performed, the offset removal is prohibited. In the eighth embodiment, when it is judged in the step #5002 that the blur correction is being performed, the process flows to step #6001 to stop the blur correction. Thereafter, the process flows to the step #4030, #4031, then #4002, and enters the offset removing operation.

In this manner, when the blur correction is discontinued, the correction lens is prevented from being fluctuated by the offset removing operation. Therefore, no discomfort is given to the photographer. Additionally, when the blur correction restarts (as not shown in the flow, the constitution may be set in such a manner that when the offset removing operation is completed, the blur correction is automatically restarted), a precise blur correction with little offset can be realized.

As described above, even when the blur correction is performed, the offset removing operation is enabled. Therefore, the blur prevention precision can quickly be enhanced, and a the blur prevention system strong against the shutter chance can be realized.

MODIFICATION

The soft constitution and the hard constitution of the embodiment can appropriately be replaced.

Moreover, in the present invention, the claimed constitution or the embodiment constitution may entirely or partially form one apparatus, may be combined with other apparatuses, or may be an element to constitute the apparatus.

Furthermore, the constitution of the claimed invention or the embodiment may entirely form one apparatus, may be separated or combined with other apparatuses, or may be an element to constitute the apparatus.

Additionally, the examples applied to the lens shutter camera have been described, but the present invention can be applied to a single-lens reflex camera, a video camera and various other cameras, optical apparatuses other than the cameras, other apparatuses, apparatuses applied to the cameras, the optical apparatuses and the other apparatuses, and elements constituting the apparatuses.

Furthermore, the present invention may be constituted by appropriately combining the embodiments, or the techniques.

As described above, according to the above-described embodiments of the present invention, there can be provided a blur prevention apparatus which is reduced in size and weight, which is mounted to an apparatus without deteriorating operations of the apparatuses, which appropriately and quickly removes the offset signal superimposed on the blur signal, and which can output a highly precise blur signal.

Moreover, according to the embodiments of the present invention, there can be provided a blur prevention apparatus which can quickly remove the offset signal superimposed onto the blur signal.

As described above, according to the above-described embodiments of the present invention, there can be provided a blur prevention apparatus which is reduced in size and weight, which removes the offset signal superimposed on the blur detection signal in accordance with the states of the blur prevention apparatus and the equipment to which the blur prevention apparatus is mounted, and which can output a highly precise blur detection signal.

Moreover, according to the above-described embodiments of the present invention, there can be provided an optical apparatus in which the offset signal superimposed on the blur detection signal is removed in accordance with the state of the optical apparatus, so that a highly precise blur detection signal can be output.

Furthermore, according to the above-described embodiments of the present invention, there can be provided an exchangeable lens in which the offset signal superimposed on the blur detection signal is removed in accordance with the state of use of the change lens, so that a highly precise blur detection signal can be output.

Additionally, according to the embodiments of the present invention, there can be provided a blur prevention apparatus which can output a highly precise blur detection signal.

Moreover, according to the embodiments of the present invention, there can be provided a blur prevention apparatus in which the offset signal superimposed on the blur detection signal is removed in accordance with the state of use of the equipment to which the blur prevention apparatus is mounted, so that a highly precise blur detection signal can be output.

Furthermore, according to the embodiments of the present invention, there can be provided a blur prevention apparatus in which the offset signal superimposed on the blur detection signal is removed in accordance with the state of the blur prevention apparatus or the state of use of the equipment to which the blur prevention apparatus is mounted, so that a highly precise blur detection signal can be output.

What is claimed is:

1. An image blur prevention apparatus which is adapted for use with a camera, and is provided with a microcomputer which receives a blur signal from blur detection means for detecting blur, uses the received blur signal to perform a digital calculation, and forms an image blur prevention signal for controlling an image blur preventing operation, comprising:

offset signal removing means for removing an offset component of the blur signal received from the blur detection means before the blur signal is transmitted to the microcomputer, said offset signal removing means determining an offset value to be removed from the blur signal in response to receipt of the blur signal, and subsequently continuously performing an offset removing operation using the offset value; and variable means for varying a manner of determining the offset value for use in the offset removing operation by said offset signal removing means in accordance with a photographic mode of the camera.

2. The apparatus according to claim 1, wherein said variable means has means for varying a length of time for determining the offset value.

3. The apparatus according to claim 1, wherein said offset signal removing means has means for performing a predetermined calculation to determine the offset value.

4. The apparatus according to claim 3, wherein said variable means has means for changing a length of a period for performing the predetermined calculation.

5. The apparatus according to claim 1, wherein the offset signal removing means has means for subtracting a signal corresponding to the offset value from the blur signal.

6. The apparatus according to claim 1, wherein said variable means has means for varying the manner of determining the offset value in accordance with a focal distance of an optical apparatus of the camera to which the apparatus is applied.

7. The apparatus according to claim 1, wherein said variable means has means for varying the manner of determining the offset value in accordance with an exposure time of the camera to which the apparatus is applied.

8. The apparatus according to claim 1, wherein said variable means has means for varying the manner of determining the offset value in accordance with a photographing mode of the camera to which the apparatus is applied.

9. The apparatus according to claim 1, wherein said variable means has means for varying the manner of determining the offset value in accordance with a posture of the camera to which the apparatus is applied.

10. The apparatus according to claim 1, wherein said variable means has means for varying the manner of determining the offset value in accordance with an environment temperature.

11. The apparatus according to claim 2, wherein said variable means has means for stopping an operation of determining the offset value by said offset signal removing means when a predetermined operation portion of the camera is operated while the operation of determining the offset value is performed by said offset signal removing means, and for continuing the operation of determining the offset value by said offset signal removing means when the predetermined operation portion of the camera is not operated.

12. The apparatus according to claim 11, wherein the predetermined operation portion of the camera is a release operation portion.

13. The apparatus according to claim 1, wherein the apparatus is applied to an image blur correction device for correcting an image blur, and the microcomputer has means for performing the digital calculation using the blur signal, and for forming an image blur correction driving/controlling signal for driving/controlling said image blur correction device.

14. The apparatus according to claim 1, wherein the microcomputer controls operation of the camera.

15. The apparatus according to claim 1, wherein said variable means is a function portion of said microcomputer.

16. The apparatus according to claim 1, wherein said offset signal removing means has means for determining the offset value when a detecting operation of the blur detection means is started.

17. An image blur prevention apparatus provided with a microcomputer which receives a blur signal from blur detection means for detecting blur, uses the received blur signal to perform a digital calculation, and forms an image blur prevention signal for controlling an image blur preventing operation, comprising:

offset signal removing means, constituted outside the microcomputer, for removing an offset component of the blur signal received from the blur detection means, said offset signal removing means determining an offset value to be removed from the blur signal in response to receipt of the blur signal, and subsequently continuously performing an offset removing operation using the offset value; and resetting means for resetting the offset value in a state where the offset value of said offset signal removing means is set and a subsequent continuous offset signal removing operation using the offset value is already performed.

18. The apparatus according to claim 17, wherein said offset signal removing means has means for determining the offset value when operation of the blur detection means is started.

19. The apparatus according to claim 17, wherein the apparatus is applied for image blur prevention of a camera, and said resetting means performs a resetting operation in accordance with a camera operation state.

20. The apparatus according to claim 19, wherein said resetting means has means for determining whether to perform a resetting operation or not depending on whether or not the camera is performing a photographing operation.

21. The apparatus according to claim 20, wherein said resetting means has means for not performing a resetting operation when the photographing operation of the camera is performed.

22. The apparatus according to claim 20, wherein said resetting means has means for performing a resetting operation in response to completion of the camera photographing operation.

23. The apparatus according to claim 17, wherein the apparatus is applied for image blur prevention of an optical apparatus, and said resetting means has means for performing a resetting operation in response to a predetermined operation of an operation portion of the optical apparatus.

24. The apparatus according to claim 22, wherein the apparatus is applied for image blur prevention of a camera, and said resetting means has means for performing a resetting operation in response to a predetermined operation of an operation portion of the camera.

25. The apparatus according to claim 17, wherein the apparatus is applied for image blur prevention of an optical apparatus, and said resetting means has means for performing a resetting operation in accordance with an operation posture of the optical apparatus.

26. The apparatus according to claim 17, wherein said resetting means has means for performing a resetting operation when a value of the blur signal reaches a predetermined value or more.

27. The apparatus according to claim 18, wherein said resetting means has means for performing a resetting operation when a predetermined time elapses after operation of the blur detection means is started.

28. The apparatus according to claim 17, wherein said resetting means has a timer, and means for periodically performing a resetting operation in accordance with a clock signal of the timer.

29. The apparatus according to claim 17, wherein said resetting means has means for performing a resetting operation in accordance with an ambient temperature.

30. The apparatus according to claim 18, wherein said resetting means has means for performing a resetting operation in a manner which is different from the manner of determining the offset value during starting of operation of the blur detection means.

31. The apparatus according to claim 30, wherein said resetting means has means for performing a resetting operation in a length of period which is different from a length of period for determining the offset value during starting of operation of the blur detection means.

32. The apparatus according to claim 17, wherein said offset signal removing means has means for determining the offset value by performing a predetermined calculation.

33. The apparatus according to claim 32, wherein said offset signal removing means has means for the predetermined calculation for determining the offset value during the starting of operation of the blur detection means.

34. The apparatus according to claim 33, wherein said resetting means has means for performing a resetting operation by a calculation which is different in manner from the predetermined calculation for determining the offset value during the starting of operation of the blur detection means.

35. The apparatus according to claim 34, wherein said resetting means has means for performing the predetermined calculation for a resetting operation for a length of period which is different from that of the calculation for determining the offset value during the starting of operation of the blur detection means.

36. The apparatus according to claim 32, wherein said resetting means has means for changing the length of period for performing the predetermined calculation.

37. The apparatus according to claim 17, wherein the apparatus is applied to an image blur correction device for correcting image blur, and the microcomputer has means for performing the digital calculation using the blur signal and forming an image blur correction driving/controlling signal for driving/controlling said image blur correction device.

38. The apparatus according to claim 17, wherein the apparatus is applied to a camera, and the microcomputer controls operation of the camera.

39. The apparatus according to claim 17, wherein said resetting means is a function portion of the microcomputer.

* * * * *

UNITED STATES PATENT AND TRADEMARK OFFICE
CERTIFICATE OF CORRECTION

PATENT NO. : 6,263,161 B1
DATED : July 17, 2001
INVENTOR(S) : Koichi Washisu

It is certified that error appears in the above-identified patent and that said Letters Patent is hereby corrected as shown below:

Column 3,
Line 29, "photo-opportunity." should read -- (photo-opportunity). --.

Column 6,
Line 15, "10pF" should read -- $10\mu F$ --.

Column 18,
Line 66, "the" (1st occurrence) should be deleted.

Signed and Sealed this

Thirtieth Day of April, 2002

Attest:

JAMES E. ROGAN
*Attesting Officer*    *Director of the United States Patent and Trademark Office*